US010581936B2

(12) United States Patent
Inoue et al.

(10) Patent No.: US 10,581,936 B2
(45) Date of Patent: Mar. 3, 2020

(54) INFORMATION PROCESSING TERMINAL, MANAGEMENT SYSTEM, COMMUNICATION SYSTEM, INFORMATION PROCESSING METHOD, AND RECORDING MEDIUM

(71) Applicants: Takeru Inoue, Kanagawa (JP); Takeshi Koyama, Saitama (JP); Atsuhiro Fujii, Kanagawa (JP)

(72) Inventors: Takeru Inoue, Kanagawa (JP); Takeshi Koyama, Saitama (JP); Atsuhiro Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 208 days.

(21) Appl. No.: 15/705,924

(22) Filed: Sep. 15, 2017

(65) Prior Publication Data
US 2018/0077206 A1    Mar. 15, 2018

(30) Foreign Application Priority Data

Sep. 15, 2016  (JP) ................................ 2016-180059
Mar. 17, 2017  (JP) ................................ 2017-052681
Jul. 5, 2017    (JP) ................................ 2017-132014

(51) Int. Cl.
H04L 29/06     (2006.01)
H04N 7/14      (2006.01)
(Continued)

(52) U.S. Cl.
CPC ........ H04L 65/403 (2013.01); H04L 65/1073 (2013.01); H04L 65/1093 (2013.01);
(Continued)

(58) Field of Classification Search
CPC ... H04L 65/10; H04L 65/403; H04L 65/1069; H04L 12/66; H04L 12/1822;
(Continued)

(56) References Cited

U.S. PATENT DOCUMENTS 8,103,721 B2 *  1/2012  Hatasaki .............. G06F 3/0607
                                                  709/201
9,232,184 B2 *  1/2016  Maeda .................... H04L 65/80
                        (Continued)

FOREIGN PATENT DOCUMENTS

JP    2015-029252    2/2015
JP    2016-076823    5/2016
JP    2016-129298    7/2016

OTHER PUBLICATIONS

U.S. Appl. No. 15/706,278, filed Sep. 15, 2017, Takeru Inoue, et al.
(Continued)

Primary Examiner — James N Fiorillo
(74) Attorney, Agent, or Firm — Oblon, McClelland, Maier & Neustadt, L.L.P.

(57) ABSTRACT

An information processing terminal includes: circuitry to receive from a management system via a network, a candidate identifier of each one of one or more candidate counterpart information processing terminals that are previously registered for the information processing terminal; and to determine, in response to acceptance of an identifier that has been input, whether the accepted identifier matches any one of the candidate identifiers being received. Based on a determination indicating that the accepted identifier matches any one of the candidate identifiers, the circuitry transmits to the management system first request information requesting to start communication with the candidate counterpart information processing terminal identified with the accepted identifier. Based on a determination indicating that the accepted identifier does not match any one of the candidate identifiers, transmit to the management system second request information requesting to start communication with a counterpart information processing terminal identified with the accepted identifier, the circuitry transmits the
(Continued)

second request information including destination information that differs from destination information included in the first request information.

16 Claims, 36 Drawing Sheets

(51) Int. Cl.
  *H04N 7/15* (2006.01)
  *H04L 12/28* (2006.01)
(52) U.S. Cl.
  CPC .............. *H04N 7/147* (2013.01); *H04N 7/15* (2013.01); *H04L 12/28* (2013.01)
(58) Field of Classification Search
  CPC . H04L 12/2807; H04L 65/1093; H04L 12/28; H04N 7/15; H04N 7/147; H04N 7/17318
  USPC .......................................... 709/204, 206, 223
  See application file for complete search history.

(56) References Cited

U.S. PATENT DOCUMENTS

| | | | |
|---|---|---|---|
| 10,069,830 B2* | 9/2018 | Okuyama | H04L 65/1093 |
| 2004/0126019 A1 | 7/2004 | Ikebe et al. | |
| 2004/0130570 A1 | 7/2004 | Sakuyama et al. | |
| 2004/0131264 A1 | 7/2004 | Sakuyama et al. | |
| 2004/0202372 A1 | 10/2004 | Sakuyama et al. | |
| 2004/0208380 A1 | 10/2004 | Aoki et al. | |
| 2004/0212843 A1 | 10/2004 | Kodama et al. | |
| 2004/0228534 A1 | 11/2004 | Sakuyama et al. | |
| 2005/0078940 A1 | 4/2005 | Wakita et al. | |
| 2008/0052384 A1* | 2/2008 | Marl | H04L 12/2807 709/223 |
| 2008/0242429 A1 | 10/2008 | Itoh et al. | |
| 2009/0083374 A1* | 3/2009 | Saint Clair | G05B 15/00 709/203 |
| 2010/0088751 A1* | 4/2010 | Ando | H04W 8/065 726/5 |
| 2012/0072895 A1 | 3/2012 | Koyama et al. | |
| 2012/0089680 A1* | 4/2012 | Ono | H04L 12/1822 709/204 |
| 2012/0176932 A1* | 7/2012 | Wu | H04W 8/26 370/254 |
| 2012/0185542 A1* | 7/2012 | Vyrros | H04L 51/28 709/206 |
| 2013/0144995 A1* | 6/2013 | Ishii | H04L 12/4645 709/220 |
| 2013/0336170 A1* | 12/2013 | Broadworth | H04L 65/403 370/260 |
| 2014/0040975 A1* | 2/2014 | Raleigh | H04W 12/12 726/1 |
| 2014/0049597 A1 | 2/2014 | Inoue | |
| 2014/0118470 A1 | 5/2014 | Kato et al. | |
| 2014/0137193 A1 | 5/2014 | Inoue | |
| 2015/0006698 A1 | 1/2015 | Aono et al. | |
| 2015/0046581 A1 | 2/2015 | Inoue | |
| 2015/0094047 A1* | 4/2015 | Jung | H04W 4/16 455/415 |
| 2015/0180822 A1* | 6/2015 | Mathias | H04M 7/0057 709/206 |
| 2015/0222670 A1 | 8/2015 | Inoue et al. | |
| 2015/0237075 A1 | 8/2015 | Inoue et al. | |
| 2015/0312284 A1* | 10/2015 | Mihara | H04L 65/4038 370/260 |
| 2015/0341442 A1 | 11/2015 | Inoue | |
| 2015/0341812 A1* | 11/2015 | Dion | H04W 24/08 370/252 |
| 2016/0099893 A1 | 4/2016 | Hasegawa et al. | |
| 2016/0119262 A1* | 4/2016 | Siegel | H04L 51/066 709/206 |
| 2016/0205345 A1 | 7/2016 | Homma et al. | |
| 2016/0330253 A1 | 11/2016 | Inoue | |
| 2016/0381094 A1 | 12/2016 | Inoue | |
| 2017/0013234 A1 | 1/2017 | Inoue | |
| 2017/0064252 A1 | 3/2017 | Inoue et al. | |
| 2017/0163696 A1 | 6/2017 | Inoue | |
| 2017/0177190 A1 | 6/2017 | Inoue et al. | |
| 2017/0249764 A1 | 8/2017 | Fujii et al. | |
| 2018/0309716 A1* | 10/2018 | Moore | H04L 65/1069 |

OTHER PUBLICATIONS

U.S. Appl. No. 15/649,174, filed Jul. 13, 2017, Takeru Inoue.
U.S. Appl. No. 15/597,640, filed May 17, 2017, Takeru Inoue, et al.

* cited by examiner

FIG. 7A

| IDENTIFIER | PASSWORD |
|---|---|
| 01aa | aaaa |
| 01ab | abab |
| 01ba | baba |
| ... | ... |

| REQUEST SENDER IDENTIFIER | CANDIDATE IDENTIFIER |
|---|---|
| 01aa | 01ab, 01ba, 01db, 01dc, 01ca, 01cb |
| 01ab | 01aa, 01ca, 01cb |
| 01ba | 01aa, 01ab, 01ca, 01cb, 01da, 01db |
| 01cb | 01db |
| ... | ... |
| 01db | 01aa, 01ab, 01ba, ···, 01ca, 01cb, ···, 01da |

| IDENTIFIER | TERMINAL NAME | OPERATING STATE | RECEPTION DATE AND TIME | IP ADDRESS OF TERMINAL |
|---|---|---|---|---|
| 01aa | JAPAN TOKYO OFFICE AA TERMINAL | ONLINE (COMMUNICATING) | 20xx.11.10 13:40 | 1.2.1.3 |
| 01ab | JAPAN TOKYO OFFICE AB TERMINAL | OFFLINE | 20xx.11.09 12:00 | 1.2.1.4 |
| ... | ... | ... | ... | ... |
| 01ba | JAPAN OSAKA OFFICE BA TERMINAL | ONLINE (CAPABLE OF COMMUNICATING) | 20xx.11.10 13:45 | 1.2.2.3 |
| 01bb | JAPAN OSAKA OFFICE BB TERMINAL | ONLINE (CAPABLE OF COMMUNICATING) | 20xx.11.10 13:50 | 1.2.2.4 |
| ... | ... | ... | ... | ... |
| 01ca | US NEW YORK OFFICE CA TERMINAL | OFFLINE | 20xx.11.10 12:45 | 1.3.1.3 |
| 01cb | US NEW YORK OFFICE CB TERMINAL | OFFLINE | 20xx.11.10 13:55 | 1.3.1.4 |
| ... | ... | ... | ... | ... |
| 01da | US WASHINGTON OFFICE DA TERMINAL | OFFLINE | 20xx.11.08 12:45 | 1.3.2.3 |
| 01db | US WASHINGTON OFFICE DB TERMINAL | ONLINE (CAPABLE OF COMMUNICATING) | 20xx.11.10 12:45 | 1.3.2.4 |
| 01dc | US WASHINGTON OFFICE DC TERMINAL | ONLINE (COMMUNICATING) | 20xx.11.10 12:55 | 1.3.2.5 |
| ... | ... | ... | ... | ... |

FIG. 8B

| SESSION ID | RELAY APPARATUS ID | REQUEST SENDER IDENTIFIER | REQUEST DESTINATION IDENTIFIER | PARTICIPANT IDENTIFIER |
|---|---|---|---|---|
| se1 | 111a | 01aa | 01db | 01dc ... |
| se2 | 111a | 01ad | 01ca | – |
| ... | ... | ... | ... | ... |

802

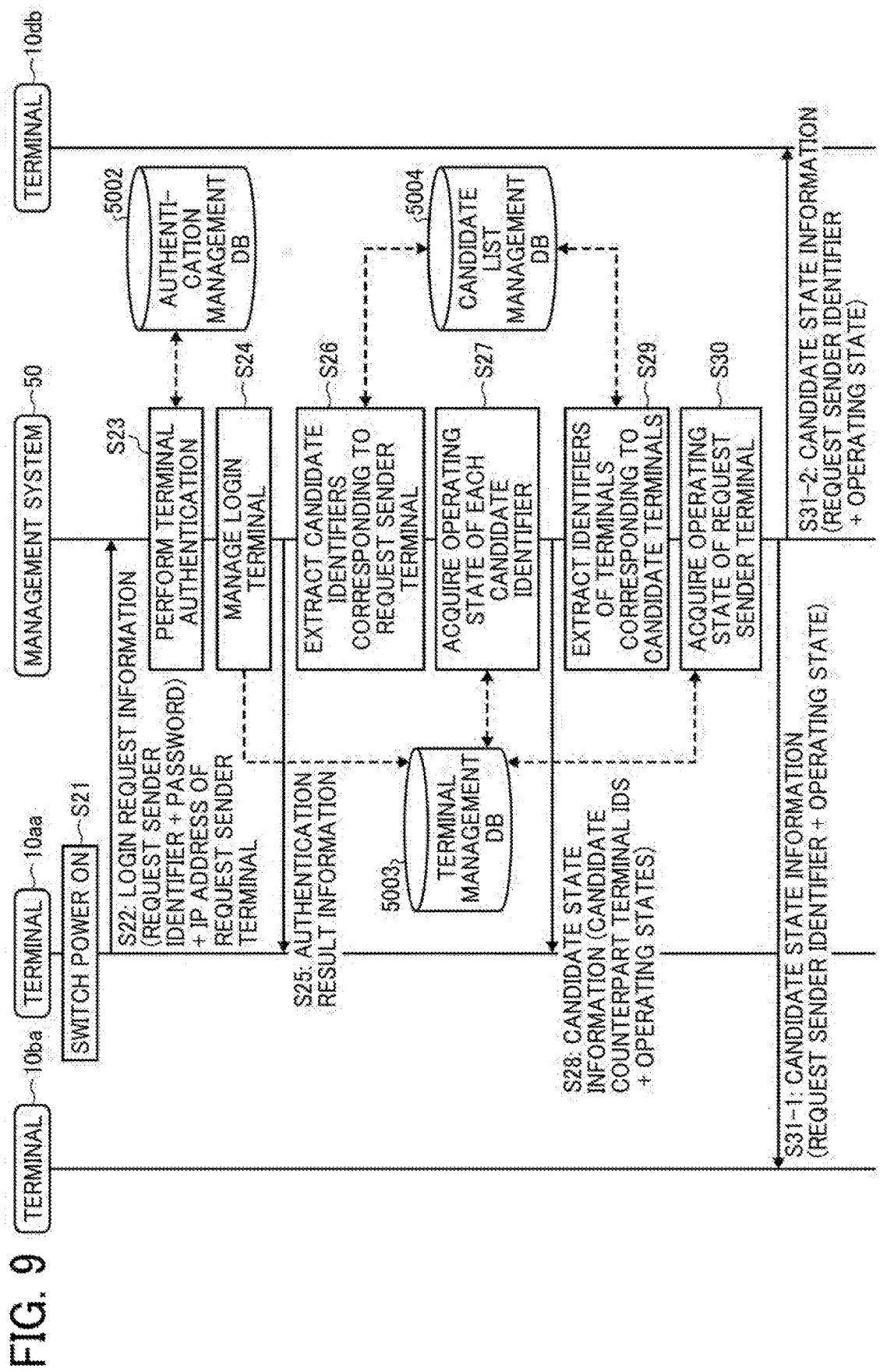

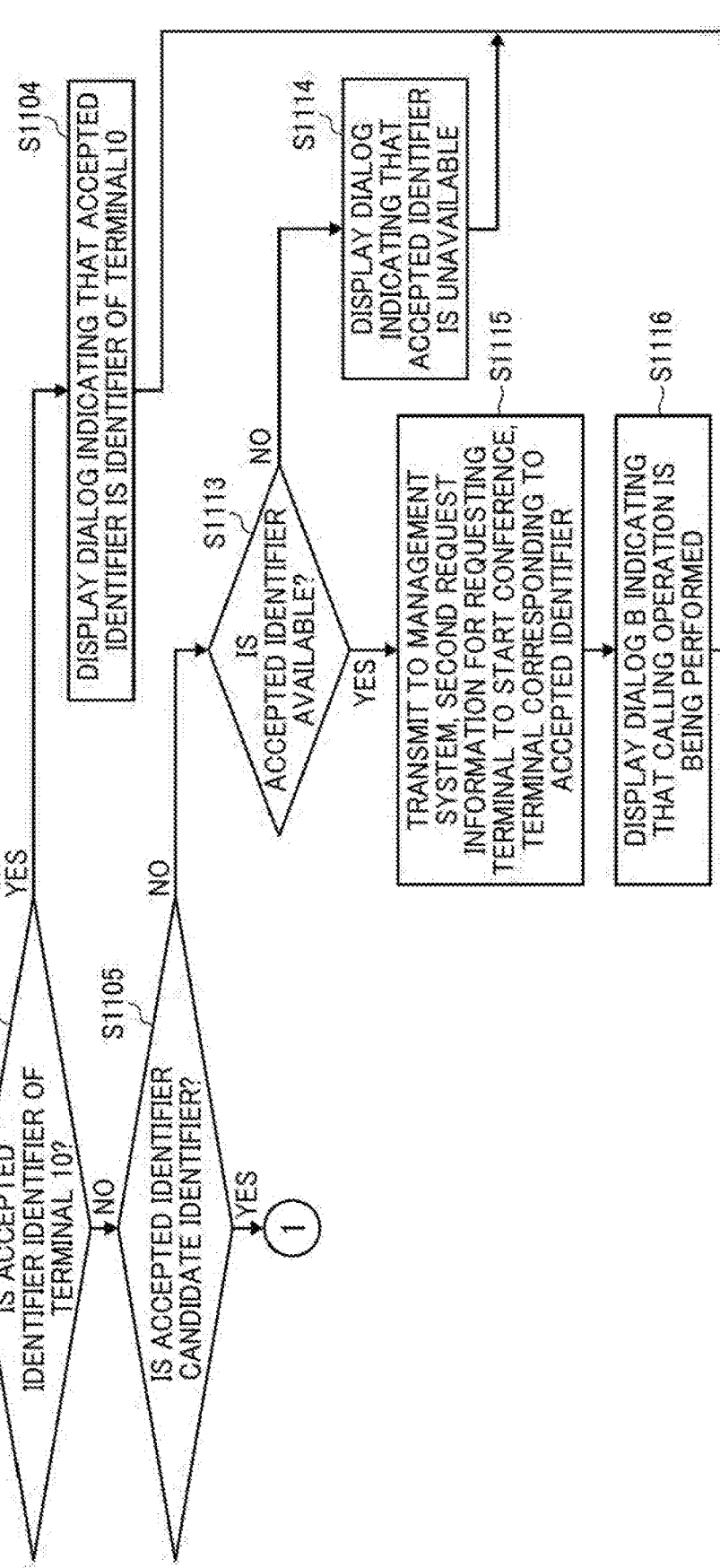

FIG. 15

| | DESTINATION INFORMATION | INFORMATION CONTENT |
|---|---|---|
| INFORMATION TRANSMITTED TO MANAGEMENT SYSTEM (FIRST REQUEST INFORMATION) | IP ADDRESS OF MANAGEMENT SYSTEM | IDENTIFIER OF REQUEST SENDER, IDENTIFIER OF REQUEST DESTINATION, REQUEST CONTENT (e.g., START OF COMMUNICATION) |
| INFORMATION TRANSMITTED TO TERMINAL (SECOND REQUEST INFORMATION) | IDENTIFIER OF REQUEST DESTINATION | IDENTIFIER OF REQUEST SENDER, IDENTIFIER OF REQUEST DESTINATION, REQUEST CONTENT (e.g., START OF COMMUNICATION) |

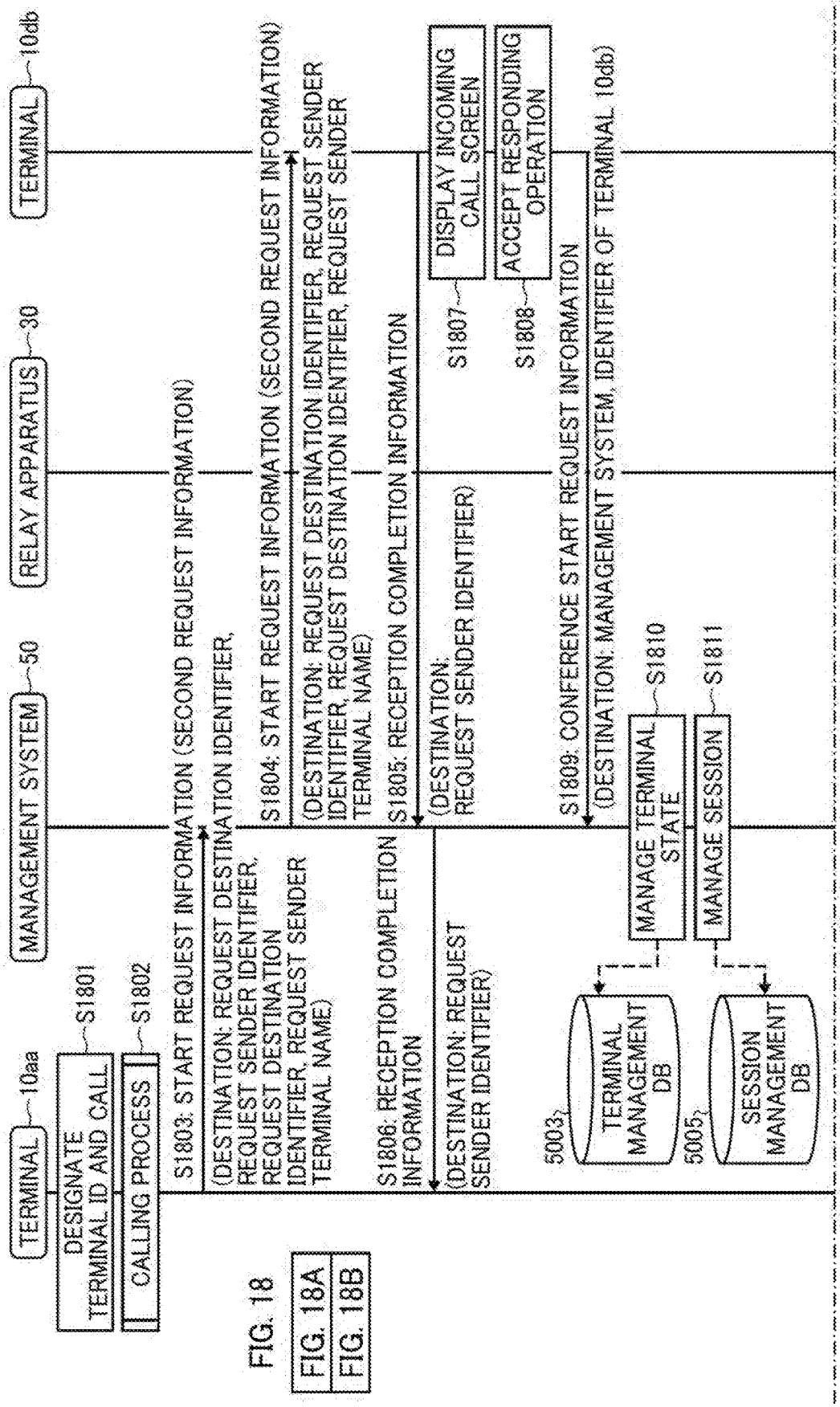

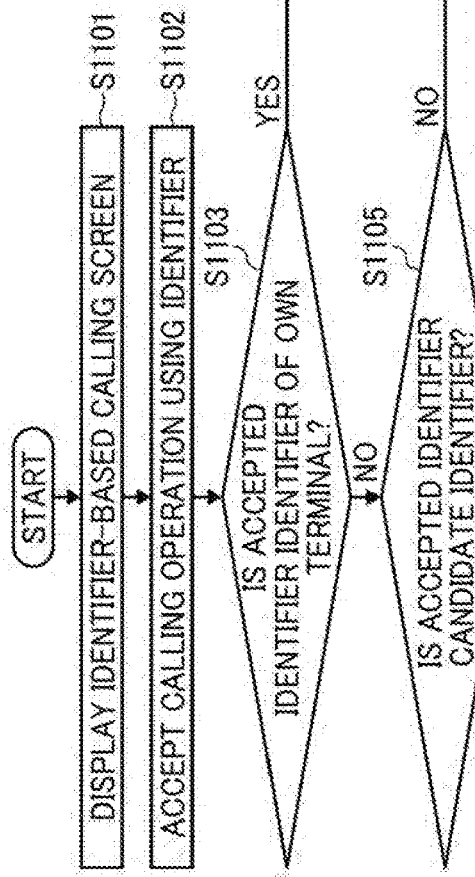

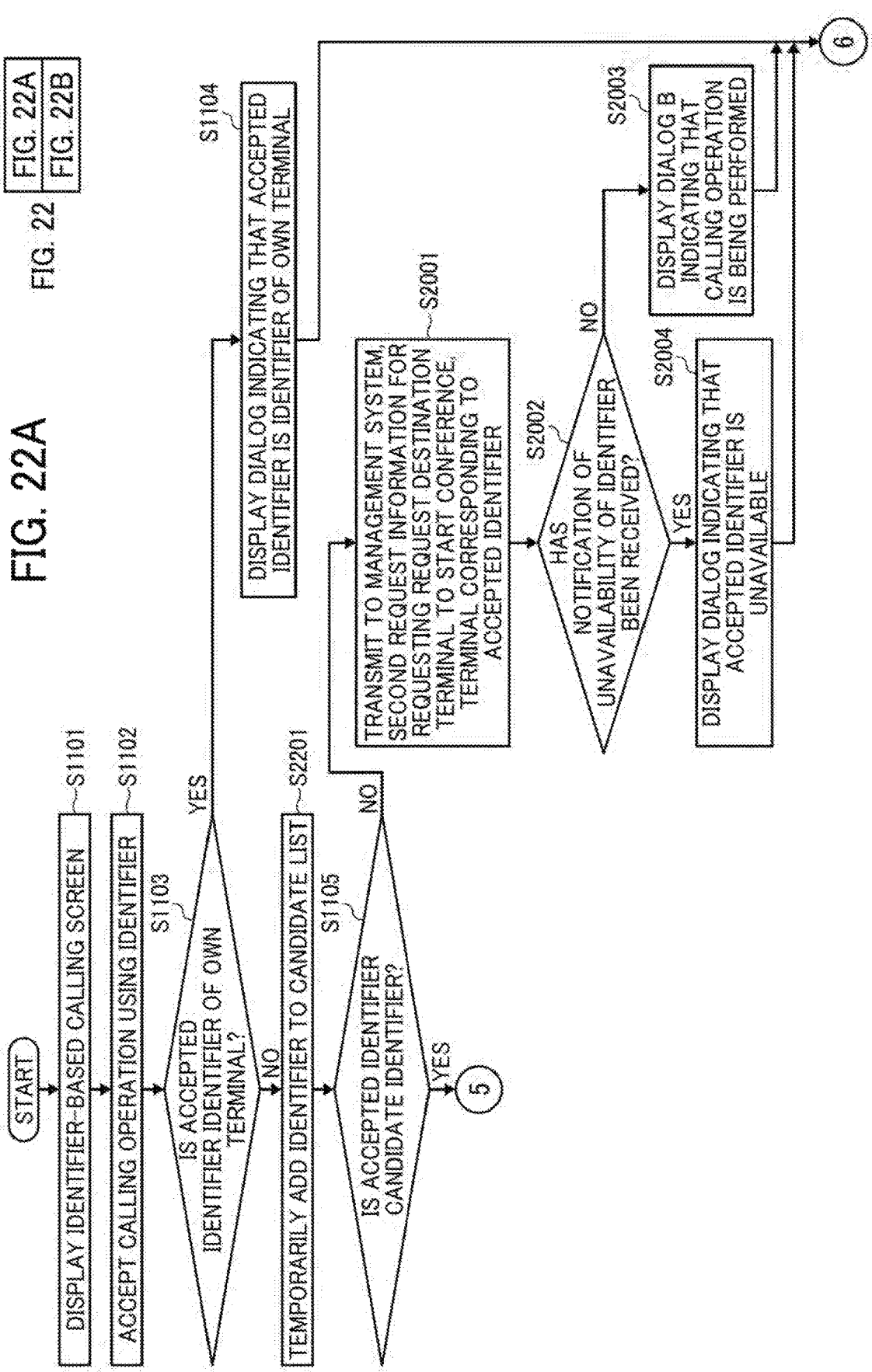

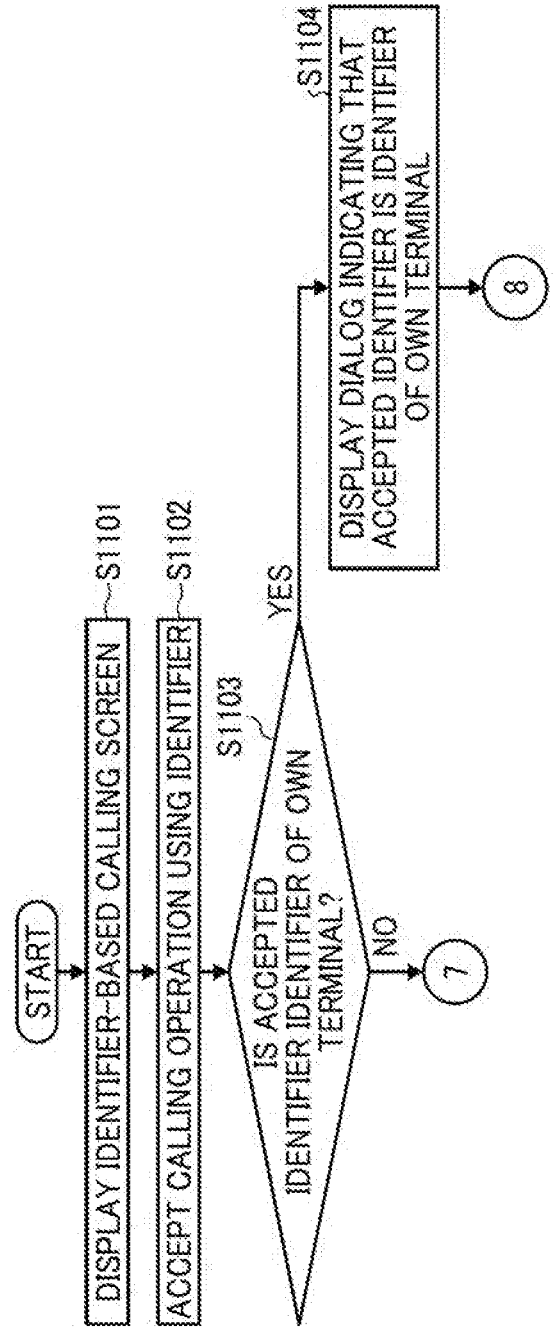

INFORMATION PROCESSING TERMINAL, MANAGEMENT SYSTEM, COMMUNICATION SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-180059, filed on Sep. 15, 2016, Japanese Patent Application No. 2017-052681, filed on Mar. 17, 2017, and Japanese Patent Application No. 2017-132014, filed on Jul. 5, 2017, in the Japan Patent Office, the entire disclosure of which is hereby incorporated by reference herein.

BACKGROUND

Technical Field

The present invention relates to an information processing terminal, a management system, a communication system, an information processing method, and a recording medium.

Description of the Related Art

Conference systems are now widely used to perform a teleconference between locations distant from each other, via a communication network such as the Internet.

Among such teleconference systems, a teleconference system causes information about a plurality of terminals that are candidate communication counterparts to be displayed in the form of a candidate list on a terminal, and a user selects a counterpart terminal from the candidate list so as to start communication with the counterpart terminal easily.

SUMMARY

Example embodiments of the present invention include an information processing terminal, which includes: circuitry to receive from a management system via a network, a candidate identifier of each one of one or more candidate counterpart information processing terminals that are previously registered for the information processing terminal; and to determine, in response to acceptance of an identifier that has been input, whether the accepted identifier matches any one of the candidate identifiers being received. Based on a determination indicating that the accepted identifier matches any one of the candidate identifiers, the circuitry transmits to the management system first request information requesting to start communication with the candidate counterpart information processing terminal identified with the accepted identifier. Based on a determination indicating that the accepted identifier does not match any one of the candidate identifiers, transmit to the management system second request information requesting to start communication with a counterpart information processing terminal identified with the accepted identifier, the circuitry transmits the second request information including destination information that differs from destination information included in the first request information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A and 7B each illustrate exemplary information managed by the management system according to an embodiment;

FIGS. 8A and 8B each illustrate exemplary information managed by the management system according to an embodiment;

FIG. 9 is a sequence diagram illustrating an exemplary preparatory process according to an embodiment;

FIGS. 11A and 11B (FIG. 11) are a flowchart of an exemplary terminal calling process according to a first embodiment;

FIG. 15 illustrates exemplary information transmitted from the terminal according to the first embodiment to the management system and another terminal;

FIGS. 18A and 18B (FIG. 18) are a sequence diagram illustrates an exemplary communication process according to the first embodiment;

FIGS. 20A and 20B (FIG. 20) are a flowchart illustrating an exemplary terminal calling process according to a second embodiment;

FIGS. 22A and 22B (FIG. 22) are a flowchart illustrating an exemplary terminal calling process according to a third embodiment;

FIGS. 24A and 24B (FIG. 24) are a flowchart illustrating an exemplary terminal calling process according to a fourth embodiment;

Figure 1:
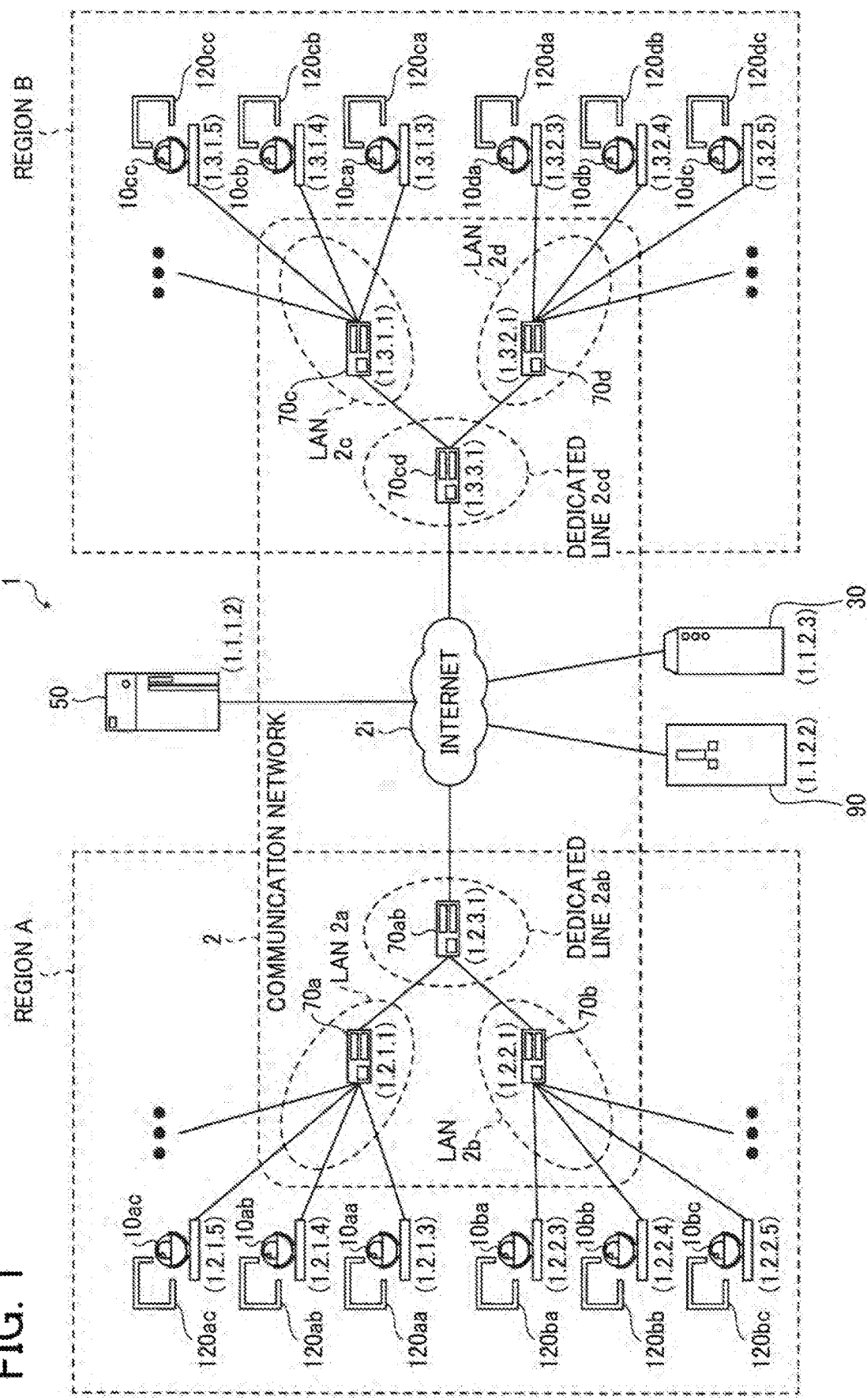
FIG. 1 is a schematic diagram illustrating a communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an exemplary information processing terminal, a communication system, an information processing method, and a recording medium on which a program is recorded, each according to an embodiment of the present invention, will be described with reference to the drawings.

System Configuration

First, a system configuration of a communication system according to an embodiment will be described.

Figure 2:
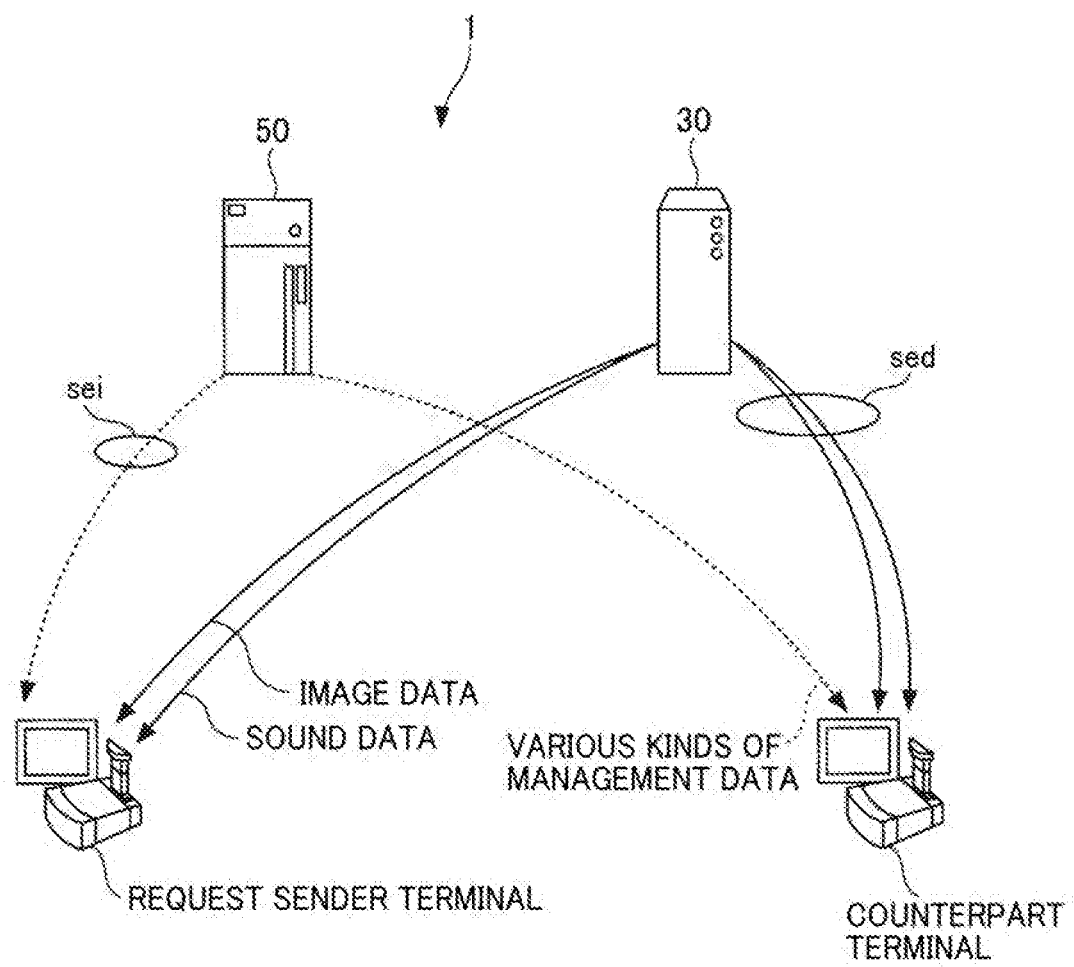
FIG. 2 is an illustration of a state in which image data, sound data, and various kinds of management data are transmitted and received in the communication system, according to the embodiment.

FIG. 1 schematically illustrates the communication system according to an embodiment. FIG. 2 is an illustration of a state in which image data, sound data, and various kinds of management data are transmitted and received in the communication system according to an embodiment.

The communication system includes a data providing system that transmits content data from a communication terminal to another communication terminal in one direction through a communication management apparatus. The communication system also includes a communication system and the like in which information is mutually transmitted between a plurality of communication terminals through a communication management apparatus.

This communication system is a system for mutually transmitting information between a plurality of communication terminals through a communication management system (corresponding to a "communication management apparatus"). Examples of the communication system include a videoconference system, a video telephone system, an audio conference system, an audio telephone system, a teleconference that uses a personal computer (PC) screen sharing system, and the like.

A communication system 1 illustrated in FIG. 1 includes a plurality of communication terminals (10aa, 10ab, ...), displays (120aa, 120ab, ...) for the respective communication terminals (10aa, 10ab, ...), a relay apparatus 30, a communication management system 50, a program providing apparatus 90, and the like.

The plurality of communication terminals (10aa, 10ab, ...), for example, transmit and receive content data such as video data therebetween. Examples of the video data include moving image data, still image data, sound data, and the like.

Hereinafter, the "communication management system" will simply be referred to as a "management system", and each "communication terminal" will simply be referred to as a "terminal". In addition, an arbitrary one or ones of the plurality of terminals (10aa, 10ab, ...) is/are referred to as a "terminal(s) 10". Furthermore, an arbitrary one or ones of the plurality of displays (120aa, 120ab, ...) is/are referred to as a "display(s) 120". Furthermore, a terminal serving as a request sender that requests the start of communication will be referred to as a "request sender terminal", and a terminal serving as a counterpart (relay destination) that is the destination of the request will be referred to as a "counterpart (request destination) terminal".

As illustrated in FIG. 2, a management-data session sei used for transmitting and receiving various kinds of management data is established via the management system 50 between the request sender terminal and the counterpart terminal in the communication system 1. In addition, for example, an image-and-sound-data session sed (communication session) used for transmitting and receiving image data and sound data is also established via the relay apparatus 30 between the request sender terminal and the counterpart terminal.

Referring back to FIG. 1, the system configuration of the communication system 1 will be further described.

Each terminal (information processing terminal) 10 transmits and receives various kinds of information to and from another terminal 10. The terminal 10, for example, establishes a communication session (image-and-sound-data session sed) with another terminal 10 and performs communication by transmitting and receiving content data including sound data, image data, and the like in the established communication session. This enables, for example, a videoconference between the plurality of terminals 10 in the communication system 1.

To start a videoconference in the communication system 1 according to an embodiment, a user who wishes to start a videoconference operates a certain terminal 10 so that the operated terminal 10 transmits start request information to the management system 50.

The start request information herein is information for requesting the start of a session for the videoconference and includes information for designating a terminal 10 as a counterpart terminal of the session.

Note that the counterpart terminal may be a single terminal 10 or two or more terminals 10. That is, in the communication system 1, a videoconference can be enabled by using a session established between, not only two terminals 10, but also three or more terminals 10.

In addition, in the communication system 1 according to an embodiment, a user can participate in a videoconference for which a session has already been established and which has already been started. A user who wishes to participate in such a videoconference operates a certain terminal 10 so that the operated terminal 10 transmits to the management system 50, participation request information designating the session that has already been established (hereinafter this session will be referred to as an established session) and used for the videoconference in which the user wishes to participate. Hereinafter, the terminal 10 that transmits the participation request information will be referred to as a "participation request terminal".

The management system 50 is a system including an information processing apparatus or a plurality of information processing apparatuses that integrally manage the terminals 10 and the relay apparatus 30. The management system 50 establishes a communication session between the terminals 10 to enable a videoconference therebetween by communication.

Upon the start request information for a communication session being received from the request sender terminal, the management system 50 establishes a communication session between the request sender terminal and the counterpart terminal to start a videoconference. Upon the participation request information for an established session being received from the terminal 10, the management system 50 causes the participation request terminal to participate in the established session.

A plurality of routers (70a, 70b, 70c, 70d, 70ab, and 70cd) illustrated in FIG. 1 each select an optimal path for content data. Hereinafter, an arbitrary one or ones of the routers (70a, 70b, 70c, 70d, 70ab, and 70cd) will be referred to as a "router(s) 70".

The relay apparatus 30 relays content data between the plurality of terminals 10 under control of the management system 50.

The program providing apparatus 90 includes a hard disk (HD), which will be described later, on which a terminal program is recorded for allowing each terminal 10 to implement a variety of functions and a variety of units, and the terminal program can be transmitted to the terminal 10.

The HD of the program providing apparatus 90 also stores a relay-apparatus program for allowing the relay apparatus 30 to implement a variety of functions and a variety of units, and the relay-apparatus program can be transmitted to the relay apparatus 30.

The HD of the program providing apparatus 90 further stores a communication-management program for allowing the management system 50 to implement a variety of functions and a variety of units, and the communication-management program can be transmitted to the management system 50.

The terminals (10aa, 10ab, 10ac, ... ) are connected to the router 70a via a local area network (LAN) 2a so that communication can be performed. The terminals (10ba, 10bb, 10bc, ... ) are connected to the router 70b via a LAN 2b so that communication can be performed. The LAN 2a and the LAN 2b are connected to each other via a dedicated line 2ab including the router 70ab and are configured within a region A so that communication can be performed. For example, the region A is Japan, the LAN 2a is configured within an office in Tokyo, and the LAN 2b is configured within an office in Osaka.

In addition, the terminals (10ca, 10cb, 10cc, ... ) are connected to the router 70c via a LAN 2c so that communication can be performed. The terminals (10da, 10db, 10dc, ... ) are connected to the router 70d via a LAN 2d so that communication can be performed. The LAN 2c and LAN 2d are connected to each other via a dedicated line 2cd including the router 70cd and are configured within a region B so that communication can be performed. For example, the region B is the United States, the LAN 2c is configured within an office in New York, and the LAN 2d is configured within an office in Washington D.C. The region A and the region B are connected to each other via an internet 2i from the routers (70ab and 70cd), respectively, so that communication can be performed.

The management system 50, the program providing apparatus 90, and the relay apparatus 30 are connected to the terminals 10 via the internet 2i so that communication can be performed. The management system 50, the program providing apparatus 90, and the relay apparatus 30 may be installed in the region A or the region B, or may be installed in any other region.

In the example illustrated in FIG. 1, a communication network 2 includes the LAN 2a, the LAN 2b, the dedicated line 2ab, the internet 2i, the dedicated line 2cd, the LAN 2c, and the LAN 2d. In the communication network 2, not only wired communication, but also wireless communication may be performed locally.

In the example illustrated in FIG. 1, each set of four digits below or above each of the terminals 10, the relay apparatus 30, the management system 50, each of the routers 70, and the program providing apparatus 90 represents an internet protocol (IP) address in the typical Internet Protocol version 4 (IPv4) in a simple format. For example, the IP address of the terminal 10aa is "1.2.1.3". Although IPv6 may be used instead of IPv4, description will be given by using IPv4 for simplicity.

Hardware Configuration

Next, hardware configurations according to an embodiment will be described.

Appearance of Terminal

Figure 3:
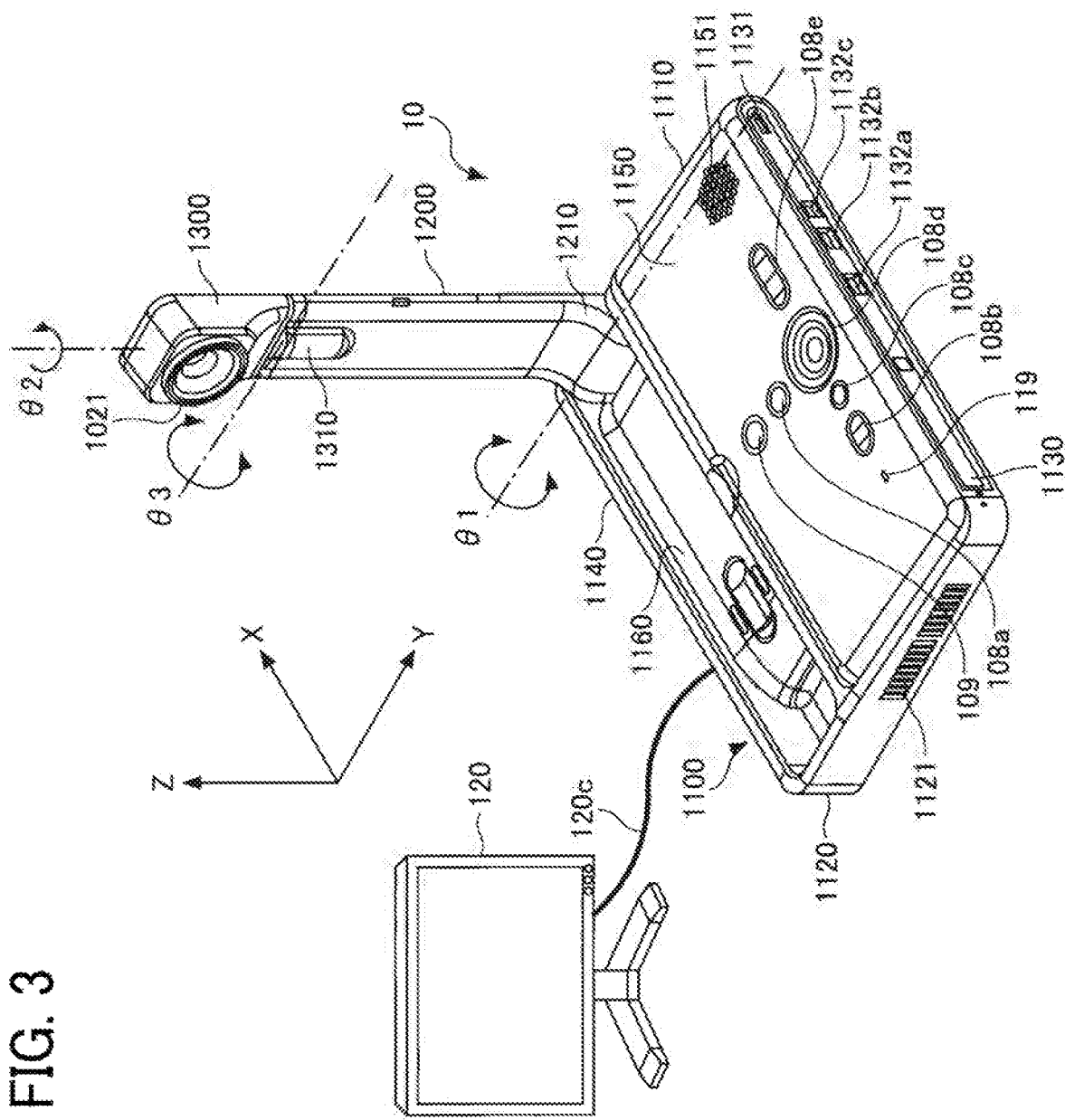
FIG. 3 is an external view of an exemplary terminal according to an embodiment.

FIG. 3 is an external view of an exemplary terminal according to an embodiment. Hereinafter, the longitudinal direction of the terminal 10 will be referred to as the x-axis direction, the direction that intersects with the x-axis direction on a horizontal plane will be referred to as the y-axis direction, and the direction that intersects with the x-axis direction and the y-axis direction will be referred to as the z-axis direction (vertical direction).

As illustrated in FIG. 3, the terminal 10 includes a housing 1100, an arm 1200, and a camera housing 1300. Among these portions, a front wall 1110 of the housing 1100 has an inlet face including a plurality of inlet holes, and a rear wall 1120 of the housing 1100 has an exhaust face 1121 including a plurality of exhaust holes.

Thus, when a cooling fan that is built in the housing 1100 is driven, an air in front of the terminal 10 is taken in through the inlet face to be exhausted to the rear of the terminal 10 through the exhaust face 1121. On a right wall 1130 of the housing 1100, a sound collecting hole 1131 is formed, and a built-in microphone 114, which will be described later, can collect sounds such as voice, noise, and the like.

An operation panel 1150 is formed toward the right wall 1130 of the housing 1100. The operation panel 1150 includes a plurality of operation keys (108a to 108e), a power switch 109, and an alarm lamp 119, all of which will be described later. Further, on the operation panel 1150, a sound output face 1151 is formed with a plurality of voice output holes for transmitting sound that is output from a built-in speaker 115, which will be described later. A container 1160 for containing the arm 1200 and the camera housing 1300 is formed as a recess toward a left wall 1140 of the housing 1100. The right wall 1130 of the housing 1100 further has a plurality of connection ports (1132a to 1132c) for electrically connecting cables to an external apparatus connection interface (I/F) 118, which will be described later. On the other hand, the left wall 1140 of the housing 1100 has a connection port for electrically connecting a cable 120c for the display 120 to the external apparatus connection I/F 118, which will be described later.

Hereinafter, an arbitrary one or ones of the operation keys (108a to 108e) will be referred to as an "operation key(s) 108", and an arbitrary one or ones of the connection ports (1132a to 1132c) will be referred to as a "connection port(s) 1132".

The arm 1200 is coupled to the housing 1100 via a torque hinge 1210 to be rotatable in the vertical direction within a range of a tilt angle θ1 of 135 degrees with respect to the housing 1100. FIG. 3 illustrates a state in which the tilt angle θ1 is 90 degrees.

The camera housing 1300 includes a built-in camera 112, which will be described later, by which images of a user, document, room, and the like can be captured. A torque hinge 1310 is formed for the camera housing 1300, and the camera housing 1300 is coupled to the arm 1200 via the torque hinge 1310 to be rotatable in the vertical and horizontal directions within a range of a pan angle θ2 of ±180 degrees and a tilt angle θ3 of ±45 degrees, and FIG. 3 illustrates a state of 0 degrees.

As another example, the terminal 10 may be an information terminal such as a typical general computer, a tablet terminal, or a smartphone. To use an information terminal that is not equipped with a microphone or a camera as the terminal 10, an external microphone or camera is connected to the computer. Thus, the information terminal can be used as the terminal 10 according to an embodiment.

To use an information terminal as the terminal 10, an application for executing the process of the terminal 10, which will be described later, is installed in the information terminal. Accordingly, the terminal 10 is also referred to as an information processing terminal including the terminal illustrated in FIG. 3 and a typical information terminal.

Note that each of the relay apparatus 30, the management system 50, and the program providing apparatus 90 has the same appearance as a typical server computer, and therefore description thereof will be omitted.

Hardware Configuration of Terminal

Figure 4:
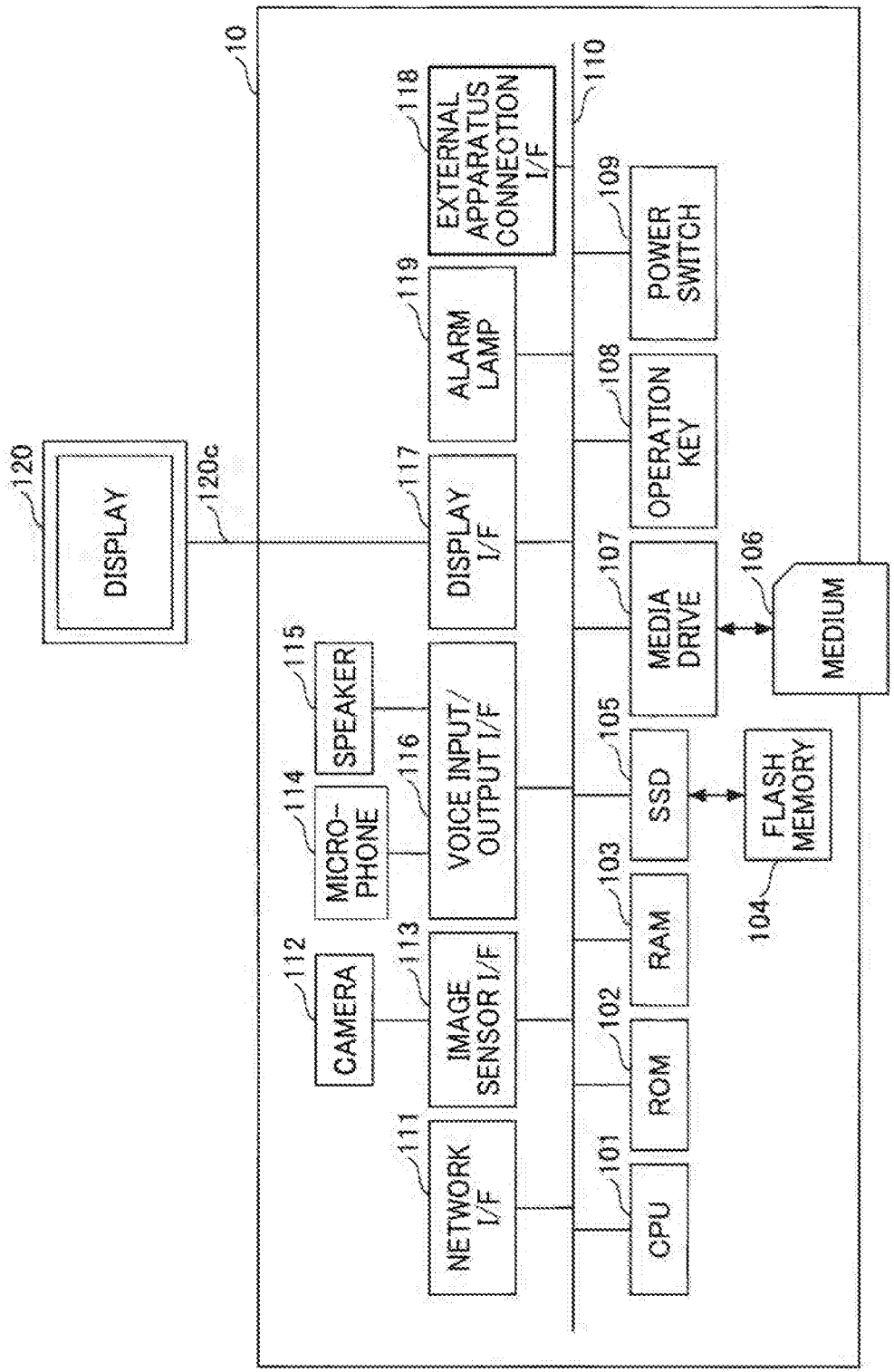
FIG. 4 is a diagram illustrating an exemplary hardware configuration of the terminal according to an embodiment.

FIG. 4 illustrates an exemplary hardware configuration of the terminal 10 according to an embodiment. The terminal 10 has a typical computer configuration including, for example, a central processing unit (CPU) 101, a read only memory (ROM) 102, a random access memory (RAM) 103, a flash memory 104, and a solid state drive (SSD) 105. The terminal 10 further includes a media drive 107, the operation key(s) 108, the power switch 109, a network I/F 111, the camera 112, an image sensor I/F 113, the microphone 114, the speaker 115, and a sound input/output I/F 116. The terminal 10 further includes a display I/F 117, the external apparatus connection I/F 118, the alarm lamp 119, a bus 110, and the like.

The CPU 101 is, for example, a processor that reads programs and data from the ROM 102, the flash memory 104, and the like and performs processes to implement the functions of the terminal 10. The ROM 102 is, for example, a non-volatile memory that stores in advance programs and the like used to start the CPU 101, such as an initial program loader (IPL). The RAM 103 is a volatile memory used as a work area and the like of the CPU 101.

The flash memory 104 is, for example, a storage device that stores an operating system (OS), an application program, various kinds of data, and the like. The SSD 105 controls reading and writing of various kinds of data from and to the flash memory 104 under control of the CPU 101. The media drive 107, for example, controls reading and writing (storing) of data from and to a recording medium 106 such as a memory card.

Each of the operation keys 108 is an input device that receives an input operation performed by a user of the terminal 10. The power switch 109 is a switch for switching on and off the power of the terminal 10. The network I/F 111 is a communication interface for communicating by using the communication network 2.

The camera 112 is an image capturing device for capturing images of a subject under control of the CPU 101. The image sensor I/F 113 controls image capturing performed by the camera 112 and converts data obtained through image capturing into predetermined image data (video data). The microphone 114 converts voice that has been collected into an electrical signal. The speaker 115 converts the voice signal into voice and outputs the voice. The sound input/output I/F 116 controls input and output of voice by using the microphone 114 and the speaker 115.

The display I/F 117 transmits image data to the display 120 under control of the CPU 101. The external apparatus connection I/F 118 is an interface for connecting a variety of external apparatuses. The alarm lamp 119 is a light emitting device for notifying a user in case of an abnormality in various functions of the terminal 10. The bus 110 is connected to each of the above components, and an address signal, a data signal, a variety of control signals, and the like are transmitted therethrough.

The display 120 is a display unit formed of a liquid crystal panel or an organic electroluminescent (EL) panel on which an image of a subject, an operation icon, and the like are displayed. In addition, the display 120 is connected to the display I/F 117 via the cable 120c.

The camera 112 includes a lens and a solid-state image sensor that converts light into electric charge to digitize an image (video) of a subject. Examples of the solid-state image sensor include a complementary metal oxide semiconductor (CMOS) sensor, a charge coupled device (CCD), and the like.

The external apparatus connection I/F 118 can be electrically connected to an external apparatus such as an external camera, an external microphone, or an external speaker via a Universal Serial Bus (USB) cable or the like inserted into the connection port 1132 of the housing 1100 illustrated in FIG. 3.

If an external camera is connected, the external camera is driven preferentially to the built-in camera 112 under control of the CPU 101. Likewise, if an external microphone is connected or an external speaker is connected, the external microphone or the external speaker is driven preferentially to the built-in microphone 114 or the built-in speaker 115, respectively, under control of the CPU 101.

The recording medium 106 is detachable from the terminal 10. Not only the flash memory 104, any non-volatile memory from or to which data is read or written under control of the CPU 101 may be used, such as an electrically erasable and programmable ROM (EEPROM).

The above-described terminal program may be recorded in a file in an installable format or an executable format on a computer-readable recording medium (e.g., the recording medium 106) to be circulated. In addition, the above-described terminal program may be stored in the ROM 102 instead of the flash memory 104.

Hardware Configuration of Management System

Figure 5:
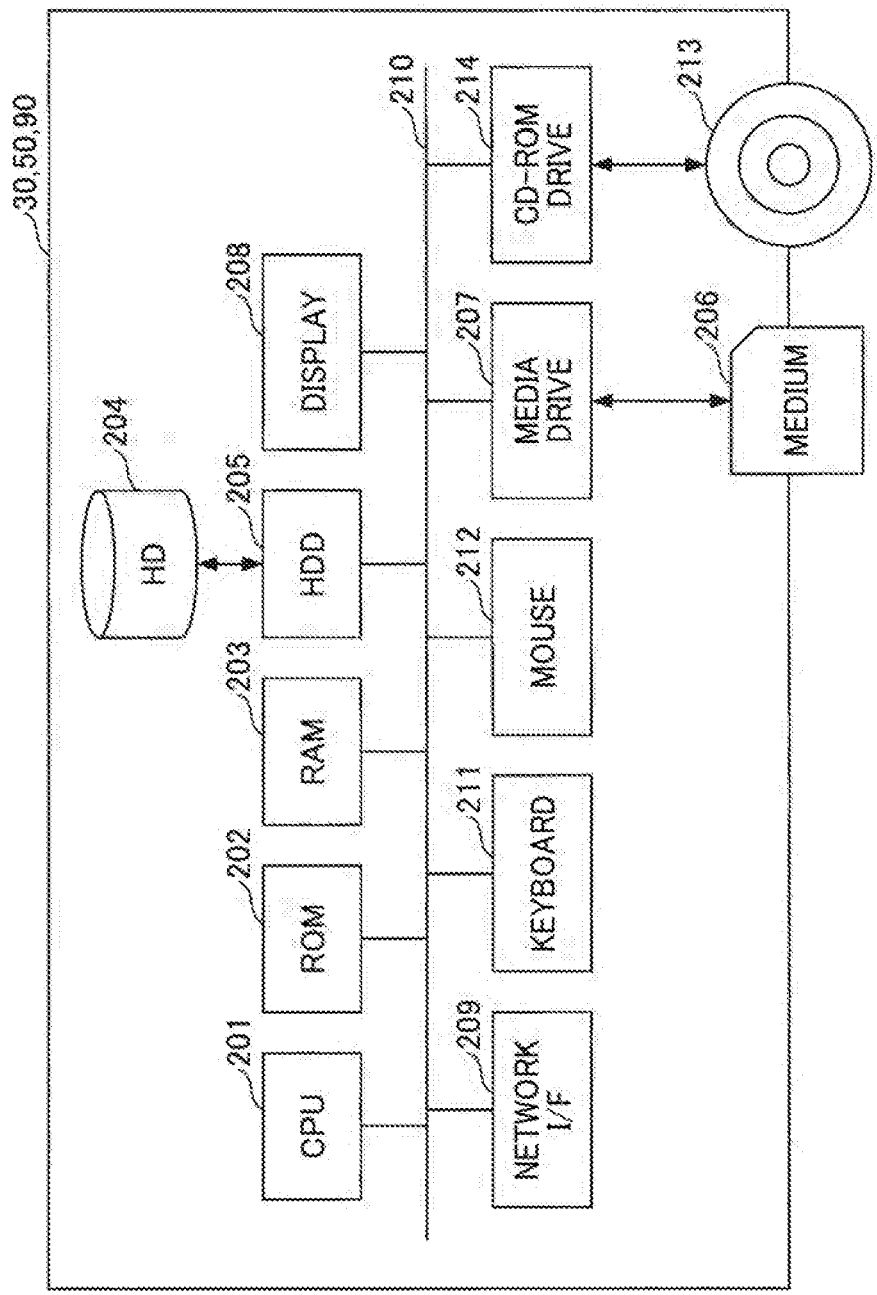
FIG. 5 is a diagram illustrating an exemplary hardware configuration of a management system according to an embodiment.

FIG. 5 illustrates a hardware configuration of the management system 50 according to an embodiment. The management system 50 has a typical computer hardware configuration including, for example, a CPU 201, a ROM 202, a RAM 203, an HD 204, a hard disk drive (HDD) 205, a media drive 207, a display 208, and the like. The management system 50 further includes a network I/F 209, a keyboard 211, a mouse 212, a compact disc (CD)-ROM drive 214, a bus 210, and the like.

The CPU 201 is, for example, a processor that reads programs and data from the ROM 202, the HD 204, and the like and performs processes to implement the functions of the management system 50. The ROM 202 is, for example, a non-volatile memory that stores in advance programs and the like used to start the CPU 201, such as an IPL. The RAM 203 is a volatile memory used as a work area and the like of the CPU 201.

The HD 204 is, for example, a storage device that stores an OS, a program such as an application program, and various kinds of data. The HDD 205 controls reading and writing of various kinds of data from and to the HD 204 under control of the CPU 201. The display 208 is a display device on which various kinds of information such as a cursor, a menu, a window, a character, and an image are displayed.

The network I/F 209 is a communication interface for performing data communication by using the communication network 2. The keyboard 211 is an exemplary input device for accepting an input operation of a character, a numeric value, various instructions, and the like performed by a user. The mouse 212 is an exemplary pointing device for accepting an operation for selecting and executing various instructions, selecting a process target, or moving a cursor, performed by a user.

The media drive 207 controls, for example, reading and writing (storing) of data from and to a recording medium 206 such as a memory card. The CD-ROM drive 214 controls reading and writing of data from and to a CD-ROM 213 of any kind as an exemplary detachable recording medium. The bus 210 electrically connects each of the above components, and an address signal, a data signal, a variety of control signals, and the like are transmitted therethrough.

Note that the above-described hardware configuration of the management system 50 is merely an example. For example, the display 208, the keyboard 211, the mouse 212, and the like may be externally connected to the management system 50.

The above-described program for the management system 50 may be recorded in a file in an installable format or an executable format on a computer-readable recording medium such as the recording medium 206 or the CD-ROM 213 to be circulated. In addition, the above-described program for the management system 50 may be stored in the HD 204 or may be stored in advance in the ROM 202.

The relay apparatus 30 has substantially the same hardware configuration as the above-described management system 50, and therefore description thereof will be omitted. Note that a program for the relay apparatus 30 for controlling the relay apparatus 30 is recorded on the HD 204. Also in this case, the program for the relay apparatus 30 may be recorded in a file in an installable format or an executable format on a computer-readable recording medium such as the recording medium 206 or the CD-ROM 213 to be circulated.

The program providing apparatus 90 also has substantially the same hardware configuration as the above-described management system 50, and therefore description thereof will be omitted. Note that a program for providing a program for controlling the program providing apparatus 90 is recorded on the HD 204. Also in this case, the program for providing a program may be recorded in a file in an installable format or an executable format on a computer-readable recording medium such as the recording medium 206 or the CD-ROM 213 to be circulated.

As another example of the detachable recording medium, a computer-readable recording medium such as a compact disc recordable (CD-R), a digital versatile disk (DVD), or a Blu-ray Disc may be used to record and provide a program.

Functional Configurations

Figure 6:
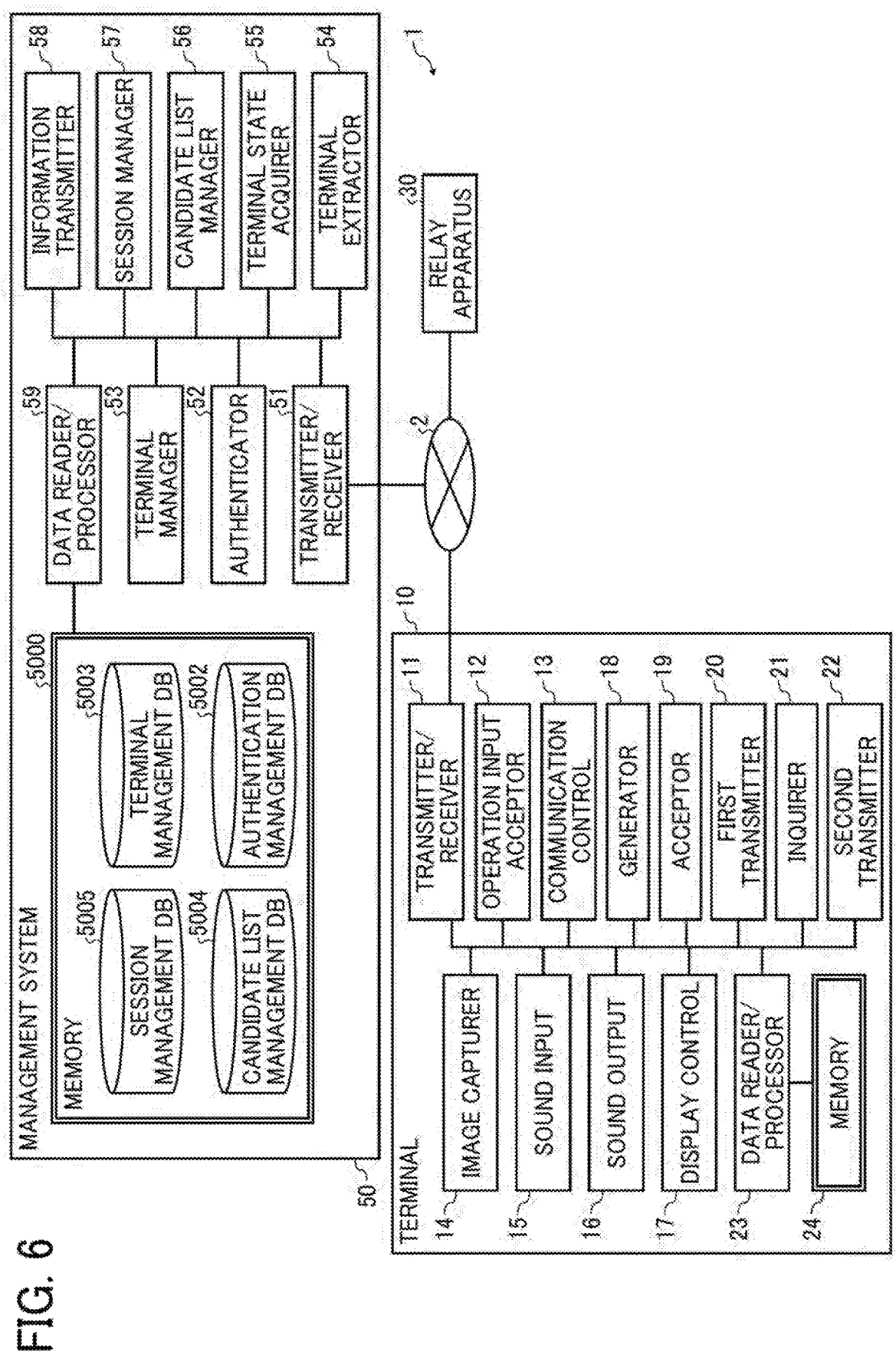
FIG. 6 is a diagram illustrating functional configurations of the terminal and the management system according to an embodiment.

FIG. 6 illustrates functional configurations of the terminal 10 and the management system 50 according to an embodiment. As illustrated in FIG. 6, the terminal 10, the relay apparatus 30, and the management system 50 are connected to one another via the communication network 2 so that communication can be performed. Note that the program providing apparatus 90 illustrated in FIG. 1 is omitted from FIG. 6 because it is not directly relevant to communication according to an embodiment.

Functional Configuration of Terminal

The terminal 10 includes a data transmitter/receiver 11, an operation input acceptor 12, a communication control 13, an image capturer 14, a sound input 15, a sound output 16, a display control 17, a generator 18, an acceptor 19, a first transmitter 20, an inquirer 21, a second transmitter 22, a data reader/processor 23, and the like. Each of the above functions is implemented by a terminal control program that is loaded from the flash memory 104 to the RAM 103 and executed by the CPU 101, for example. In addition, the terminal 10 further includes a memory 24 configured by the RAM 103, the flash memory 104, and the like.

Note that the data transmitter/receiver 11 may have the functions of the first transmitter 20 and the second transmitter 22.

The data transmitter/receiver 11 is implemented by, for example, a program executed by the CPU 101 illustrated in FIG. 4, the network I/F 111 illustrated in FIG. 4, and the like and transmits and receives various kinds of data, information, and the like to and from another terminal 10, an apparatus, or a system via the communication network 2. For example, the data transmitter/receiver 11 serves as a receiver that receives from the management system 50, terminal information (e.g., a candidate identifier or a terminal name) for designating another terminal 10 as a candidate communication counterpart of the terminal 10 (hereinafter the other terminal 10 as a candidate communication counterpart will be referred to as a candidate terminal) and state information indicating the operating state of the candidate terminal.

In addition, before starting a videoconference with a counterpart terminal, the data transmitter/receiver 11 according to an embodiment starts to receive from the management system 50, state information indicating the state of each terminal 10 as a candidate connection destination for a videoconference. The state information indicates not only the operating state of each terminal 10 as to whether the terminal 10 is online or offline but also the operating state as to whether the terminal 10 is online and capable of communicating or is online and currently communicating, or the like.

The operation input acceptor 12 is implemented by, for example, a program executed by the CPU 101 illustrated in FIG. 4, the operation key(s) 108 and the power switch 109 illustrated in FIG. 4, and the like and accepts various input operations performed by a user. For example, if a user switches on the power switch 109 illustrated in FIG. 4, the operation input acceptor 12 illustrated in FIG. 6 accepts the power on operation, and the power is controlled to be switched on. In addition, the operation input acceptor 12 accepts a calling operation and the like performed by a user through, for example, depressing or the like of the operation key(s) 108.

The communication control 13 is implemented by, for example, a program executed by the CPU 101 illustrated in FIG. 4. For example, in response to acceptance of the above power on operation, the communication control 13 automatically transmits login request information for requesting login and the current IP address of the request sender terminal from the data transmitter/receiver 11 to the management system 50 via the communication network 2. In addition, if a user switches off the power switch 109 from the state in which the power was on, the data transmitter/receiver 11 transmits to the management system 50, state information for switching off the power, and then the operation input acceptor 12 switches off the power. Thus, the management system 50 can acquire the information that the terminal 10 has been switched off from the state in which the power was on.

In addition, the communication control 13 controls communication in various manners, such as establishing and ending a communication session in which content data is transmitted and received to and from another terminal 10 through the relay apparatus 30.

The image capturer 14 is implemented by, for example, a program executed by the CPU 101 illustrated in FIG. 4, the camera 112 and the image sensor I/F 113 illustrated in FIG. 4, and the like and captures an image of a subject and outputs image data obtained by capturing the image.

The sound input 15 is implemented by, for example, a program executed by the CPU 101 illustrated in FIG. 4, the sound input/output I/F 116 illustrated in FIG. 4, and the like and inputs sound data related to a voice signal that has been obtained by conversion of a voice of a user performed by the microphone 114.

The sound output 16 is implemented by, for example, a program executed by the CPU 101 illustrated in FIG. 4, the sound input/output I/F 116 illustrated in FIG. 4, and the like and outputs a voice signal related to sound data to the speaker 115 to output the sound from the speaker 115.

The display control 17 is implemented by, for example, a program executed by the CPU 101 illustrated in FIG. 4, the display I/F 117 illustrated in FIG. 4, and the like and causes image data to be displayed on the display 120. For example, the display control 17 causes a candidate list that is a list of candidate terminals, which are candidate communication counterparts of the terminal 10, to be displayed on a display unit such as the display 120 in such a manner that any one of the candidate terminals can be selected.

The candidate list preferably includes terminal information (e.g., identifiers and terminal names) for designating the candidate terminals, state information indicating the operating states of the candidate terminals, and the like.

The generator 18 is implemented by, for example, a program executed by the CPU 101 illustrated in FIG. 4 and generates the candidate list that is a list of candidate terminals including terminal information and state information of the candidate terminals received by the data transmitter/receiver 11.

The acceptor 19 is implemented by, for example, a program executed by the CPU 101 illustrated in FIG. 4 and accepts an operation of starting communication (input operation of an identifier) using the terminal information of a counterpart terminal (e.g., an identifier for identifying a counterpart terminal) serving as a communication counterpart (request destination).

The first transmitter 20 is implemented by a program executed by the CPU 101 illustrated in FIG. 4. If the candidate list generated by the generator 18 includes the terminal information of a counterpart terminal accepted by the acceptor 19, based on the state information of the counterpart terminal, the first transmitter 20 transmits to the management system 50, first request information for requesting the management system 50 to start communication.

The first request information transmitted from the first transmitter 20 includes destination information indicating that the destination of the first request information is the management system 50 (e.g., the IP address of the management system 50).

Examples of the operating state of the terminal 10 include "online (communicating)", "online (capable of communicating)", "offline", and the like. The operating state "online (capable of communicating)" represents a state in which the terminal 10 has logged in to the management system 50 and is not communicating (e.g., not performing a videoconference or the like). The operating state "online (communicating)" represents a state in which the terminal 10 has logged in to the management system 50 and is currently communicating. The operating state "offline" represents a state in which the terminal 10 is incapable of communicating (e.g., the terminal 10 has not logged in to the management system 50).

For example, if the state of the counterpart terminal is "online (capable of communicating)" (hereinafter simply represented as "capable of communicating"), the first transmitter 20 transmits to the management system 50, start request information for requesting the start of communication with the counterpart terminal.

For example, if the state of the counterpart terminal is "online (communicating)" (hereinafter simply represented as "communicating"), the first transmitter 20 transmits to the management system 50, participation request information for requesting participation in communication (communication session) that is currently performed by the counterpart terminal.

For example, if the state of the counterpart terminal is "offline", the first transmitter 20, for example, suspends transmission of any request information to the management system 50.

The inquirer 21 is implemented by a program executed by the CPU 101 illustrated in FIG. 4. For example, if the candidate list generated by the generator 18 does not include the terminal information of the counterpart terminal accepted by the acceptor 19, the inquirer 21 makes an inquiry to the management system 50 about whether the accepted terminal information is terminal information available in the management system 50. Note that the terminal information available in the management system 50 is, for example, information about a terminal that is permitted to communicate and that has been registered in the management system 50.

The second transmitter 22 is implemented by a program executed by the CPU 101 illustrated in FIG. 4. If the candidate list generated by the generator 18 does not include the terminal information of the counterpart terminal accepted by the acceptor 19, the second transmitter 22 transmits, for example, to the management system 50, second request information for requesting the counterpart terminal to start communication.

The second request information transmitted from the second transmitter 22 includes destination information indicating that the destination of the second request information is the counterpart terminal (e.g., the identifier of the counterpart terminal).

The data reader/processor 23 is implemented by a program executed by the CPU 101 illustrated in FIG. 4, the SSD 105 illustrated in FIG. 4, and the like and performs processing of causing various kinds of data to be stored in the memory 24 and reading the various kinds of data from the memory 24.

The memory 24 is implemented by, for example, the flash memory 104 and the RAM 103 illustrated in FIG. 4, a program executed by the CPU 101 illustrated in FIG. 4, and the like and stores, for example, information such as an identifier for identifying the terminal 10 and a password.

In addition, the memory 24 is also used as, for example, a reception buffer of image data and sound data received when performing a videoconference with the counterpart terminal.

Functional Configuration of Management System

The management system 50 includes a data transmitter/receiver 51, an authenticator 52, a terminal manager 53, a terminal extractor 54, a terminal state acquirer 55, a candidate list manager 56, a session manager 57, an information transmitter 58, a data reader/processor 59, and the like. Each of the above functions is implemented in accordance with a communication-management program that is loaded from the HD 204 to the RAM 203 and executed by the CPU 201. In addition, the management system 50 further includes a memory 5000 configured by the HD 204 and the like. Note that the data transmitter/receiver 51 may have the function of the information transmitter 58.

Now, information stored in the memory 5000 and managed by the management system 50 will be described. FIGS. 7A to 8B illustrate exemplary information managed by the management system 50 according to an embodiment.

Authentication Management Table

FIG. 7A illustrates an exemplary authentication management table. In the memory 5000, for example, an authentication management database (DB) 5002 including an authentication management table 701 illustrated in FIG. 7A is configured. In the authentication management table 701, identifiers for identifying the respective terminals 10 managed by the management system 50 are managed in association with the respective passwords. For example, the authentication management table 701 illustrated in FIG. 7A indicates that the password corresponding to an identifier "01aa" is "aaaa".

Candidate List Management Table

FIG. 7B illustrates an exemplary candidate list management table. In the memory 5000, for example, a candidate list management DB 5004 including a candidate list management table 702 illustrated in FIG. 7B is configured. In the candidate list management table 702, request sender identifiers that are the identifiers of request sender terminals are managed in association with candidate identifiers that are the identifiers of candidate counterpart terminals. Here, a request sender terminal is a terminal 10 serving as a sender of request information for requesting the start of communication for a videoconference. In addition, a candidate counterpart terminal is a terminal 10 that can be set as the destination to which the request sender terminal can transmit the request information and that has been registered as a candidate counterpart.

Note that the identifiers include terminal identifiers (IDs) for identifying the terminals, user IDs for identifying users, and the like.

That is, any one of the IDs described above is an example of identification information identifying the device or terminal, or the user operating the device or terminal. In alternative to the device ID or terminal ID for identifying a specific device, a manufacturing number may be used as identification information for identifying the device or terminal. In alternative to the user name identifying a specific user, any user name capable of identifying the user such as a user's nickname may be registered.

For example, the example illustrated in FIG. 7B indicates that candidate counterpart terminals to which the terminal 10 whose identifier is "01aa" can request the start of a videoconference are terminals 10 whose identifiers are "01ab", "01ba", "01db", "01dc", "01ca", and "01cb". A candidate counterpart terminal is, for example, added or deleted in accordance with a request from the terminal 10 to the management system 50.

Terminal Management Table

FIG. 8A illustrates an exemplary terminal management table. In the memory 5000, for example, a terminal management DB 5003 including a terminal management table 801 illustrated in FIG. 8A is configured.

In the terminal management table 801, the names of the terminals 10 (hereinafter referred to as "terminal names"), the operating states of the terminals 10, the reception date and time, and the IP addresses of the terminals 10 are managed in association with one another according to the identifier of each terminal 10. The reception date and time represents the date and time at which the management system 50 received login request information for logging in to the communication system 1.

For example, the terminal management table 801 illustrated in FIG. 8A indicates that a terminal 10 whose identifier is "01aa" has a terminal name "Japan, Tokyo Office, Terminal AA" at the operating state "online (communicating)". In addition, the terminal management table 801 also indicates that the date and time at which the management system 50 received login request information is "20xx, November 10, 13:40" and that the IP address of the terminal 10 is "1.2.1.3".

Here, the identifier in the terminal management table 801 is uniquely assigned when a terminal 10 is registered in the communication system 1, and the terminal name is registered or changed by an administrator of the management system 50. Note that the terminal name may be registered or changed in accordance with a request from a terminal 10 to the management system 50.

Session Management Table

A session management DB 5005 stored in the memory 5000 of the management system 50 includes, for example, a session management table 802 illustrated in FIG. 8B. In the session management table 802, information is stored, such as a relay apparatus ID that is an identifier for identifying the relay apparatus 30, request sender identifiers, candidate identifiers, and participant identifiers according to the session ID that is the identifier of a communication session.

Note that the request sender identifiers are the identifiers of request sender terminals that request the start of a communication session for a videoconference or the like, the candidate identifiers are the identifiers of counterpart terminals that are requested to start the videoconference. The participant identifiers are the identifiers of one or more participation request terminals that request participation in a communication session (established session) for, for example, an active videoconference.

For example, the session management table 802 illustrated in FIG. 8B indicates that a terminal whose identifier is "01aa", a terminal whose identifier is "01db", and a terminal whose identifier is "01dc" are participating in a session whose session ID is "se1".

Referring back to FIG. 6, the functional configuration of the management system 50 will be further described.

The data transmitter/receiver 51 is implemented by, for example, the network I/F 209 illustrated in FIG. 5, a program executed by the CPU 201 illustrated in FIG. 5, and the like and transmits and receives various kinds of data and information to and from another terminal 10 or an apparatus via the communication network 2.

The data transmitter/receiver 51 transmits to the terminal 10, the terminal information of a candidate terminal(s), which is a candidate communication counterpart terminal of the terminal 10, and the state information representing the operating state(s) and the like of the candidate terminal(s). Each time the operating state of a candidate terminal is changed, the data transmitter/receiver 51 transmits the latest state information to the terminal 10.

The authenticator 52 is implemented by, for example, a program executed by the CPU 201 illustrated in FIG. 5. The authenticator 52 searches the authentication management table 701 included in the authentication management DB 5002 in the memory 5000 by using, as a search key, an identifier and a password included in the login request information received through the data transmitter/receiver 51. In addition, the authenticator 52 determines whether the identifier and the password included in the login request information are managed in the authentication management DB 5002 to authenticate the terminal 10.

The terminal manager 53 is implemented by, for example, a program executed by the CPU 201 illustrated in FIG. 5. The terminal manager 53 manages the operating state of the terminal 10 that has logged in to the management system 50. The terminal manager 53 stores and manages, for example, the operating state, the reception date and time at which the management system 50 received the login request information, and the IP address in the terminal management table 801 included in the terminal management DB 5003 in association with the identifier of a request sender terminal. For example, if a user switches off the power switch 109 of the terminal 10 from the state in which the power was on, on the basis of the state information for switching off the power transmitted from the terminal 10, the terminal manager 53 changes the operating state of the terminal 10 in the terminal management table 801 from online to offline.

The terminal extractor 54 is implemented by, for example, a program executed by the CPU 201 illustrated in FIG. 5. The terminal extractor 54 searches the candidate list management table 702 included in the candidate list management DB 5004 by using, as a search key, the identifier of the request sender terminal that has requested login, and extracts the identifiers of candidate counterpart terminals of the request sender terminal.

The terminal extractor 54 also searches the candidate list management table 702 by using, as a search key, the identifier of the request sender terminal that has requested login, and extracts the identifier of a different request sender terminal for which the request sender terminal has been registered as a candidate counterpart terminal.

The terminal state acquirer 55 is implemented by, for example, a program executed by the CPU 201 illustrated in FIG. 5. The terminal state acquirer 55 searches the terminal management table 801 included in the terminal management DB 5003 by using, as search keys, the identifiers of the candidate counterpart terminals extracted by the terminal extractor 54 and reads the operating state for each of the extracted identifiers.

Thus, the terminal state acquirer 55 can acquire the operating states of the candidate counterpart terminals of the request sender terminal that has requested login. In addition, the terminal state acquirer 55 searches the terminal management DB 5003 by using the identifiers extracted by the terminal extractor 54 as search keys and acquires the operating state of the request sender terminal that has requested login.

The candidate list manager 56 is implemented by, for example, a program executed by the CPU 201 illustrated in FIG. 5 and manages, for example, the candidate list management table 702 illustrated in FIG. 7B stored in the candidate list management DB 5004. For example, the candidate list manager 56 registers a candidate identifier in accordance with a request for registration in the candidate list management table 702, the request having been received from the terminal 10. In addition, the candidate list manager 56 deletes a candidate identifier in accordance with a request for deletion from the candidate list management table 702, the request having been received from the terminal 10.

The session manager 57 is implemented by, for example, a program executed by the CPU 201 illustrated in FIG. 5 and manages communication (communication session) for transmitting and receiving content data between the plurality of terminals 10 in the communication system 1. For example, the session manager 57 generates a session ID that is an identifier for identifying a communication session at the time of starting the communication session. In addition, the session manager 57 stores and manages information in the session management table 802 included in the session management DB 5005, such as the identifier of a terminal 10 that participates in the communication session and the relay apparatus ID of the relay apparatus 30, in association with the generated session ID.

The data reader/processor 59 is implemented by, for example, a program executed by the HDD 205 illustrated in FIG. 5 and the CPU 201 illustrated in FIG. 5, and the like and, for example, causes various kinds of data to be stored in the memory 5000 and reads the various kinds of data from the memory 5000.

Relay Apparatus

The relay apparatus 30 relays transmission and reception of content data between a plurality of terminals 10 in a videoconference performed between the terminals 10. For example, on the basis of the session ID that is transmitted from the management system 50, the relay apparatus 30 causes a terminal 10 having the same session ID to participate in the same session. Thus, terminals 10 having the same session ID can transmit and receive content data through the relay apparatus 30.

Operation of Communication System

Next, operation performed by the communication system 1 will be described.

Preparatory Process

FIG. 9 illustrates a sequence of an exemplary preparatory process according to an embodiment. This process represents an exemplary preparatory process in which a preparatory state is set for the terminal 10aa to be capable of participating in a videoconference in the communication system 1.

Note that, in FIG. 9, information is transmitted and received by using the management-data session sei illustrated in FIG. 2, for example. In addition, the following description will be given by assuming that, in FIG. 9, the identifier of the terminal 10aa is "01aa", the identifier of the terminal 10ba is "01ba", and the identifier of the terminal 10db is "01db".

In step S21, a user of the terminal 10aa switches on the power switch 109 of the terminal 10aa, and upon the power on operation being accepted, the operation input acceptor 12 controls the power of the terminal 10aa to be switched on.

In step S22, in response to acceptance of the power on operation, the communication control 13 transmits login request information for requesting login from the data transmitter/receiver 11 of the terminal 10aa to the management system 50 via the communication network 2. The login request information includes a request sender identifier for identifying the terminal 10aa that requests login and a password. The request sender identifier and the password are read from the memory 24 through the data reader/processor 23.

Note that, if the management system 50 receives the login request information transmitted from the terminal 10aa, the management system 50 can acquire the IP address of the terminal 10aa that has transmitted the login request information.

In step S23, the authenticator 52 of the management system 50 performs terminal authentication by using, as search keys, the identifier and the password included in the login request information received through the data transmitter/receiver 51. The authenticator 52 searches the authentication management table 701 included in the authentication management DB 5002 in the memory 5000 and determines whether the same identifier and password as the search keys are managed in the authentication management DB 5002 to perform terminal authentication.

Now, a case will be described in which the authenticator 52 determines that the same identifier and password as the search keys are not managed, that is, the authenticator 52 determines that the login request is not from a terminal 10 having a legitimate use authority. In this case, the data transmitter/receiver 51 transmits authentication result information representing the authentication result obtained by the authenticator 52 to the terminal 10aa, which has requested login, via the communication network 2, and the preparatory process ends.

On the other hand, a case will be described in which the authenticator 52 determines that the same identifier and password as the search keys are managed, that is, the authenticator 52 determines that the login request is from a terminal 10 having a legitimate use authority. In this case, in step S24, the terminal manager 53 stores the identifier, the IP address, and the operating state of the terminal 10aa, the reception date and time, and the like in association with one another in the terminal management table 801 included in the terminal management DB 5003.

Thus, it is possible to manage the identifier "01aa", the IP address of the terminal 10aa "1.2.1.3", the operating state "online (communicating)", the reception date and time "20xx.11.10 13:40 (year/month/day, time)" in association with one another in the terminal management table 801. Note that, the identifier, the IP address, and the like may be associated with one another in advance in the terminal management table 801, and the operating state, the reception date and time, and a participant may be associated with one another as necessary.

In step S25, the data transmitter/receiver 51 of the management system 50 transmits the authentication result information representing the authentication result obtained by the authenticator 52 to the terminal 10aa, which has requested login, via the communication network 2.

In step S26, the terminal extractor 54 of the management system 50 searches the candidate list management table 702 included in the candidate list management DB 5004 by using the identifier "01aa" of the terminal 10aa as a search key and extracts the identifiers of candidate counterpart terminals of the terminal 10aa.

In this example, the identifiers "01ab", "01ba, "01db", "01dc", "01ca", and "01cb" of the terminals 10ab, 10ba, 10db, 10dc, 10ca, and 10cb, respectively, serving as the candidate counterpart terminals of the terminal 10aa whose identifier is "01aa" are extracted.

In step S27, the terminal state acquirer 55 of the management system 50 sets the identifiers "01ab", "01ba, "01db", "01dc", "01ca", and "01cb" of the candidate counterpart terminals extracted by the terminal extractor 54 as search keys. By using the search keys, the terminal state acquirer 55 searches the terminal management table 801 included in the terminal management DB 5003 and reads operating states "offline", "online (capable of communicating)", and "online (communicating)" for each identifier extracted by the terminal extractor 54. Thus, the operating states of the terminals 10ab, 10ba, 10db, 10dc, 10ca, and 10cb can be acquired. Note that the terminal state acquirer 55 monitors the terminal management DB 5003 and acquires the operating state each time the operating state of a terminal is changed.

In step S28, the data transmitter/receiver 51 of the management system 50 transmits the state information of the candidate counterpart terminals to the terminal 10aa via the communication network 2. The state information of the candidate counterpart terminals includes, for example, the identifiers "01ab", "01ba, "01db", "01dc", "01ca", and "01cb" used as search keys in step S27, the state information representing the operating state of each of the terminals 10, and the like. For example, in addition to the identifiers of the candidate counterpart terminals, the state information may further include the terminal names of the candidate counterpart terminals, which may be displayed on the candidate list of FIG. 10.

Thus, the terminal 10aa can acquire the current operating states "offline", "online (capable of communicating)", and "online (communicating)" of the terminals 10ab, 10ba, 10db, 10dc, 10ca, and 10cb, which are candidate counterpart terminals.

In step S29, the terminal extractor 54 of the management system 50 sets the identifier "01aa" of the terminal 10aa, which has requested login, as a search key. By using the search key, the terminal extractor 54 searches the candidate list management table 702 included in the candidate list management DB 5004 and extracts the identifiers of other terminals for which the identifier "01aa" of the terminal 10aa has been registered as a candidate counterpart terminal. For example, in the candidate list management table 702 illustrated in FIG. 7B, the extracted identifiers are "01ab", "01ba", and "01db".

In step S30, the terminal manager 53 of the management system 50 sets the identifier "01aa" of the terminal 10aa, which has requested login, as a search key. By using the search key, the terminal manager 53 searches the terminal management table 801 included in the terminal management DB 5003 and acquires the operating state "online (capable of communicating)" of the terminal 10aa, which has requested login.

In steps S31-1 and S31-2, the data transmitter/receiver 51 of the management system 50 extracts, from among the identifiers extracted in step S29, for example, the identifier(s) of terminal(s) 10 whose operating state is online according to the terminal management table 801 illustrated in FIG. 8A. In addition, the data transmitter/receiver 51 transmits the state information including the identifier of the request sender terminal (the terminal 10aa) and an operating state "online (capable of communicating)" to the terminal(s) 10 (e.g., the terminal 10ba and the terminal 10db) corresponding to the designated identifier(s).

Note that, when transmitting the state information to the terminals 10ba and 10db, based on the identifiers "01ba" and "01db", the data transmitter/receiver 51 refers to the IP address of each of the terminals 10 managed in the terminal management table 801.

Thus, the identifier "01aa" and the operating state "online (capable of communicating)" of the terminal 10aa, which has requested login, can be transmitted to the terminals 10db and 10ba that can designate the terminal 10aa, which has requested login, as a counterpart terminal and can communicate with the terminal 10aa.

Through the above process, the generator 18 of the terminal 10 acquires information (e.g., the identifiers, the terminal names, and the operating states) of candidate terminals that is necessary to generate a candidate list, the state information representing the operating states of the candidate terminals, and the like and generates a candidate list by using the acquired information.

Upon the candidate list being generated, the display control 17 of the terminal 10 causes the generated candidate list to be displayed on a display unit (e.g., the display 120) of the terminal 10. An exemplary candidate list displayed on the display unit at this time is illustrated in FIG. 10.

Figure 10:
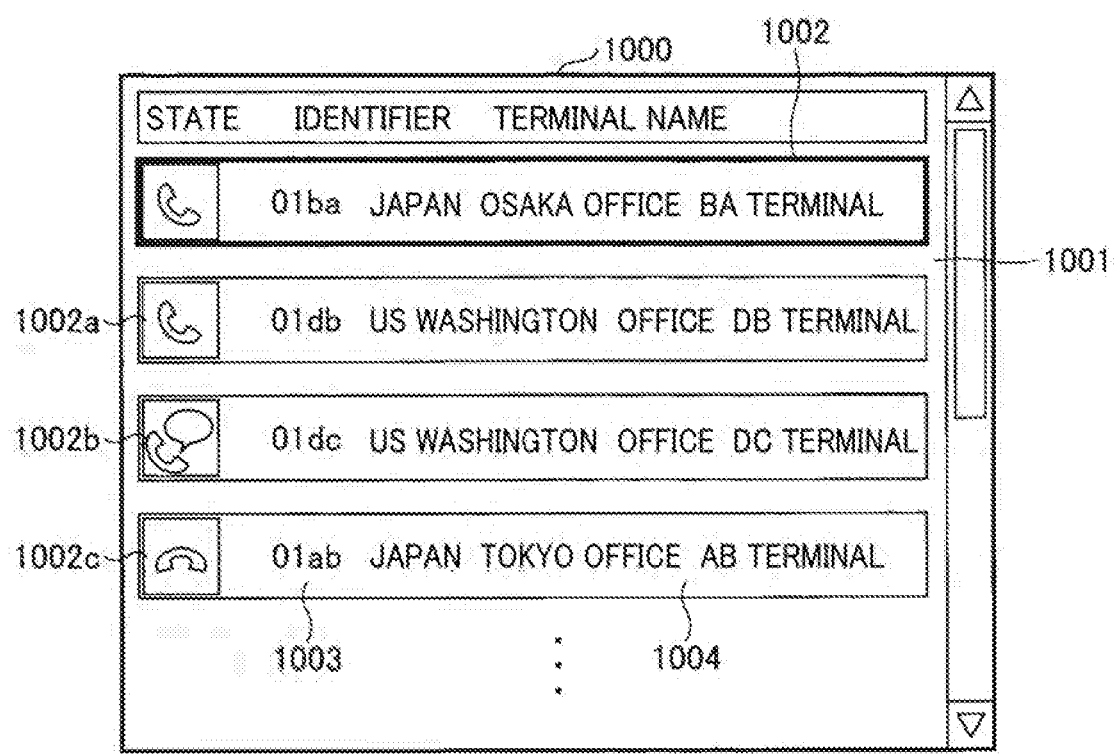
FIG. 10 illustrates an exemplary candidate list according to an embodiment.

FIG. 10 illustrates an exemplary candidate list according to an embodiment. In the example illustrated in FIG. 10, in a candidate list 1001 displayed on a display unit 1000, a plurality of selection keys 1002 for selecting a counterpart terminal as a communication counterpart are displayed. The selection keys 1002 include icons 1002a to 1002c that reflect the state information, identifiers 1003 and terminal names 1004 of the counterpart terminals, and the like. Note that the identifier 1003 and the terminal name 1004 of each counterpart terminal is exemplary terminal information of the counterpart terminal.

The icons are, for example, the icon 1002a representing a state of being capable of communicating, the icon 1002b representing a state of currently communicating, the icon 1002c representing a state of being offline and incapable of communicating, and the like. If the operating state of a counterpart terminal is "online (capable of communicating)", the generator 18 assigns the icon 1002a to the counterpart terminal. If the operating state of a counterpart terminal is "online (communicating)", the generator 18 assigns the icon 1002b to the counterpart terminal. If the operating state of a counterpart terminal is "offline", the generator 18 assigns the icon 1002c to the counterpart terminal.

In addition, in the candidate list 1001 illustrated in FIG. 10, for example, the selection key 1002 of the terminal 10ba whose identifier is "01ba" displayed on top receives focus, and the selection key 1002 of the terminal 10ba is displayed in a bold frame (exemplary display component).

Note that the focus represents a state in which, for example, a display component or the like is selectable on an operation screen of a computer or the like. In an embodiment, "receiving focus" means, for example, displaying a candidate identifier of a terminal 10 selected as a communication counterpart from the candidate list 1001 displayed by the display control 17 to be distinguishable by using a display component such as a bold frame or a cursor, or highlighting. Thus, upon acceptance of a user's calling operation for an instruction to start communication, the terminal 10 starts a process for calling the counterpart that receives focus in the candidate list. Note that the focus is an exemplary method for displaying a candidate identifier in a distinguishable manner in the candidate list, indicating that a terminal is selected as a communication counterpart. The method for displaying a selected candidate identifier in a distinguishable manner is not limited to the focus and may be color changing, bolding, blinking, or the like so as to display the selected candidate identifier to be distinguishable from the other identifiers.

In addition, displaying in a distinguishable (emphasized) manner means displaying the accepted identifier in such a manner that it is understood that the identifier is included in the list. Thus, for example, the identifier itself may be displayed to be distinguishable, or a message such as "included in list" may be displayed to be distinguishable.

First Embodiment

Next, operation of controlling communication performed by a terminal 10 according to a first embodiment will be described. A user of the terminal 10 can, for example, select a communication counterpart terminal from the candidate list 1001 illustrated in FIG. 10 and can perform a calling operation.

In the related art, for example, a communication method is considered for starting communication by directly inputting the terminal information of a counterpart terminal by using a communication protocol such as the Session Initiation Protocol (SIP).

However, in the related art, in the communication system 1 in which communication with a terminal 10 serving as a communication counterpart is started by using a candidate list, it has not been possible to perform a calling operation for a terminal 10 that is not registered in the candidate list in the same manner as that for a terminal 10 that has been registered in the candidate list.

In this embodiment, in the communication system 1 in which communication with a terminal 10 serving as a communication counterpart is started by using a candidate list, an exemplary communication method for performing a calling operation for a terminal 10 that is not registered in the candidate list in the same manner as that for a terminal 10 that has been registered in the candidate list will be described.

Terminal Calling Process

Figure 11B:
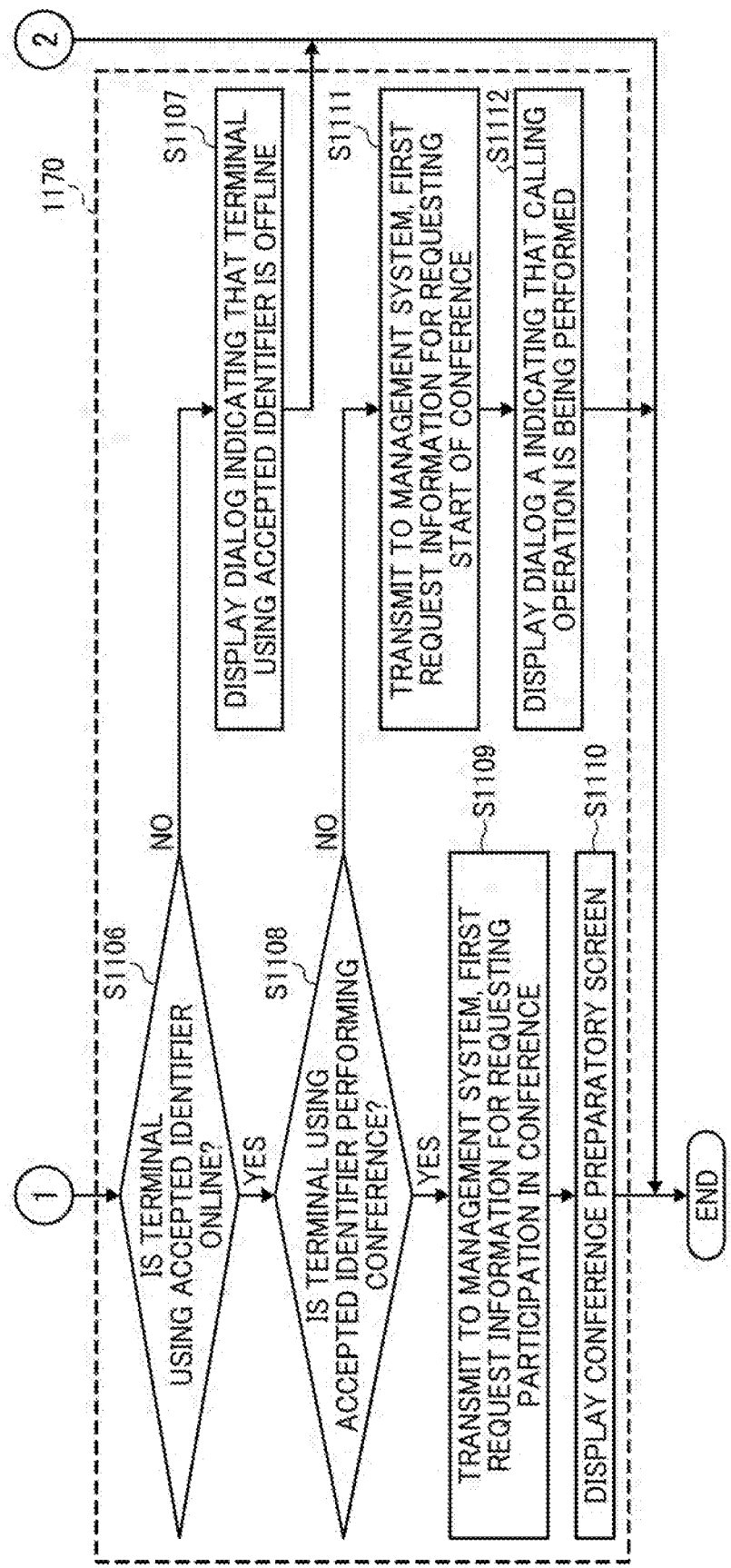

FIG. 11 is a flowchart of an exemplary terminal calling process according to the first embodiment.

Figure 13A:
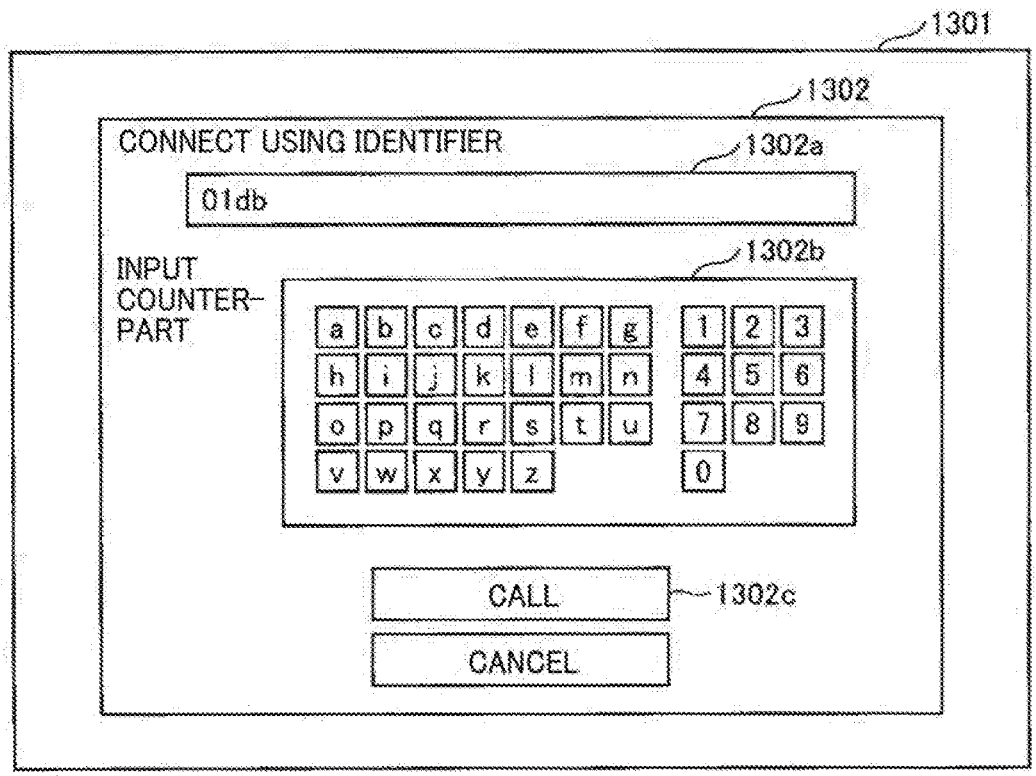
FIGS. 13A to 13D each illustrate an exemplary display screen of the terminal according to the first embodiment.

In step S1101, upon a predetermined operation performed by a user being accepted, the acceptor 19 of the terminal 10 causes, for example, an identifier-based calling screen 1302 illustrated in FIG. 13A to be displayed on a display unit 1301, such as the display 120.

In the example illustrated in FIG. 13A, the identifier-based calling screen 1302 is displayed on the display unit 1301 of the terminal 10. The identifier-based calling screen 1302 includes an identifier input box 1302a, a software keyboard 1302b for inputting an identifier, a "call" key 1302c, a "cancel" key, and the like.

Into the identifier input box 1302a, a user inputs the identifier of a counterpart terminal with which the user wishes to communicate by using the software keyboard 1302b and selects the "call" key 1302c, thereby performing a calling operation for the counterpart terminal.

In step S1102 in FIG. 11, the acceptor 19 of the terminal 10 accepts, for example, the calling operation performed by a user by using an identifier on the identifier-based calling screen 1302 illustrated in FIG. 13A.

In step S1103, the acceptor 19 of the terminal 10 determines whether the identifier (the terminal information of the counterpart terminal) accepted in step S1102 is the identifier of the terminal 10 that has accepted the calling operation (referred to as the "own terminal 10").

If it is determined that the accepted identifier is not the identifier of the own terminal 10, the terminal 10 performs the process in and after step S1105. On the other hand, if it is determined that the accepted identifier is the identifier of the own terminal 10, the acceptor 19 of the terminal 10 proceeds to step S1104.

Figure 13B:
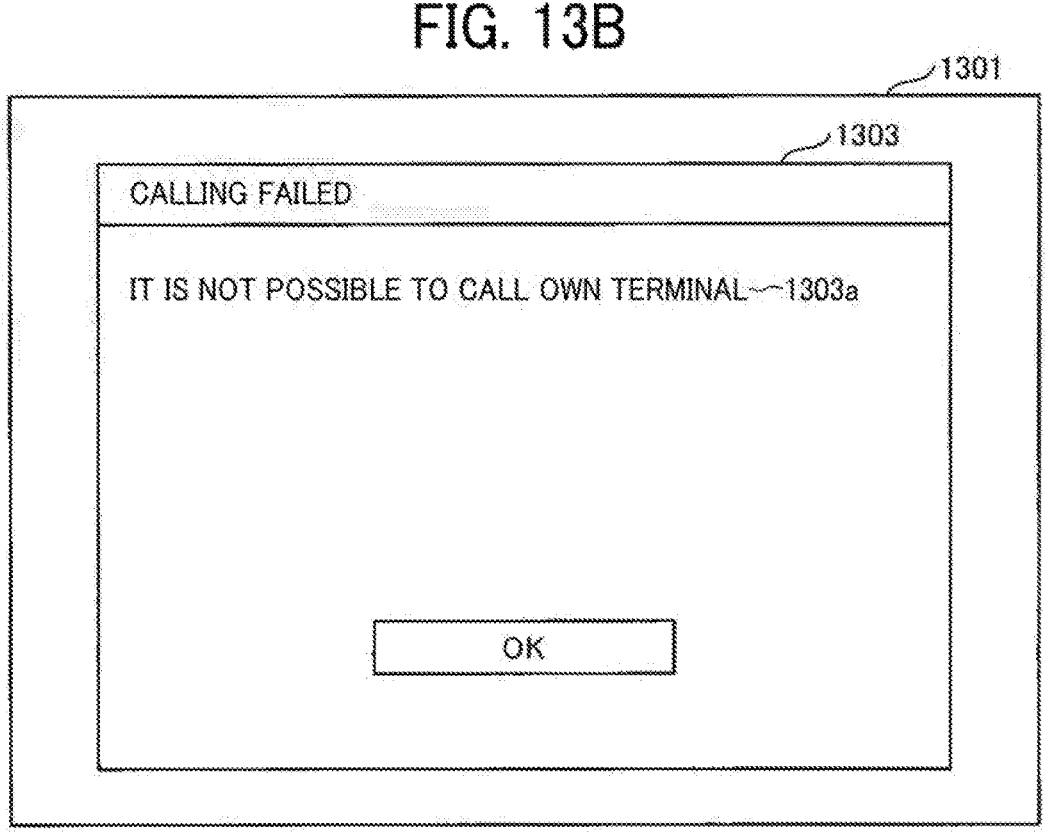

In step S1104, the display control 17 of the terminal 10 causes, for example, a dialog 1303 illustrated in FIG. 13B to be displayed on the display unit 1301, the dialog 1303 indicating that the accepted identifier is the identifier of the own terminal 10.

In the example illustrated in FIG. 13B, the dialog 1303 includes, for example, a message 1303a indicating that the accepted identifier is the identifier of the own terminal 10 and that calling is not possible.

Through this process, the terminal 10 can skip the process in and after step S1105 if a calling operation for the identifier of the terminal 10 is accepted, and the terminal 10 can immediately notify a user that calling is not possible.

In step S1105, the acceptor 19 of the terminal 10 determines whether the accepted identifier is a candidate identifier (or is present (included) in the candidate list 1001 displayed on the display unit 1301 by the display control 17).

Note that, although an example in which the terminal 10 determines in step S1105 whether the accepted identifier is the candidate identifier or is present (included) in the candidate list 1001 is described, the accepted identifier can be transmitted to the management system 50, and the management system 50 can determine whether the accepted identifier is the candidate identifier.

If the accepted identifier is not the candidate identifier, the terminal 10 proceeds to step S1113. On the other hand, if the accepted identifier is the candidate identifier, the terminal 10 proceeds to step S1106.

In this embodiment, if it is determined that the accepted identifier is the candidate identifier, on the basis of the state information of a terminal 10 received by the data transmitter/receiver 11 from the management system 50, the first transmitter 20 of the terminal 10 performs a request process 1170 in steps S1106 to S1112.

In step S1106, the first transmitter 20 of the terminal 10 determines whether the operating state of the terminal 10 using the accepted candidate identifier (candidate terminal) is an "online" state. If the operating state of the candidate terminal is not an "online" state, the first transmitter 20 proceeds to step S1107. On the other hand, if the operating state of the candidate terminal is an "online" state, the first transmitter 20 proceeds to step S1108.

Figure 13C:
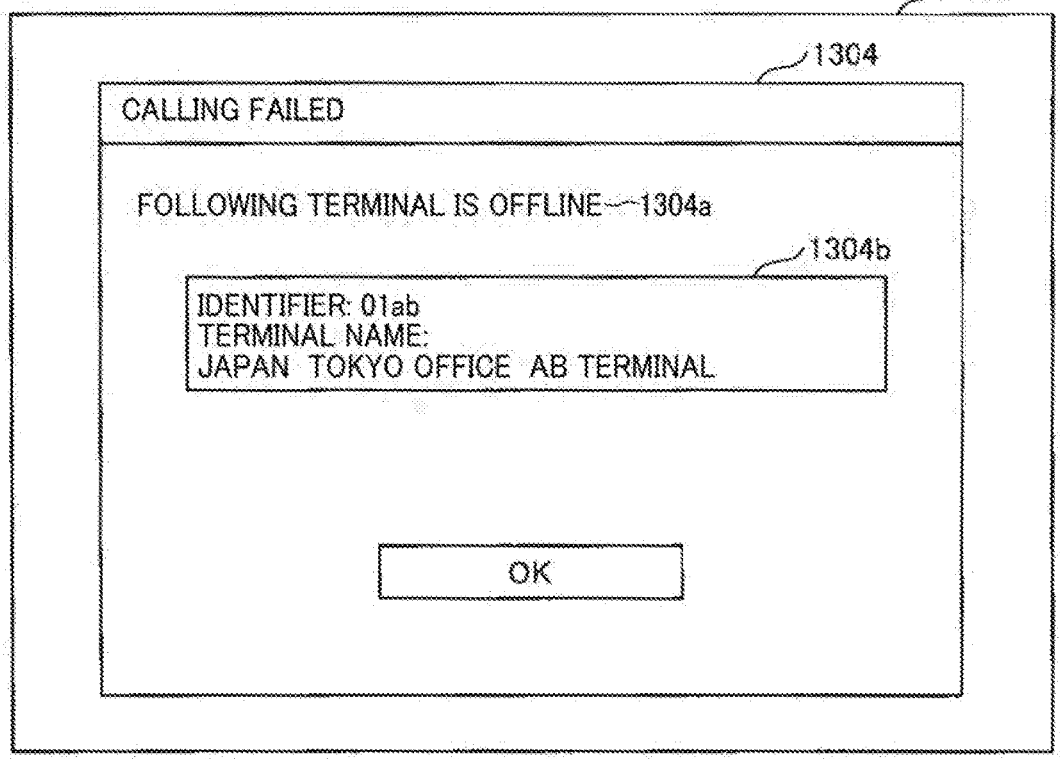

In step S1107, the display control 17 of the terminal 10 causes, for example, a dialog (exemplary display screen) 1304 illustrated in FIG. 13C to be displayed on the display unit 1301, the dialog 1304 indicating that the candidate terminal is offline.

In the example in FIG. 13C, the dialog 1304 includes a message 1304a indicating that the candidate terminal is offline, information 1304b about the candidate terminal, and the like. Referring to the dialog 1304, a user can determine that the counterpart terminal with which the user wishes to communicate is offline and can determine the terminal name and the like of the counterpart terminal.

In step S1108 in FIG. 11, the first transmitter 20 of the terminal 10 determines whether the candidate terminal is performing a conference. For example, if the operating state of the candidate terminal is "communicating", the first transmitter 20 determines that the candidate terminal is performing a conference; if the operating state thereof is "capable of communicating", the first transmitter 20 determines that the candidate terminal is not performing a conference.

If it is determined that the candidate terminal is performing a conference, that is, if the operating state thereof is "communicating", the first transmitter 20 proceeds to step S1109. On the other hand, if it is determined that the candidate terminal is not performing a conference, that is, if the operating state thereof is "capable of communicating", the first transmitter 20 proceeds to step S1111.

In step S1109, the first transmitter 20 of the terminal 10 transmits, for example, to the management system 50 through the communication control 13, first request information (participation request information) for requesting participation in the conference (communication session) performed by the candidate terminal.

Note that the first request information is information used by the terminal 10 serving as a request sender to notify the management system 50 of a request and includes destination information (e.g., the IP address of the management system 50) indicating that the destination of the first request information is the management system 50.

Figure 13D:
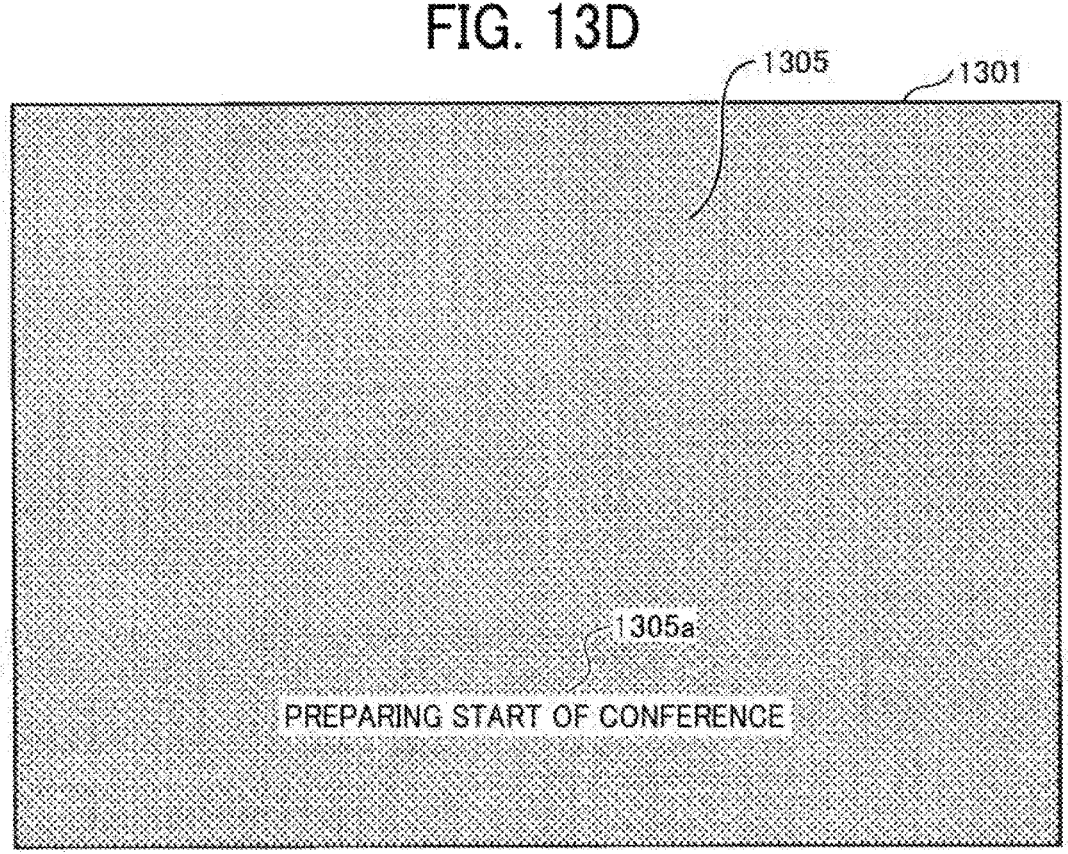

In step S1110, the display control 17 of the terminal 10 causes, for example, a conference preparatory screen (communication preparatory screen) 1305 illustrated in FIG. 13D to be displayed on the display unit 1301.

In the example in FIG. 13D, a message 1305a indicating that the start of a conference is being prepared is displayed on the conference preparatory screen 1305. In this manner, upon the first request information (participation request information) being transmitted to the management system 50, the terminal 10, for example, starts to prepare a conference without a user's confirmation. This conference preparatory screen 1305 is displayed until, for example, a communication session with the counterpart terminal is established. Thus, if, for example, the communication session is immediately established, the terminal 10 may skip the displaying of the conference preparatory screen 1305 illustrated in FIG. 13D and may display a conference screen (communication screen) on the display unit 1301.

In step S1111, the first transmitter 20 of the terminal 10 transmits, for example, to the management system 50 through the communication control 13, the first request information (start request information) for requesting the start of a conference (communication) with the terminal 10 using the accepted candidate identifier. The first request information (start request information) includes, like the above-described first request information (participation request information), the destination information indicating that the destination of the first request information is the management system 50.

Figure 14A:
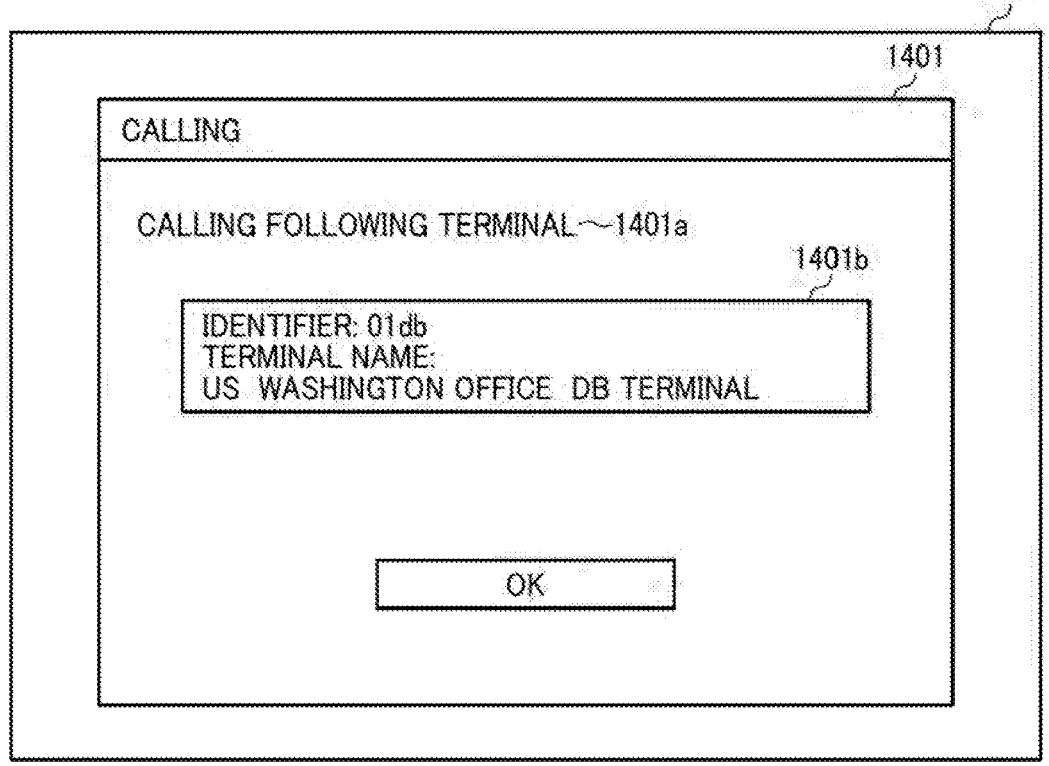
FIGS. 14A to 14D each illustrate an exemplary display screen of the terminal according to the first embodiment.

In step S1112, the display control 17 of the terminal 10 causes, for example, a dialog (exemplary display screen) 1401 illustrated in FIG. 14A to be displayed on the display unit 1301, the dialog 1401 indicating that a calling operation is being performed.

In the example in FIG. 14A, the dialog 1401 includes a message 1401a indicating that the calling operation is being performed, information 1401b about the terminal 10 using the accepted identifier, and the like. Referring to the dialog 1401, a user can determine that the calling operation is being performed for the counterpart terminal and can determine information (e.g., the terminal name) about the counterpart terminal and the like.

Subsequently, the process performed if it is determined in step S1105 in FIG. 11 that the accepted identifier is not present in the candidate list will be described.

In step S1113, the acceptor 19 of the terminal 10 determines whether the accepted identifier is available in the management system 50 (for example, whether the accepted identifier has been registered in the management system 50). For example, by using the inquirer 21, the acceptor 19 makes an inquiry to the management system 50 about whether the accepted identifier is available in the management system 50.

Figure 12:
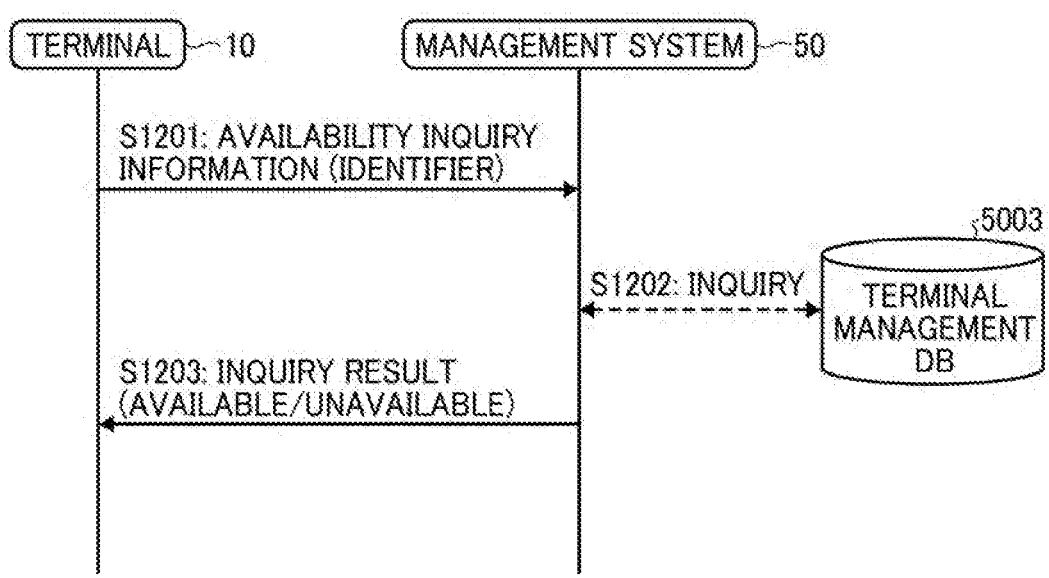
FIG. 12 is a sequence diagram illustrating an exemplary inquiry process according to the first embodiment.

FIG. 12 illustrates a sequence of an exemplary inquiry process according to the first embodiment.

In step S1201, the inquirer 21 of the terminal 10 transmits to the management system 50, availability inquiry information for inquiring whether the accepted identifier is available in the management system 50.

In step S1202, the terminal manager 53 of the management system 50 checks whether the identifier of interest has been registered in, for example, the terminal management table 801 illustrated in FIG. 8A stored in the terminal management DB 5003.

In step S1203, the terminal manager 53 of the management system 50 transmits the inquiry result to the terminal 10. For example, if an identifier included in the availability inquiry information has been registered in the terminal management table 801, the terminal manager 53 of the management system 50 transmits an inquiry result of "available" to the terminal 10. On the other hand, if an identifier included in the availability inquiry information has not been registered in the terminal management table 801, the terminal manager 53 of the management system 50 transmits an inquiry result of "unavailable" to the terminal 10.

Referring back to FIG. 11, the terminal calling process according to the first embodiment will be further described.

In step S1113, the acceptor 19 of the terminal 10 determines, for example, whether the accepted identifier is available in the management system 50, on the basis of the inquiry result from the management system 50.

If it is determined that the accepted identifier is unavailable in the management system 50, the acceptor 19 of the terminal 10 proceeds to step S1114. On the other hand, if it is determined that the accepted identifier is available in the management system 50, the acceptor 19 of the terminal 10 proceeds to step S1115.

Figure 14B:
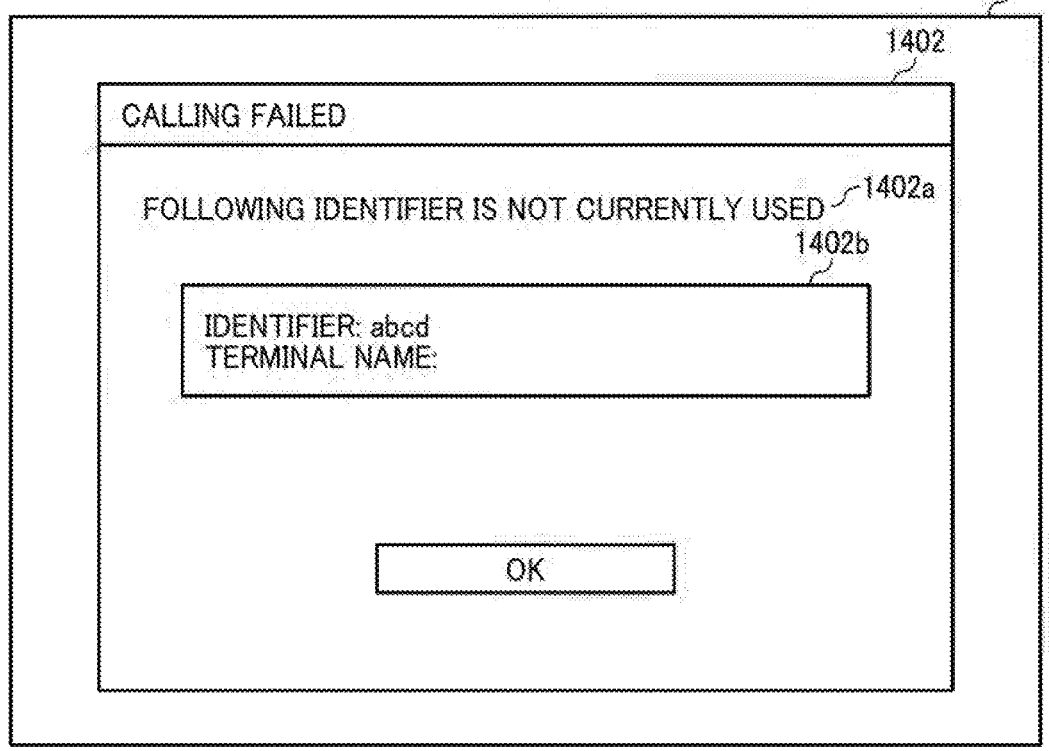

In step S1114, the display control 17 of the terminal 10 causes, for example, a dialog 1402 illustrated in FIG. 14B to be displayed on the display unit 1301, the dialog 1402 indicating that the accepted identifier is unavailable.

In the example in FIG. 14B, the dialog 1402 includes a message 1402a indicating that the identifier is unavailable, information 1402b about the identifier, and the like. Referring to the dialog 1402, a user can determine that the identifier used for the calling operation has not been registered in the terminal management table 801 and that the identifier is unavailable in the management system 50, for example.

In step S1115, the second transmitter 22 of the terminal 10 transmits, for example, to the management system 50 through the communication control 13, second request information for requesting the candidate terminal to start communication, the candidate terminal using the accepted identifier.

Note that the second request information is information used by the terminal 10 to notify a terminal 10 using an identifier that is not the candidate identifier, of a request through the management system 50 and includes destination information (e.g., the candidate identifier) indicating that the destination of the second request information is the terminal 10 using an identifier that is not the candidate identifier.

Figure 14C:
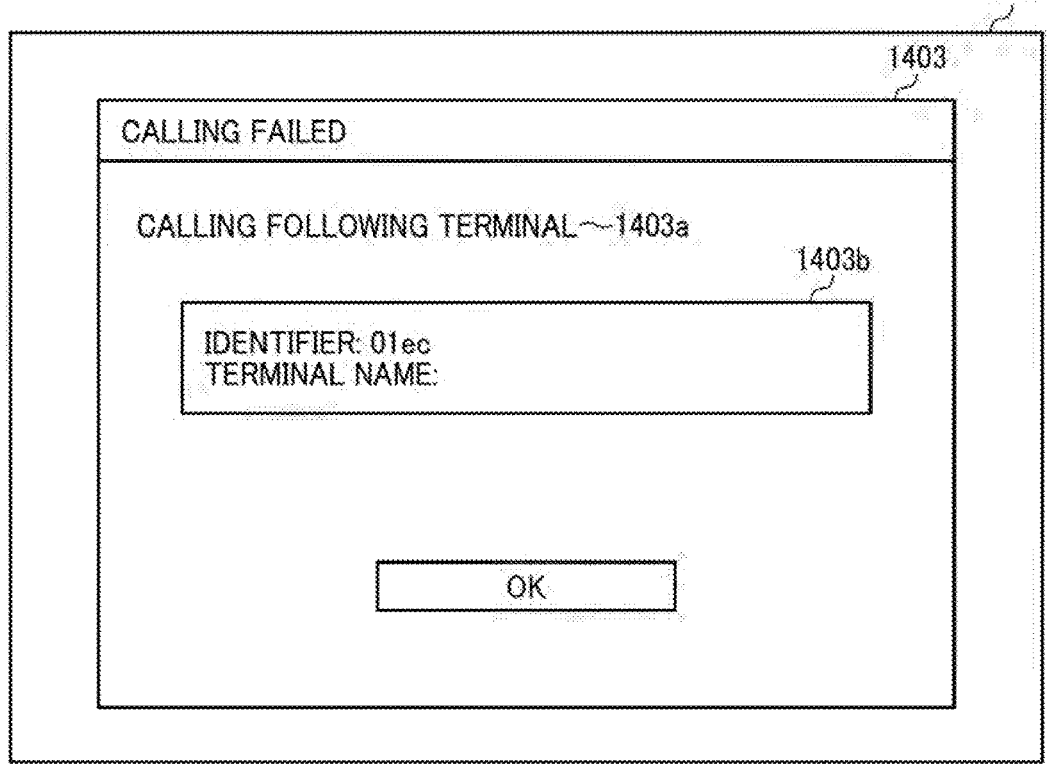

In step S1116, the display control 17 of the terminal 10 causes, for example, a dialog (exemplary display screen) 1403 illustrated in FIG. 14C to be displayed on the display unit 1301, the dialog 1403 indicating that a calling operation is being performed.

In the example in FIG. 14C, the dialog 1403 includes a message 1403a indicating that a calling operation is being performed, information 1403b about the accepted identifier, and the like. At this time, since the terminal 10 does not have information about the terminal name of the counterpart terminal, the terminal name of the counterpart terminal is not displayed.

First Request Information and Second Request Information

Now, the first request information and the second request information will be described in more detail.

FIG. 15 illustrates exemplary information transmitted from the terminal 10 according to the first embodiment to the management system 50 and another terminal 10.

If the terminal 10 notifies the management system 50 of a request, the terminal 10 transmits to the management system 50, the first request information, which is information to be transmitted to the management system 50. The first request information is request information that is transmitted if an information processing terminal using a candidate identifier managed as the destination of the identifier of a request sender is the destination of a request for the start of communication. The first request information includes destination information indicating that the destination of which the first request information is the management system 50, such as the IP address of the management system 50. The first request information further includes, for example, as information content, the identifier of the request sender, the identifier of the counterpart (request destination), and request contents (e.g., a request for the start of communication, a request for participation in communication, or a request for exit).

On the other hand, if the terminal 10 notifies the counterpart terminal of a request, the terminal 10 transmits to the counterpart terminal via the management system 50, the second request information, which is information to be transmitted to the counterpart terminal. The second request information is request information that is transmitted if an information processing terminal using an identifier that is not managed as the destination of the identifier of a request sender is the destination of a request for the start of communication. The second request information includes destination information indicating that the destination of which the second request information is the counterpart terminal, such as the identifier of the counterpart terminal. The second request information further includes, for example, as information content, the identifier of the request sender, the identifier of the counterpart, and request contents (e.g., a request for the start of communication, a request for participation in communication, or a request for exit).

Upon request information being received from the terminal 10, the management system 50 can determine, on the basis of the destination information of the request information, whether the request information is the first request information for notifying the management system 50 of a request or the second request information for notifying the terminal 10 serving as a counterpart terminal of a request.

Process of Receiving Request Information by Management System

Figure 16:
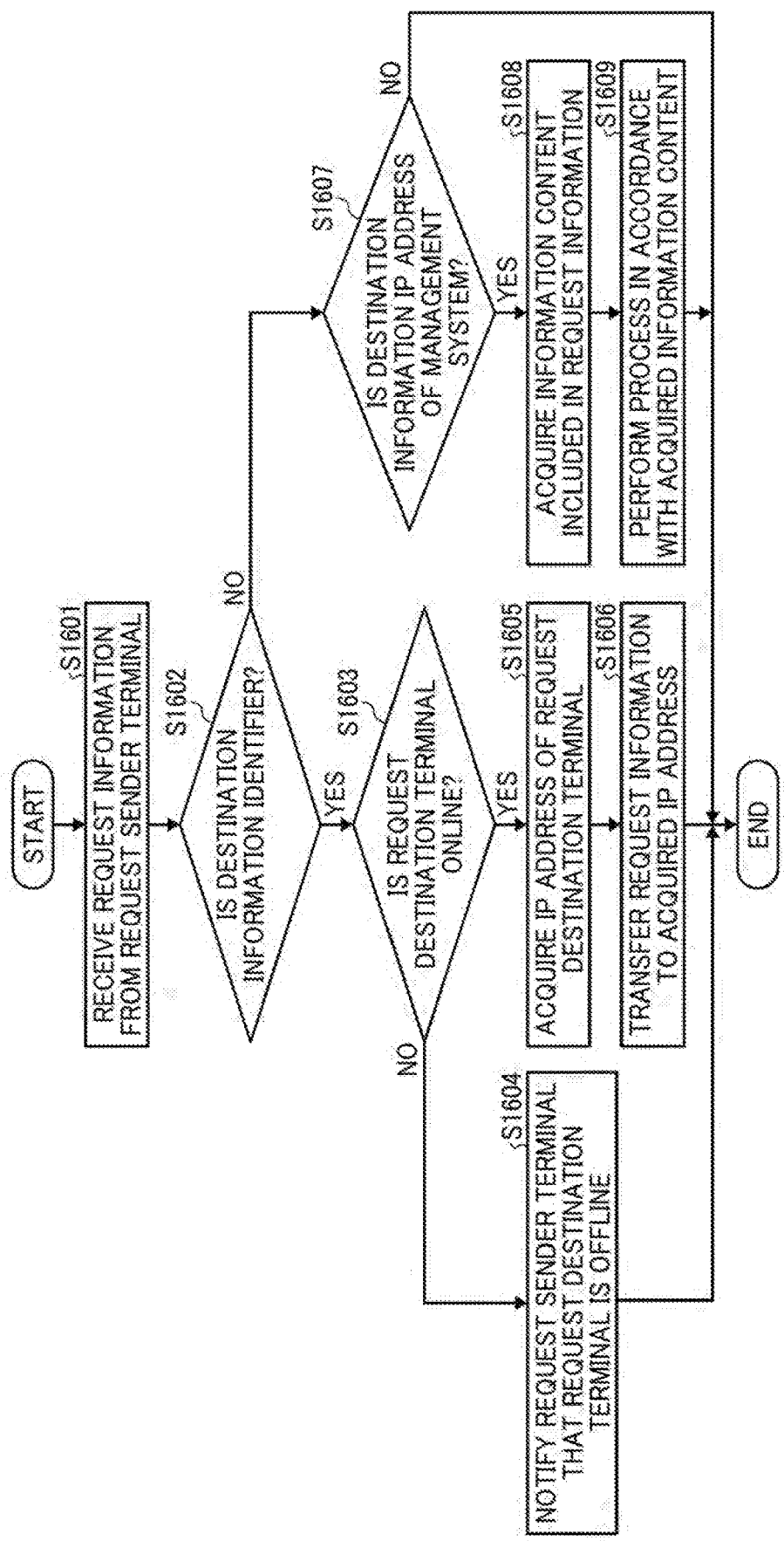
FIG. 16 is a flowchart illustrating an exemplary process in which the management system according to the first embodiment receives request information.

FIG. 16 is a flowchart illustrating an exemplary process according to the first embodiment in which the management system 50 receives request information.

In step S1601, upon request information (first request information or second request information) being received from a terminal 10 serving as a request sender, the management system 50 performs the process in and after step S1602.

In step S1602, the management system 50 determines whether destination information of the request information received in step S1601 is an identifier.

If the destination information of the request information is an identifier, the management system 50 proceeds to step S1603. On the other hand, if the destination information of the request information is not an identifier, the management system 50 proceeds to step S1607.

In step S1603, the management system 50 determines whether the terminal 10 serving as a counterpart terminal is online. For example, referring to the terminal management table 801 illustrated in FIG. 8A, if the terminal 10 serving as a counterpart terminal is "online (communicating)", or "online (capable of communicating)", the management system 50 determines that the terminal 10 serving as a counterpart terminal is online.

If it is determined that the terminal 10 serving as a counterpart terminal is not online, the management system 50 proceeds to step S1604. On the other hand, if it is determined that the terminal 10 serving as a counterpart terminal is online, the management system 50 proceeds to step S1605.

In step S1604, the management system 50 notifies the terminal 10 serving as the request sender that the terminal 10 serving as a counterpart terminal is offline.

On the other hand, in step S1605, the management system 50 acquires, for example, the IP address of a terminal 10 corresponding to the identifier of the terminal 10 serving as a counterpart terminal from the terminal management table 801 illustrated in FIG. 8A.

In step S1606, the management system 50 transfers the request information (second request information) received in step S1601 to the acquired IP address of the terminal 10 serving as a counterpart terminal.

Next, a process performed if it is determined in step S1602 that the destination information is not an identifier will be described.

In step S1607, the management system 50 determines whether the destination information of the request information received in step S1601 is the IP address of the management system 50.

If the destination information of the request information is not the IP address of the management system 50, the management system 50 ends the process. In this case, the management system 50, for example, destroys the received request information. On the other hand, if the destination information of the request information is the IP address of the management system 50, the management system 50 proceeds to step S1608.

In step S1608, the management system 50 acquires the information content included in the request information, and in step S1609, the management system 50 performs a predetermined process in accordance with the acquired information content. For example, if the received request information is the first request information (communication start request), the session manager 57 of the management system 50 starts a communication process.

Communication Process

Next, an exemplary communication process according to the first embodiment will be described.

Figure 17:
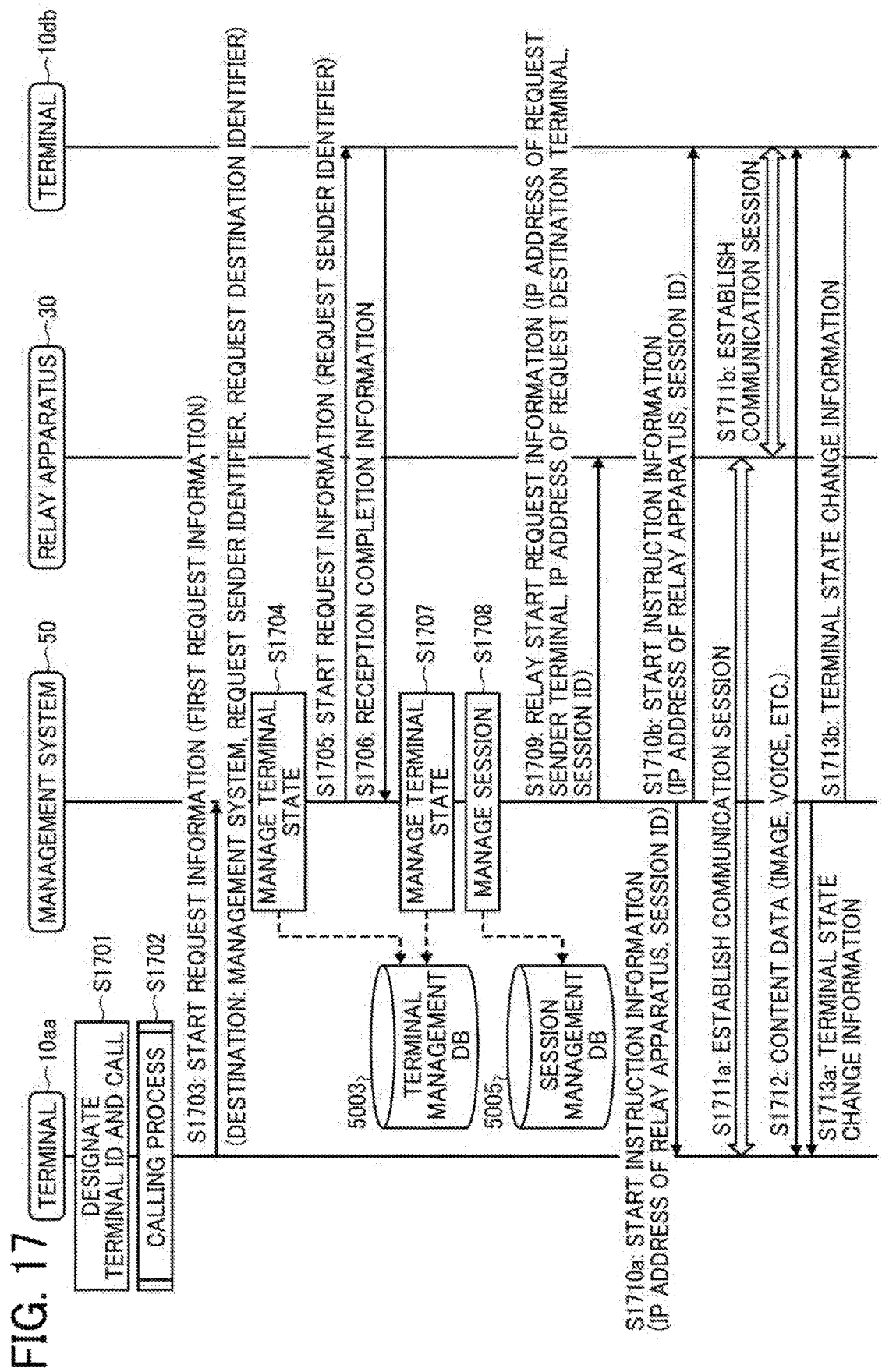
FIG. 17 illustrates a sequence of an exemplary communication process according to the first embodiment.
Figure 18B:
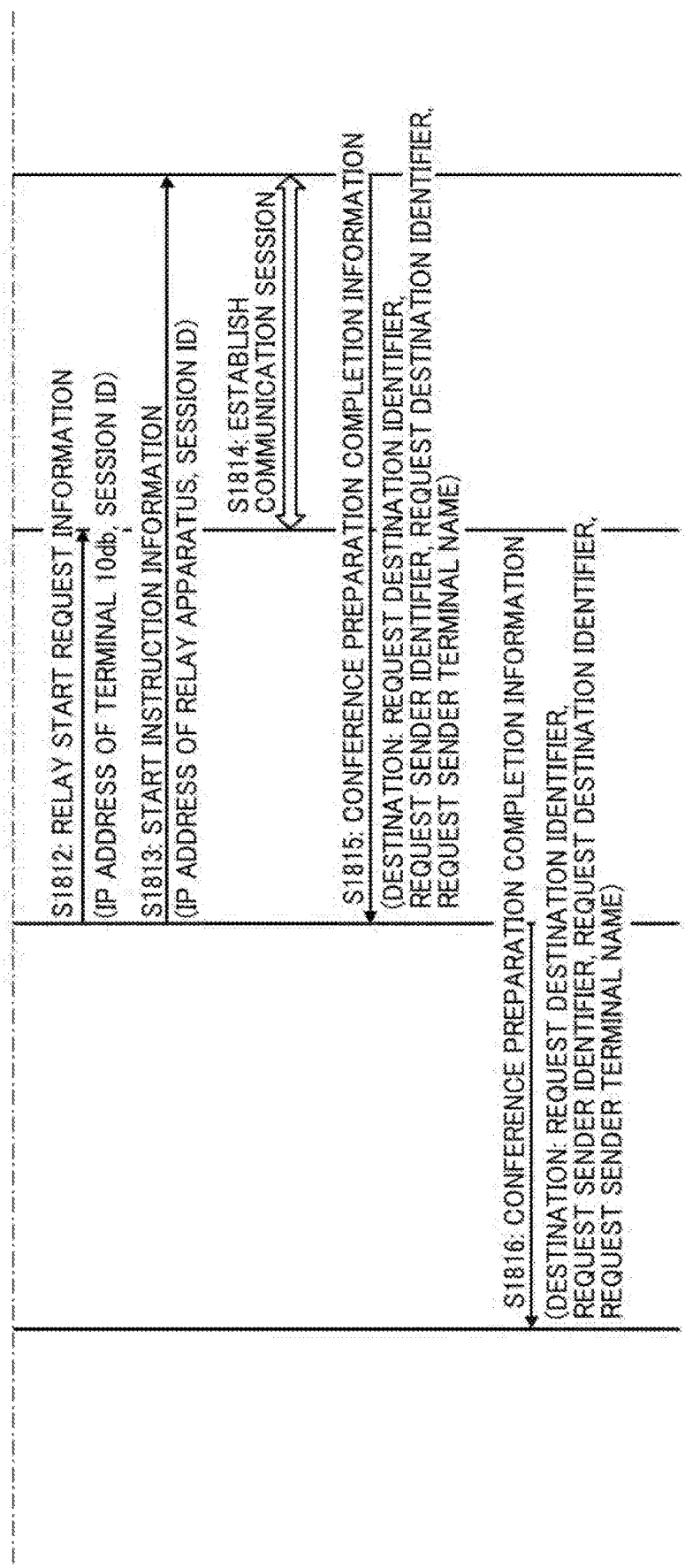
Figure 19:
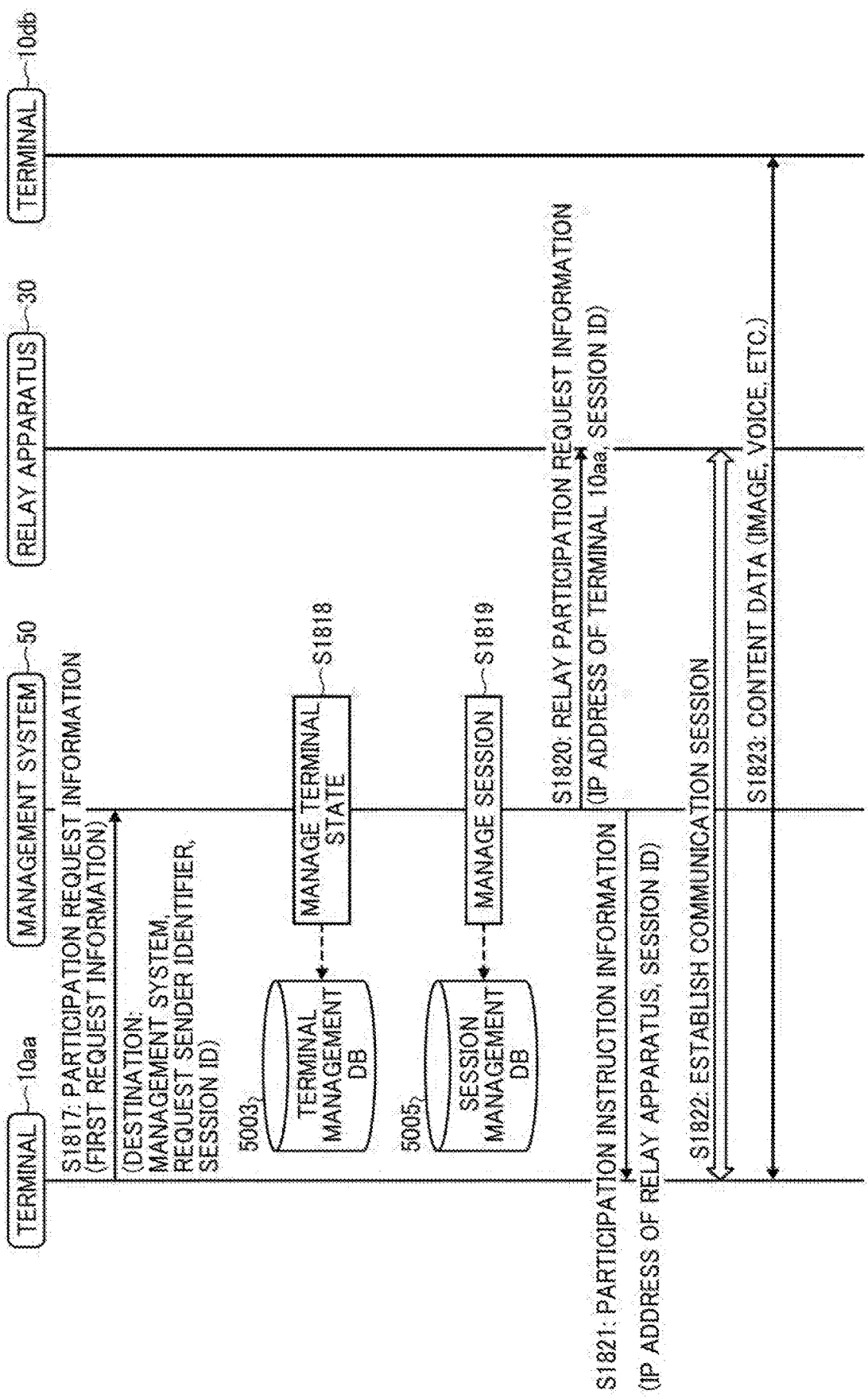
FIG. 19 is a sequence diagram illustrating an exemplary communication process according to the first embodiment.

FIGS. 17 to 19 each illustrate a sequence of an exemplary communication process according to the first embodiment.

Among there sequences, FIG. 17 illustrates an exemplary process in which, for example, the terminal 10aa causes the identifier-based calling screen 1302 illustrated in FIG. 13A to be displayed and accepts a calling operation using an identifier, and in which the accepted identifier is included in the candidate list.

Note that in the process illustrated in FIG. 17, for example, various kinds of management data are transmitted and received between each of the terminals 10 and the management system 50 in the management-data session sei illustrated in FIG. 2.

In step S1701, the acceptor 19 of the terminal 10aa, for example, accepts a calling operation performed by a user through the identifier-based calling screen 1302 illustrated in FIG. 13A. Here, it is assumed that the accepted identifier of a counterpart terminal is present in the candidate list and that the counterpart terminal is "capable of communicating".

In step S1702, the terminal 10aa performs, for example, the terminal calling process illustrated in FIG. 11.

In step S1703, since the accepted identifier of the counterpart terminal is present in the candidate list and the counterpart terminal is "capable of communicating", the first transmitter 20 of the terminal 10aa transmits start request information (first request information) to the management system 50. As illustrated in "INFORMATION TRANSMITTED TO MANAGEMENT SYSTEM" in FIG. 15, the start request information includes the IP address of the management system 50 as destination information and includes a request sender identifier, the candidate identifier, and the like as information content.

In step S1704, upon the start request information (first request information) being received from the terminal 10aa, the terminal manager 53 of the management system 50 updates the terminal management table 801 included in the terminal management DB 5003, on the basis of the request sender identifier included in the start request information. For example, the terminal manager 53 changes the information about the operating state corresponding to the identifier "01aa" of the terminal 10aa to "online (communicating)", and updates information about the reception date and time.

In step S1705, the session manager 57 of the management system 50 transmits to the terminal 10db serving as the counterpart terminal, the start request information for requesting the start of a session. The start request information includes, for example, the request sender identifier of the terminal 10aa serving as a request sender terminal, and the like.

In step S1706, upon the start request information being received from the management system 50, for example, the terminal 10db transmits reception completion information to the management system 50 in accordance with a responding operation or the like performed by a user of the terminal 10db. The reception completion information includes, for example, a candidate identifier that is the identifier of the terminal 10db. Note that the reception completion information may be automatically transmitted form the terminal 10db, for example.

In step S1707, upon the reception completion information being received from the terminal 10db, the terminal manager 53 of the management system 50 updates the terminal management table 801 included in the terminal management DB 5003, on the basis of the identifier of the terminal 10db included in the reception completion information. For example, the terminal manager 53 changes information about the operating state corresponding to the identifier "01db" of the terminal 10db to "online (communicating)" and updates information about the reception date and time.

In step S1708, the session manager 57 of the management system 50 generates a session ID that is an identifier for identifying a communication session. In addition, the session manager 57 stores the relay apparatus ID of the relay apparatus 30, the request sender identifier, and the candidate identifier in association with the generated session ID in the session management table 802 included in the session management DB 5005.

In step S1709, the session manager 57 of the management system 50 transmits to the relay apparatus 30, relay start request information for requesting the start of a communication session relay. The relay start request information includes, for example, the session ID generated in step S1708, the IP address of the request sender terminal, the IP address of the counterpart terminal, and the like.

In steps S1710a and S1710b, the session manager 57 of the management system 50 transmits to the terminals 10aa and 10db, start instruction information as an instruction for starting a session. The start instruction information includes, for example, the session ID generated in step S1708, the IP address of the relay apparatus 30, and the like.

In step S1711a, the communication control 13 of the terminal 10aa establishes a communication session (session sed) with the relay apparatus 30 by using the start instruction information received from the management system 50. Likewise, in step S1711b, the communication control 13 of the terminal 10db establishes a communication session with the relay apparatus 30 by using the start instruction information received from the management system 50.

Through the above process, in step S1712, the terminals 10aa and 10db can participate in the same communication session and can transmit content data to each other through the relay apparatus 30, thereby, for example, enabling a videoconference or the like.

In steps S1713a and S1713b, the terminal manager 53 of the management system 50 transmits to each of the terminals 10 that are registered in the terminal management DB 5003, terminal state change information that is a notification of a change in the states of the terminals 10. In the example in FIG. 17, the terminal state change information includes the identifiers of the terminals 10aa and 10db whose terminal states have been changed, the state information indicating the operating states of the terminals 10aa and 10db, and the like.

Next, the processes in FIGS. 18 and 19 each illustrate an exemplary communication process in which, for example, the terminal 10aa causes the identifier-based calling screen 1302 illustrated in FIG. 13A to be displayed and accepts a calling operation using the identifier, and in which the accepted identifier is not included in the candidate list. Note that in the description of FIGS. 18 and 19, the "request sender identifier" is the identifier "01aa" of the terminal 10aa that performs a calling operation, and the "candidate identifier" is the identifier "01db" of the terminal 10db serving as a counterpart (request destination).

In step S1801, the acceptor 19 of the terminal 10aa, for example, accepts a calling operation performed by a user on the identifier-based calling screen 1302 illustrated in FIG. 13A. Here, it is assumed that the accepted identifier of a counterpart terminal is available in the management system 50 and is not present in the candidate list of the terminal 10aa.

In step S1802, the terminal 10aa performs, for example, the terminal calling process illustrated in FIG. 11.

In step S1803, since the accepted identifier of the counterpart terminal is available in the management system 50 and is not present in the candidate list of the terminal 10aa, the second transmitter 22 of the terminal 10aa transmits start request information (second request information) to the management system 50. As illustrated in "INFORMATION TRANSMITTED TO TERMINAL" in FIG. 15, the start request information includes the identifier of the counterpart as destination information and includes the identifier of the request sender, the identifier of the counterpart, and the like as information content.

Preferably, the start request information (second request information) includes information about the terminal name of the request sender terminal (the terminal 10aa).

In step S1804, upon the start request information (second request information) being received from the terminal 10aa, the information transmitter 58 of the management system 50, for example, transmits the start request information (second request information) to the counterpart terminal (the terminal 10db) in accordance with the process of receiving request information illustrated in FIG. 16.

In step S1805, upon the start request information (second request information) being received from the management system 50, the second transmitter 22 of the terminal 10db, for example, automatically transmits reception completion information to the management system 50. As destination information of the reception completion information, the identifier of the request sender terminal (the terminal 10aa) serving as the request sender of the start request information (second request information) is set.

In step S1806, upon the reception completion information being received from the terminal 10db, the information transmitter 58 of the management system 50, for example, transmits the reception completion information to the terminal 10aa in accordance with the process of receiving request information illustrated in FIG. 16.

Figure 14D:
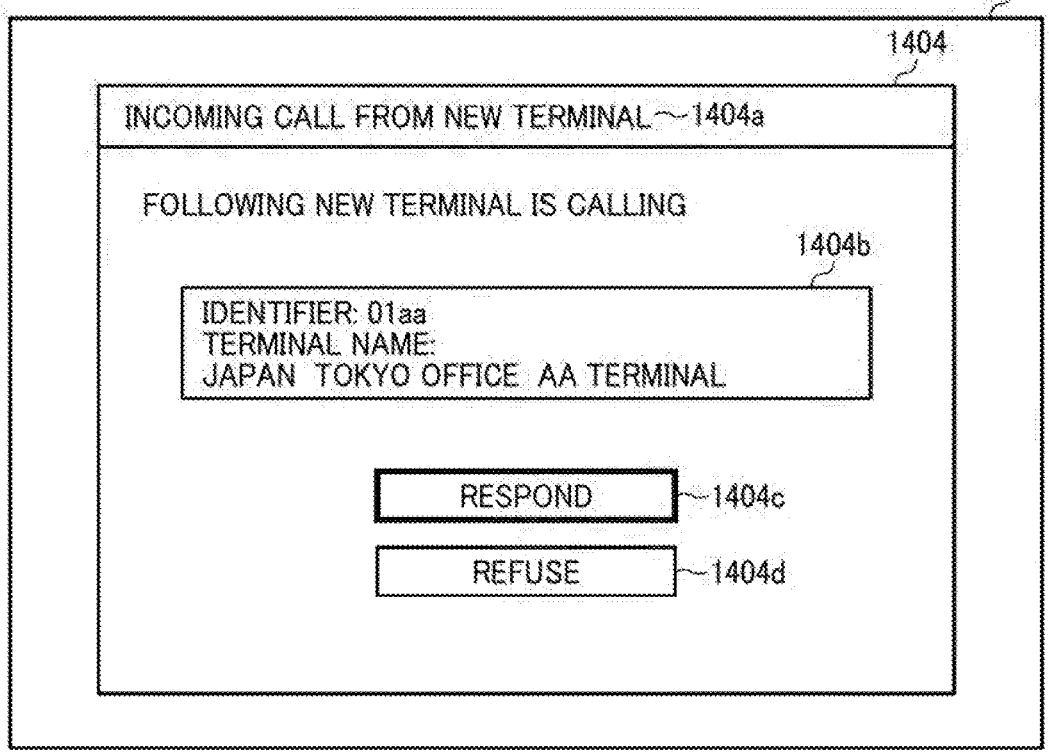

In step S1807, the display control 17 of the terminal 10db causes, for example, a dialog (exemplary display screen) 1404 illustrated in FIG. 14D to be displayed on the display unit 1301, the dialog 1404 indicating an incoming call.

In the example in FIG. 14D, the dialog 1404 includes a message 1404a indicating an incoming call, information 1404b about the terminal 10 that is calling, a "respond" key 1404c, a "refuse" key 1404d, and the like.

Preferably, the display control 17 of the terminal 10db causes the terminal name to be displayed in the information 1404b about the terminal 10 that is calling, by using information about the terminal name of the request sender terminal included in the start request information (second request information) received in step S1804.

A user of the terminal 10db, for example, can select the "respond" key 1404c in the dialog 1404 illustrated in FIG. 14D, thereby responding the call from the terminal 10aa that is calling. Or, a user of the terminal 10db can select the "refuse" key 1404d in the dialog 1404 illustrated in FIG. 14D, thereby refusing the call from the terminal 10aa that is calling.

In step S1808, it is assumed that the operation input acceptor 12 of the terminal 10db accepts a responding operation performed by a user with respect to the dialog 1404 illustrated in FIG. 14D.

In step S1809, the first transmitter 20 of the terminal 10db transmits to the management system 50, conference start request information for requesting the start of communication. The conference start request information includes the IP address of the management system 50 as destination information and includes the identifier of the terminal 10*db* and the like as information content.

In step S1810, the terminal manager 53 of the management system 50 updates the terminal management table 801 included in the terminal management DB 5003 on the basis of the request sender identifier included in the conference start request information received from the terminal 10*db*. For example, the terminal manager 53 changes information about the operating state corresponding to the identifier "01db" of the terminal 10*db* to "online (communicating)" and updates information about the reception date and time.

In step S1811, the session manager 57 of the management system 50 generates a session ID that is an identifier for identifying a communication session. In addition, the session manager 57 stores the relay apparatus ID of the relay apparatus 30, the request sender identifier, and the like in association with the generated session ID in the session management table 802 included in the session management DB 5005.

In step S1812, the session manager 57 of the management system 50 transmits to the relay apparatus 30, relay start request information for requesting the start of a communication session relay. The relay start request information includes, for example, the session ID generated in step S1811, the IP address of the terminal 10*db*, and the like.

In step S1813, the session manager 57 of the management system 50 transmits to the terminal 10*db*, start instruction information as an instruction for starting a session. The start instruction information includes, for example, the session ID generated in step S1811, the IP address of the relay apparatus 30, and the like.

In step S1814, the communication control 13 of the terminal 10*db* establishes a communication session with the relay apparatus 30 by using the start instruction information received from the management system 50.

In step S1815, the second transmitter 22 of the terminal 10*db* transmits to the terminal 10*aa* through the management system 50, conference preparation completion information that is a notification of completion of the preparation of a conference. The conference preparation completion information includes the identifier of the terminal 10*aa* as destination information and includes the request sender identifier, the candidate identifier (request destination identifier), the session ID, and the like as information content.

In step S1816, the information transmitter 58 of the management system 50, for example, transfers the conference preparation completion information to the terminal 10*aa* in accordance with the process of receiving request information illustrated in FIG. 16.

In step S1817 in FIG. 19, upon the conference preparation completion information being received, the first transmitter 20 of the terminal 10*aa* transmits to the management system 50, participation request information (first request information) for requesting participation in a conference. The participation request information includes the IP address of the management system 50 as destination information and includes the request sender identifier, the session ID, and the like as information content.

In step S1818, upon the participation request information (first request information) being received from the terminal 10*aa*, the terminal manager 53 of the management system 50 updates the terminal management table 801 included in the terminal management DB 5003 on the basis of the request sender identifier included in the participation request information.

In step S1819, the session manager 57 of the management system 50 stores the identifier of the terminal 10*aa* in association with the session ID in the session management table 802 included in the session management DB 5005.

In step S1820, the session manager 57 of the management system 50 transmits to the relay apparatus 30, relay participation request information for requesting participation of the terminal 10*aa* in a conference. The relay participation request information includes, for example, the session ID, the IP address of the terminal 10*aa*, and the like.

In step S1821, the session manager 57 of the management system 50 transmits participation instruction information as an instruction for the terminal 10*aa* to participate in the conference. The participation instruction information includes, for example, the IP address of the relay apparatus 30, the session ID, and the like.

In step S1822, the communication control 13 of the terminal 10*aa* establishes a communication session with the relay apparatus 30 by using the participation instruction information received from the management system 50.

Through the above process, in step S1823, the terminals 10*aa* and 10*db* can participate in the same communication session and can transmit content data to each other through the relay apparatus 30, thereby, for example, enabling a videoconference or the like.

In the above manner, according to this embodiment, in the communication system 1 in which communication with a terminal 10 serving as a communication counterpart is started by using a candidate list, even if a counterpart terminal has not been registered in the candidate list of a terminal 10, communication can be started in the same manner as in a case where the counterpart terminal has been registered in the candidate list.

Thus, even if a calling operation is performed by the terminal 10 using an identifier, the management system 50 can manage communication by using the terminal management DB 5003, the session management DB 5005, and the like in the same manner as in a case where a calling operation is performed by using the candidate list.

Second Embodiment

In the first embodiment, in step S1113 in FIG. 11, the terminal 10 makes an inquiry to the management system 50 about whether the accepted identifier is available in the management system 50 by using, for example, the inquirer 21.

In a second embodiment, an exemplary case will be described in which, if the accepted identifier of a counterpart terminal is not included in a candidate list, the terminal 10 transmits second request information without making an inquiry to the management system 50.

Terminal Calling Process

Figure 20B:
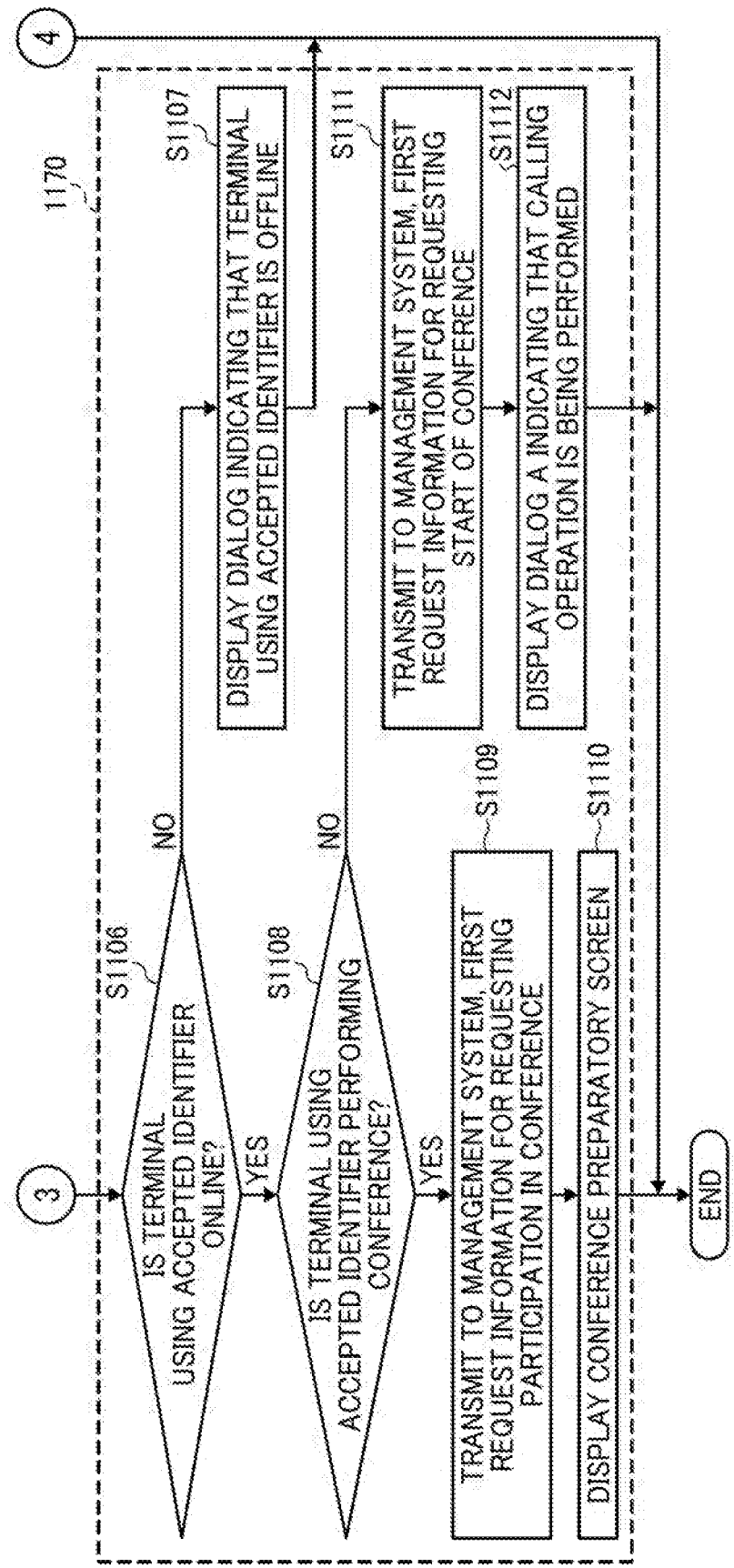

FIG. 20 is a flowchart illustrating an exemplary terminal calling process according to the second embodiment. Note that the process in steps S1101 to S1112 in FIG. 20 is substantially the same as the terminal calling process illustrated in FIG. 11 according to the first embodiment, and therefore, different points from the first embodiment will mainly be described in this embodiment.

In the second embodiment, if it is determined that the identifier accepted in step S1105 is not included in the candidate list, the process in steps S2001 to S2004 is performed.

In step S2001, the second transmitter 22 of the terminal 10 transmits to the management system 50, start request information (second request information) for requesting a counterpart terminal using the accepted identifier to start a conference.

In step S2002, depending on whether the terminal 10 has received a notification indicating that the identifier of the counterpart terminal is unavailable from the management system 50 within a predetermined period, the terminal 10 splits the process.

If the notification indicating that the identifier of the counterpart terminal is unavailable has not been received from the management system 50, in step S2003, the display control 17 of the terminal 10 causes the dialog 1403 illustrated in FIG. 14C to be displayed on the display unit 1301, the dialog 1403 indicating that a calling operation is being performed.

On the other hand, if the notification indicating that the identifier of the counterpart terminal is unavailable has been received from the management system 50, in step S2004, the display control 17 of the terminal 10 causes, for example, the dialog 1402 illustrated in FIG. 14B to be displayed on the display unit 1301.

Process of Receiving Request Information by Management System

Figure 21:
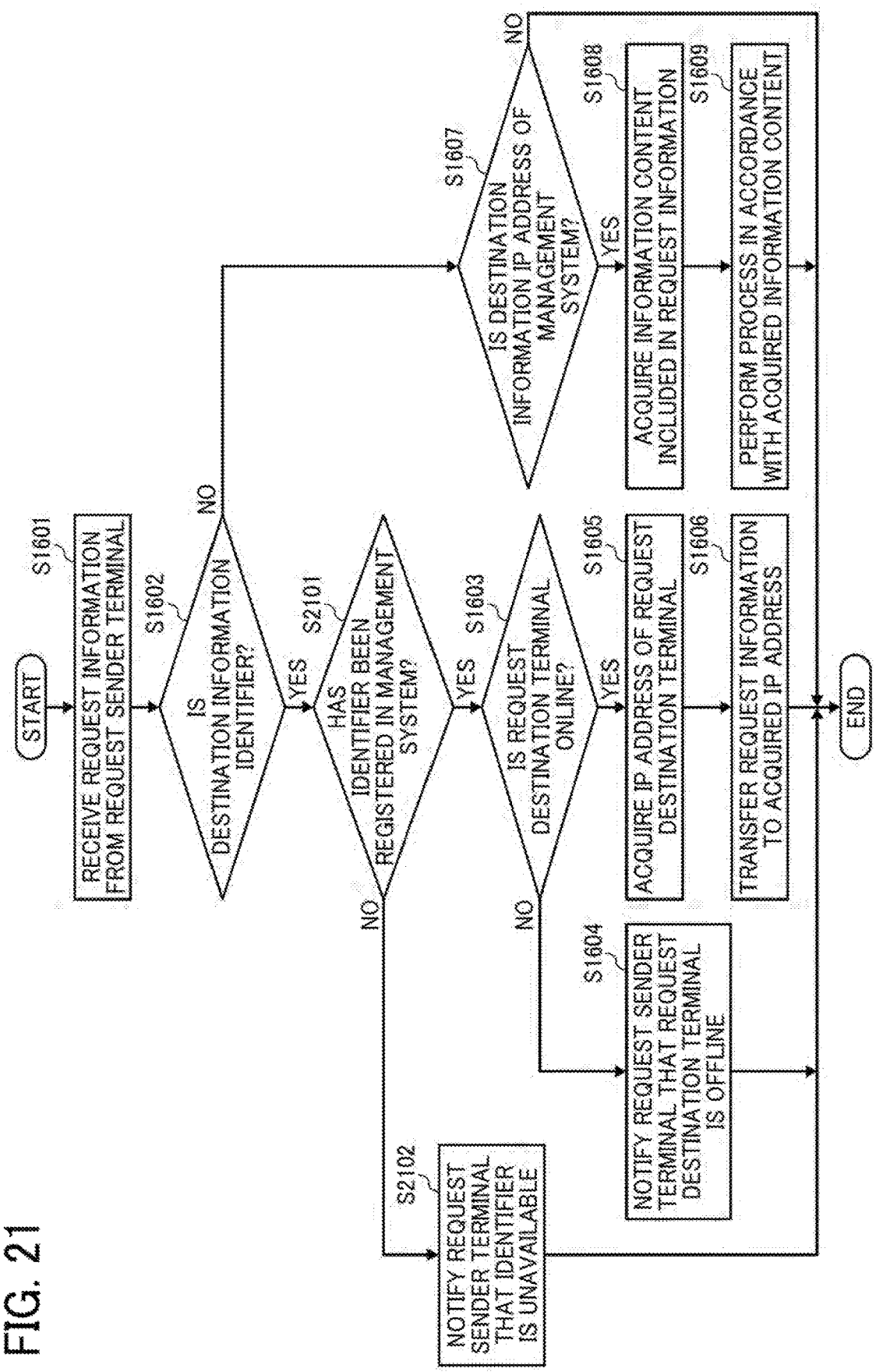
FIG. 21 is a flowchart illustrating an exemplary process in which the management system according to the second embodiment receives request information.

FIG. 21 illustrates an exemplary process in which the management system 50 according to the second embodiment receives request information. Note that the process in steps S1601 to S1609 in FIG. 21 is substantially the same as the process of receiving request information illustrated in FIG. 16 according to the first embodiment, and therefore, different points from the first embodiment will mainly be described in this embodiment.

If the destination information of the request information received from the terminal 10 is an identifier, that is, if the request information is second request information in step S1602, the management system 50 according to the second embodiment performs step S2101.

In step S2101, the management system 50 determines whether the identifier of the destination information has been registered in (available in) the management system 50. For example, if the identifier of the destination information is included in the terminal management table 801 illustrated in FIG. 8, the management system 50 determines that the identifier of the destination information has been registered in the management system 50.

If it is determined that the identifier of the destination information has been registered in the management system 50, as in the first embodiment, the management system 50 performs the process in and after step S1603. On the other hand, if it is determined that the identifier of the destination information has not been registered in the management system 50, the management system 50 proceeds to step S2102.

In step S2102, the management system 50 notifies the request sender terminal serving as the sender of the request information, that the identifier of the destination information included in the request information is unavailable.

In this manner, without determining whether the identifier accepted on the identifier-based calling screen 1302 is available in the management system 50, the terminal 10 may transmit the second request information to the management system 50. Thus, the number of steps performed by the terminal 10 if the identifier accepted on the identifier-based calling screen 1302 has been registered in the management system 50 can be reduced.

Third Embodiment

In a third embodiment, an exemplary method for displaying a candidate list in each of the above embodiments will be described.

Figure 22B:
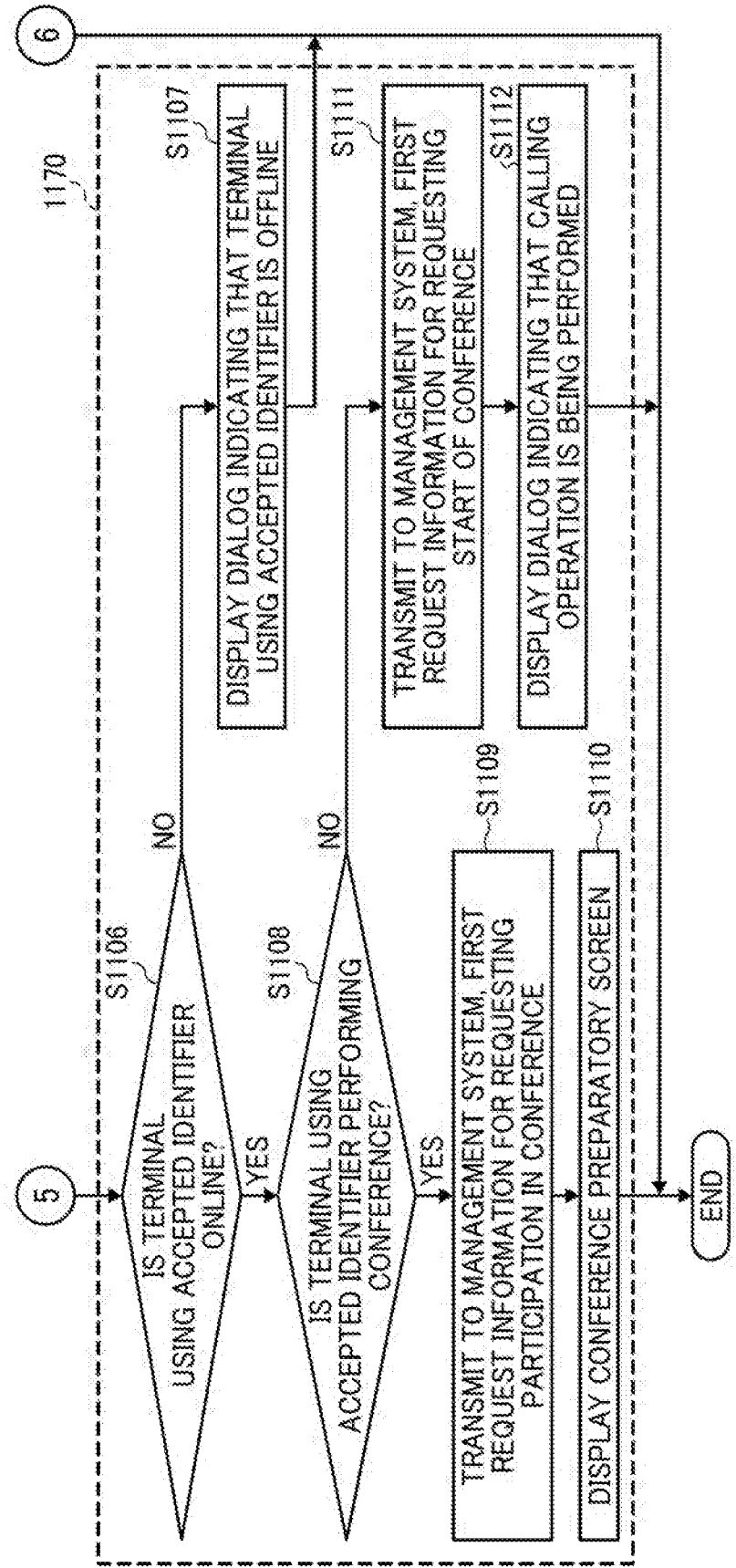

FIG. 22 is a flowchart illustrating an exemplary terminal calling process according to the third embodiment. Note that the process in steps S1101 to S1112 in FIG. 22 is substantially the same as the terminal calling process illustrated in FIG. 11 according to the first embodiment, and the process in steps S2001 to S2004 is substantially the same as the terminal calling process illustrated in FIG. 20 according to the second embodiment. Therefore, different points from the first and second embodiments will mainly be described in this embodiment.

Figure 23:
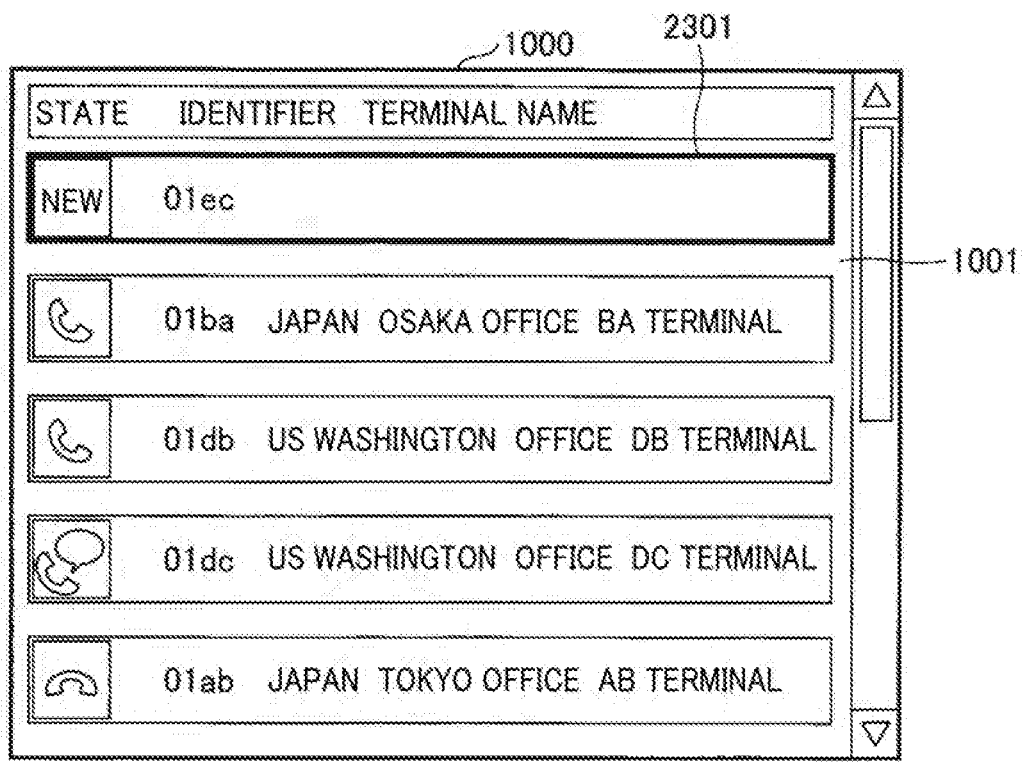
FIG. 23 illustrates an exemplary candidate list according to the third embodiment.

If it is determined in step S1103 that the accepted identifier is not the identifier of the terminal 10, the terminal 10 according to the third embodiment, for example, temporarily adds the accepted identifier to a candidate list as illustrated in FIG. 23.

FIG. 23 illustrates an exemplary candidate list according to the third embodiment. In the example in FIG. 23, the candidate list 1001 displayed on the display unit 1000 is obtained by adding to the candidate list 1001 illustrated in FIG. 10, a selection key 2301 for selecting the identifier accepted on the identifier-based calling screen 1302. The selection key 2301 for selecting the identifier accepted on the calling screen 1302 is, for example, displayed in the candidate list 1001 until the power of the terminal 10 is switched off. With the selection key 2301, for example, even if a user unintentionally ends communication and exits from a conference, the user can reconnect to the same conference easily.

Note that in the candidate list 1001 illustrated in FIG. 23, the process performed if the selection key 2301 for selecting the identifier accepted on the calling screen 1302 is selected may be substantially the same as the process performed if a calling operation is accepted on the identifier-based calling screen 1302.

Fourth Embodiment

In the first to third embodiments, when a terminal 10 that performs a calling operation (hereinafter, this terminal 10 will be referred to as a request sender terminal) calls a terminal 10 that is the request destination (referred to as a counterpart terminal), if the counterpart terminal is performing a conference with another terminal 10, an incoming call screen is displayed only on the counterpart terminal. Therefore, only the counterpart terminal can select whether the request sender terminal is permitted or refused to participate in the conference, and another terminal 10 participating in the conference (hereinafter, this terminal 10 will be referred to as a participant terminal) is incapable of selecting whether the request sender terminal is permitted or refused to participate in the conference.

In a fourth embodiment, an exemplary case will be described in which, if the counterpart terminal is performing a conference when the request sender terminal calls the counterpart terminal, in addition to the counterpart terminal, a participant terminal can select whether the request sender terminal is permitted or refused to participate in the conference.

Terminal Calling Process

Figure 24B:
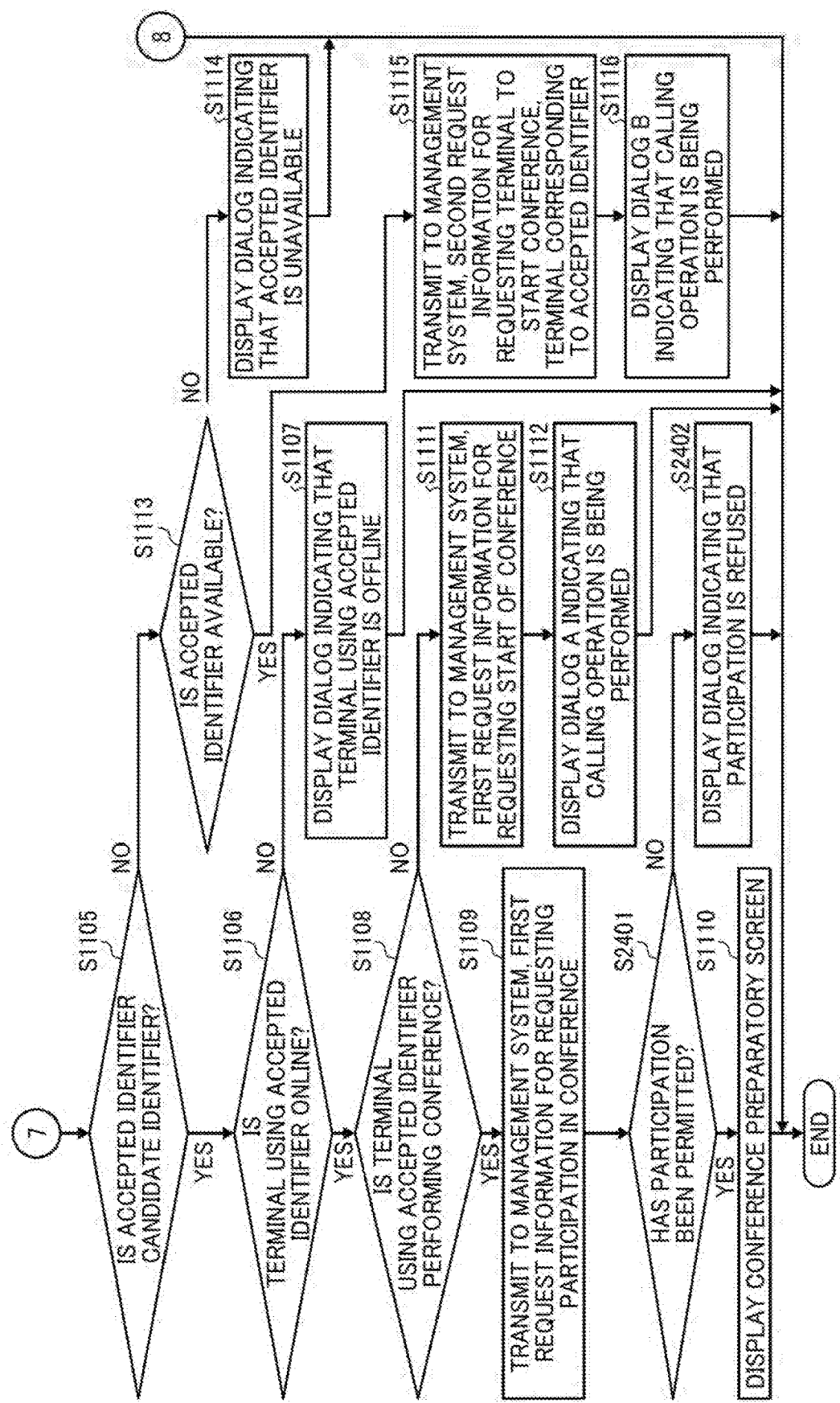

FIG. 24 is a flowchart illustrating an exemplary terminal calling process according to the fourth embodiment. Note that the process in steps S1101 to S1116 in FIG. 24 is substantially the same as the terminal calling process illustrated in FIG. 11 according to the first embodiment, and therefore, different points from the first embodiment will mainly be described in this embodiment.

In step S1108 in FIG. 24, if the counterpart terminal is performing a conference, in step S1109, the first transmitter 20 of the request sender terminal transmits to the management system 50, first request information for requesting participation in the conference.

At this time, in this embodiment, a screen is displayed on the counterpart terminal and a participant terminal participating in the same conference as the counterpart terminal, the screen used for selecting whether the request sender terminal is permitted or refused to participate in the conference.

In step S2401, depending on whether the request sender terminal is permitted or refused to participate in the conference by the counterpart terminal or the participant terminal participating in the same conference as the counterpart terminal, the display control 17 of the request sender terminal splits the process.

If the request sender terminal is permitted to participate in the conference, the display control 17 proceeds to step S1110 and causes, for example, the conference preparatory screen (communication preparatory screen) 1305 illustrated in FIG. 13D to be displayed on the display unit 1301 of the display 120 or the like.

On the other hand, if the request sender terminal is refused to participate in the conference, the display control 17 proceeds to step S2402 and causes a participant refusal dialog to be displayed on the display unit 1301, the dialog indicating that the request sender terminal has been refused to participate in the conference.

Process of Receiving Request Information by Management System

Figure 25:
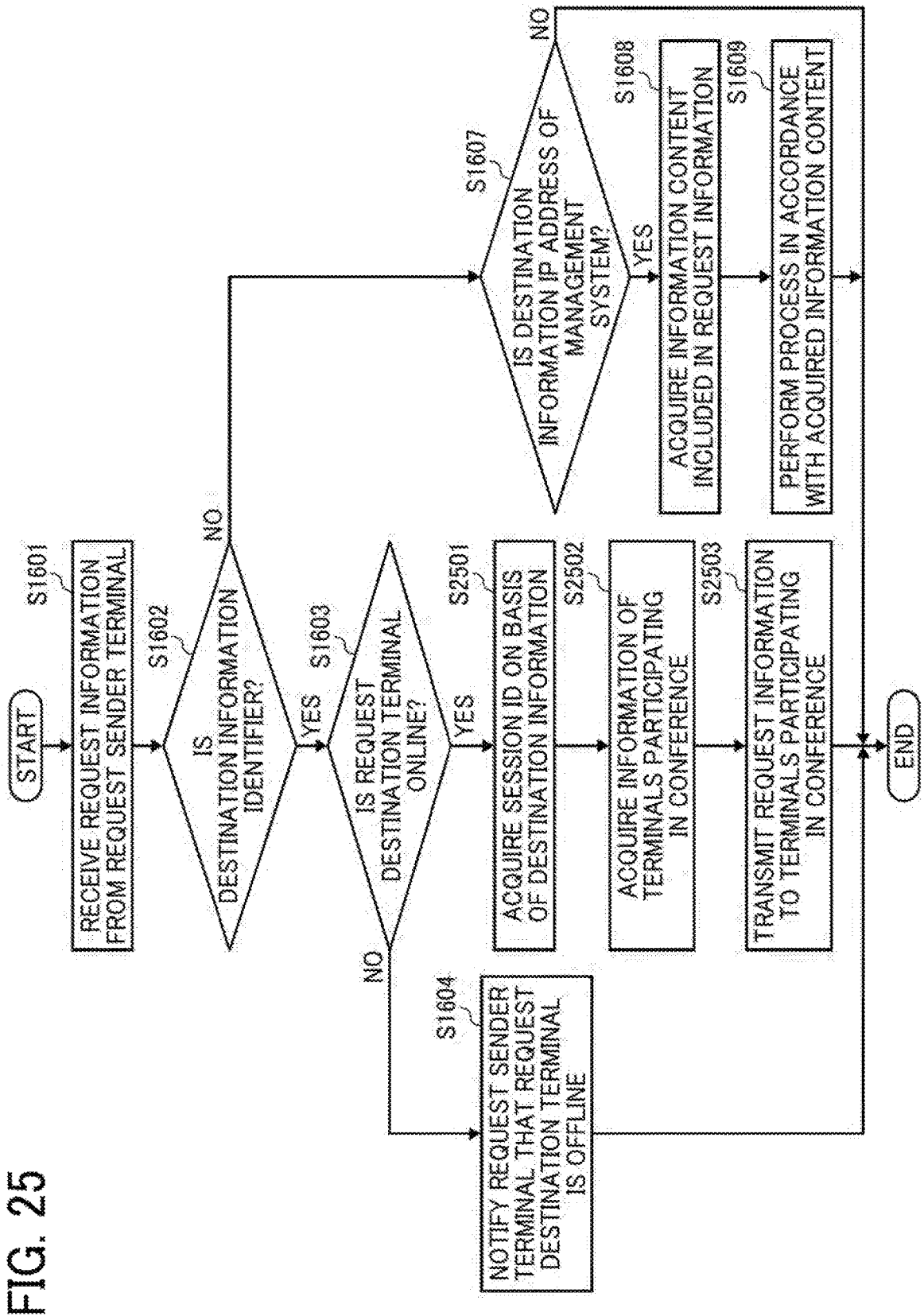
FIG. 25 is a flowchart illustrating an exemplary process in which the management system according to the fourth embodiment receives request information.

FIG. 25 is a flowchart illustrating an exemplary process in which the management system 50 according to the fourth embodiment receives request information. Note that the process in steps S1601 to S1604 and steps S1607 to S1609 in FIG. 25 is substantially the same as the process of receiving request information illustrated in FIG. 16 according to the first embodiment, and therefore, different points from the first embodiment will mainly be described in this embodiment.

If it is determined in step S1603 in FIG. 25 that the counterpart terminal is online, in step S2501, the management system 50 acquires the session ID of the conference in which the counterpart terminal is participating, on the basis of destination information. For example, the management system 50 acquires the session ID corresponding to the identifier of the counterpart terminal by using the session management table 802 illustrated in FIG. 8B. Thus, the management system 50 can determine the conference in which the counterpart terminal is participating.

In step S2502, the management system 50 acquires information about the terminal 10 participating in the same conference as the counterpart terminal. For example, by using the session management table 802 illustrated in FIG. 8B, the management system 50 acquires the identifiers of the terminals 10 (counterpart terminal and participant terminal) stored in association with the session ID acquired in step S2501. Thus, the management system 50 can determine the terminal 10 participating in the conference in which the counterpart terminal is participating.

In step S2503, the information transmitter 58 of the management system 50 transmits to the terminals 10 (counterpart terminal and participant terminal) participating in the same conference as the counterpart terminal, the request information (conference participation request) received from the request sender terminal.

Through the above process, upon a conference participation request being received from the request sender terminal to the counterpart terminal, the management system 50 notifies the counterpart terminal and participant terminal that are participating in the conference that a conference participation request has been received from the request sender terminal.

Exemplary Communication Process

Figure 26A:
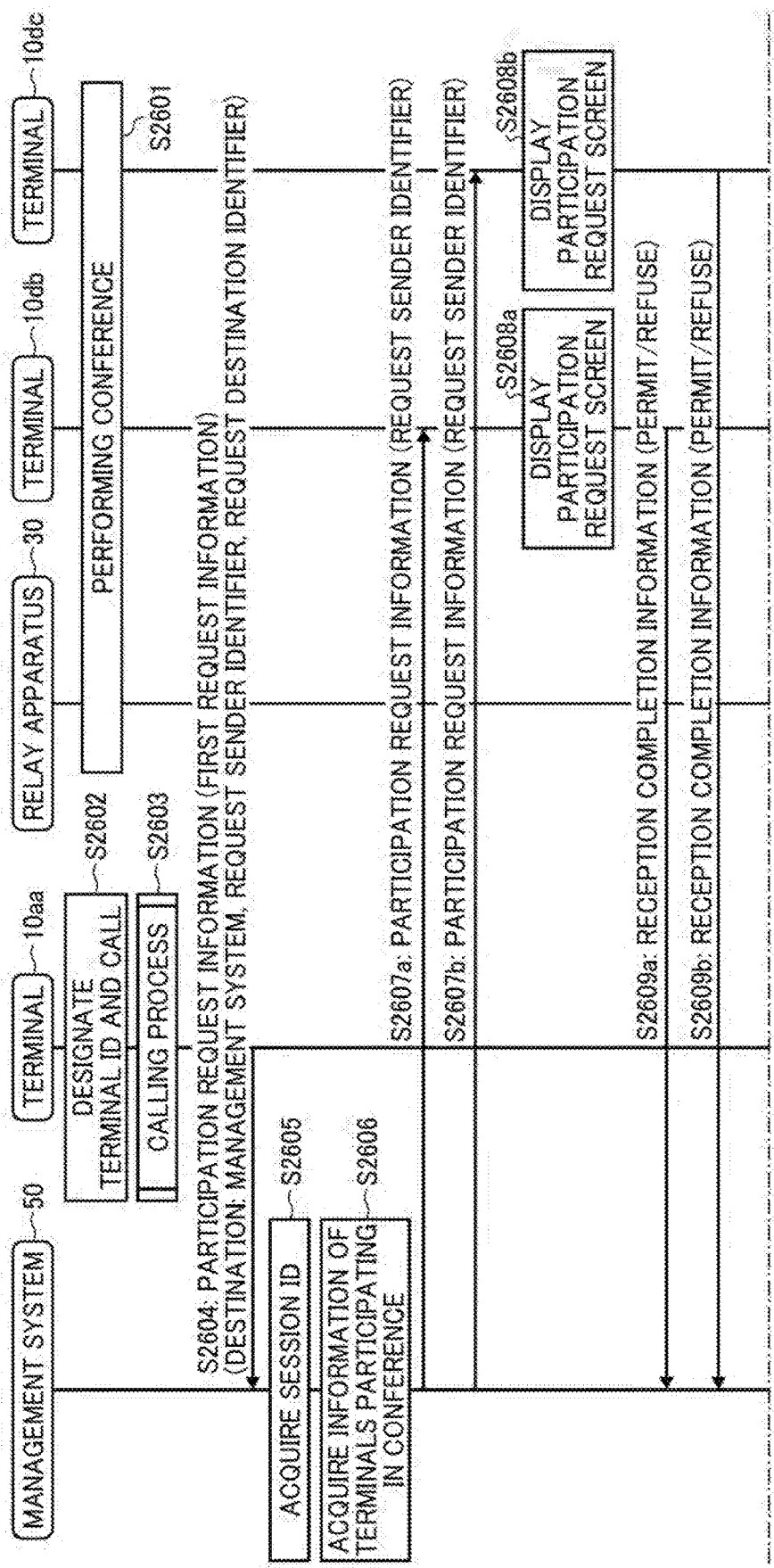
FIGS. 26A and 26B (FIG. 26) are a sequence diagram illustrating an exemplary communication process according to the fourth embodiment.
Figure 26B:
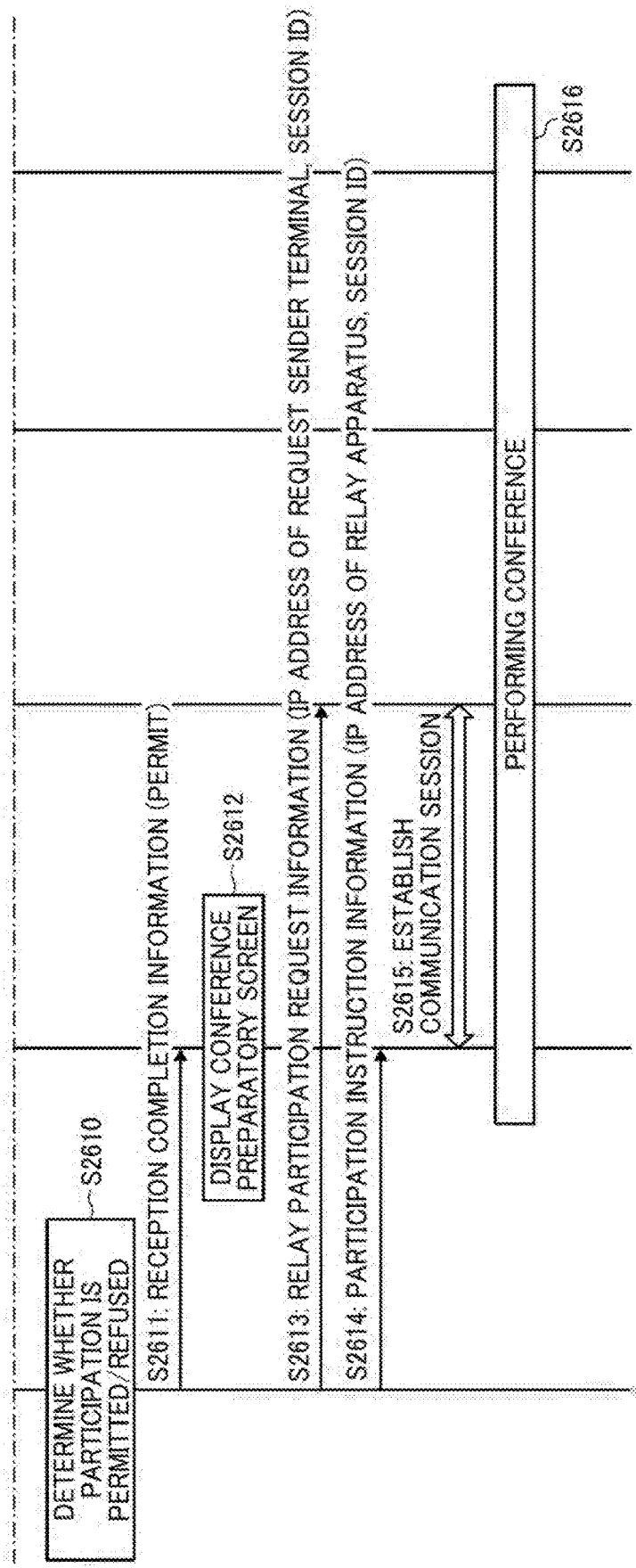

FIG. 26 illustrates a sequence of an exemplary communication process according to the fourth embodiment. This exemplary communication process is performed if the terminal 10db is performing a conference with the terminal 10dc serving as a participant terminal when the terminal 10aa serving as a request sender terminal calls the terminal 10db serving as a counterpart terminal.

It is assumed in step S2601 that the terminal 10db and the terminal 10dc are performing a conference through the relay apparatus 30.

In step S2602, the acceptor 19 of the terminal 10aa serving as a calling terminal accepts, for example, a calling operation performed by a user on the identifier-based calling screen 1302 as illustrated in FIG. 13A.

In step S2603, the terminal 10aa performs, for example, a process for calling the terminal 10 as in steps S1103 to S1108 in FIG. 24.

In step S2604, since the terminal 10db serving as the counterpart terminal is performing a conference, the first transmitter 20 of the terminal 10aa transmits to the management system 50, participation request information (first request information) for requesting participation in the conference. The participation request information includes the IP address of the management system 50 as destination information and includes the request sender identifier that is the identifier of the request sender terminal, the candidate identifier that is the identifier of the counterpart terminal, and the like as information content.

In step S2605, the management system 50 acquires the session ID of the conference in which the counterpart terminal is participating. Note that this process corresponds to step S2501 in FIG. 25.

In step S2606, the management system 50 acquires information about the terminals 10 participating in the conference by using the session ID acquired in step S2605 and the session management table 802 illustrated in FIG. 8B. Note that this process corresponds to step S2502 in FIG. 25.

In steps S2607a and S2607b, the information transmitter 58 of the management system 50 transmits to the terminals 10db and 10dc participating in the conference, the participation request information from the terminal 10aa. At this time, the participation request information transmitted to the terminals 10db and 10dc participating in the conference includes at least the request sender identifier that is the identifier of the terminal 10aa. Note that this process corresponds to step S2503 in FIG. 25.

Figure 27A:
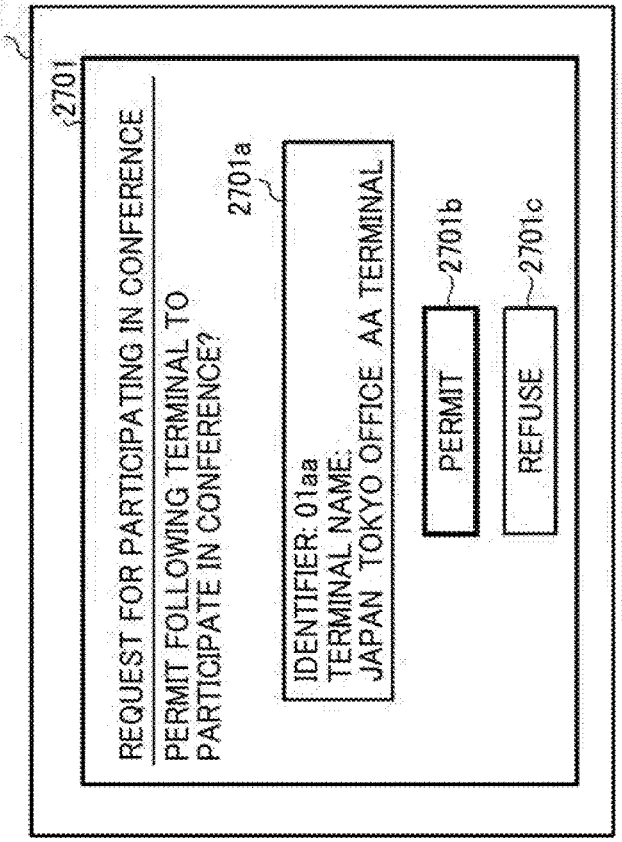
FIGS. 27A and 27B each illustrate an exemplary display screen of the terminal according to the fourth embodiment.

In steps S2608a and S2608b, the display control 17 of each of the terminals 10db and 10dc that have received the participation request information from the management system 50 causes, for example, a participation request screen 2701 illustrated in FIG. 27A to be displayed on the display unit 1301 of the display 120 or the like.

In the example in FIG. 27A, on the participation request screen 2701, information (e.g., the terminal name and the identifier) 2701a about the request sender terminal, a "permit" key 2701b for permitting the request sender terminal to participate in the conference, a "refuse" key 2701c for refusing the request sender terminal to participate in the conference, and the like are displayed.

In steps S2609a and S2609b, the communication control 13 of the terminal 10 transmits to the management system 50, reception completion information including information indicating the permission or refusal accepted by the operation input acceptor 12 on the participation request screen 2701.

In step S2610, the session manager 57 of the management system 50 determines whether the terminal 10aa is permitted to participate in the conference on the basis of the information indicating the permission or refusal included in the reception completion information received from the terminals 10db and 10dc participating in the conference. For example, if information indicating the permission is accepted from at least one of a plurality of terminals 10 participating in the conference, the session manager 57 of the management system 50 permits the terminal 10aa to participate in the conference.

As another example, if information indicating the permission is accepted from a predetermined number (e.g., two) of terminals 10 among a plurality of terminals 10 participating in the conference, the session manager 57 of the management system 50 may permit the terminal 10aa to participate in the conference. Furthermore, for example, if information indicating the refusal is accepted from at least one of a plurality of terminals 10 participating in the conference, the session manager 57 of the management system 50 may refuse the terminal 10aa to participate in the conference.

The following description will be given on the assumption that the session manager 57 of the management system 50 receives the reception completion information including the information indicating the permission from the terminal 10db or the terminal 10dc participating in the conference and permits the terminal 10aa to participate in the conference.

In step S2611, the session manager 57 of the management system 50 transmits to the terminal 10aa serving as the request sender terminal, the reception completion information including the information indicating the permission to participate in the conference.

In step S2612, the display control 17 of the terminal 10aa causes, for example, the conference preparatory screen 1305 illustrated in FIG. 13D to be displayed on the display unit 1301 of the display 120 or the like. Note that this process corresponds to, for example, step S1110 in FIG. 24.

Figure 27B:
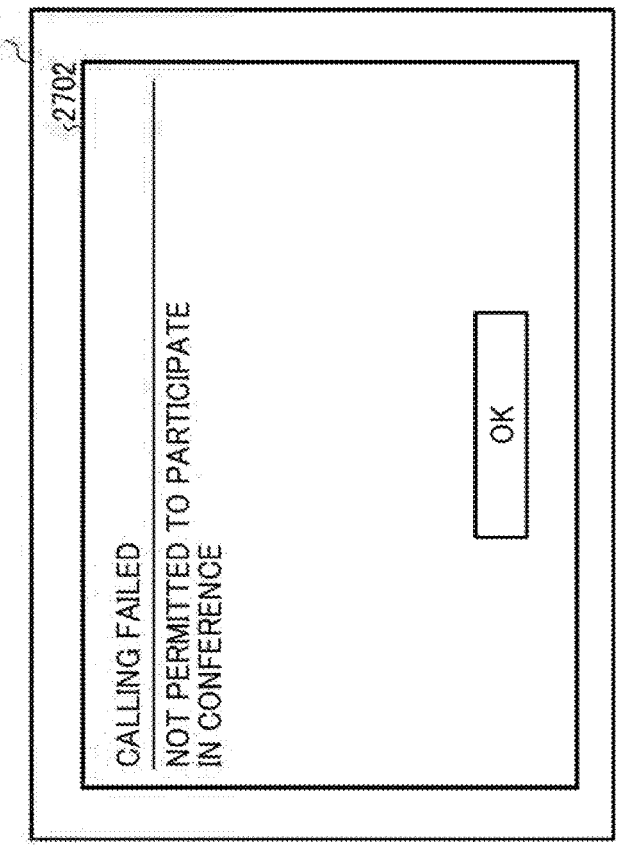

Note that if the display control 17 of the terminal 10aa receives from the management system 50, the reception completion information including the information indicating that the terminal 10aa is not permitted (refused) to participate in the conference in step S2611, the display control 17 of the terminal 10aa causes a participation refusal dialog 2702 illustrated in FIG. 27B to be displayed. The process for displaying the participation refusal dialog 2702 corresponds to, for example, step S2402 in FIG. 24.

In step S2613, the session manager 57 of the management system 50 transmits to the relay apparatus 30, relay participation request information including the request sender identifier that is the identifier of the terminal 10aa and the session ID that is the identifier of the conference.

In step S2614, the session manager 57 of the management system 50 transmits to the terminal 10aa serving as the request sender terminal, participation instruction information as an instruction for participating in a session. The participation instruction information includes, for example, the IP address of the relay apparatus 30 and the session ID of the conference in which the terminal 10db serving as the counterpart terminal is participating.

In step S2615, a communication session is established between the terminal 10aa and the relay apparatus 30, and the relay apparatus 30 causes the terminal 10aa to participate in the conference (session) in which the terminals 10db and 10dc are participating.

Thus, in step S2616, the terminal 10aa, the terminal 10db, and the terminal 10dc enable a conference through the relay apparatus 30.

In this manner, according to this embodiment, if the counterpart terminal is performing a conference when the request sender terminal calls the counterpart terminal, in addition to the counterpart terminal, the participant terminal can select whether the request sender terminal is permitted or refused to participate in the conference.

Note that the process illustrated in FIG. 26 is merely an example. For example, in step S2601 in FIG. 26, the number of the terminals 10 participating in the conference may be another number being two or more. In this case, in this embodiment, for example, in steps S2608a and S2608b, the participation request screen is displayed on each of the terminals 10 participating in the conference.

In addition, in steps S2609a and S2609b in FIG. 26, although the reception completion information indicating permission or refusal is transmitted from each of the terminals 10 participating in the conference, the reception completion information indicating permission or refusal may be transmitted from at least one of the terminals 10.

As described above, according to each of the above embodiments, in the communication system 1 in which communication is started by using a candidate list, it is possible to call a terminal 10 that has not been registered in the candidate list in the same manner as a terminal 10 that has been registered in the candidate list.

Note that the above terminals (information processing terminals) 10, the communication system 1, the management system 50, the information processing method, and the program are not limited to those as described in each of the above embodiments and can be embodied in the implementation by modifying a component without departing from the spirit thereof. In addition, various inventions are possible by combining, as appropriate, a plurality of components disclosed in the above embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing terminal, comprising circuitry configured to:
   receive, from a management system via a network, candidate identifiers, one for each one of one or more candidate counterpart information processing terminals that are previously registered as a communication counterpart candidate for the information processing terminal and stored by the management system;

determine, in response to acceptance of an identifier that has been input, whether the accepted identifier matches any one of the stored candidate identifiers;

when determining that the accepted identifier matches any one of the stored candidate identifiers:

transmit, to the management system, first request information requesting to start communication with a particular candidate counterpart information processing terminal identified with the accepted identifier, the first request information including a destination information field; and receive, state information indicating an operating state of the particular candidate counterpart information processing terminal identified with the accepted identifier, wherein, when the received state information indicates that the particular candidate counterpart information processing terminal identified with the accepted identifier is not available for communication, the circuitry is further configured to suspend transmission of the first request information; and when determining that the accepted identifier does not match any one of the stored candidate identifiers:

transmit, to the management system, second request information requesting to start communication with the particular counterpart information processing terminal identified with the accepted identifier, the second request information also including the destination information field, wherein a content of the destination information field included in the second request information differs from a content of the destination information field included in the first request information; and receive, state information indicating an operating state of the particular candidate counterpart information processing terminal identified with the accepted identifier, wherein, when the received state information indicates that the particular candidate counterpart information processing terminal identified with the accepted identifier is not available for communication, the circuitry is further configured to suspend transmission of the second request information.

2. The information processing terminal according to claim 1, wherein the content of the destination information field included in the second request information indicates the particular counterpart information processing terminal is assigned with an identifier that is not any one of the received candidate identifiers.

3. The information processing terminal according to claim 2, wherein the content of the destination information field included in the first request information indicates the management system as a destination of the first request information.

4. The information processing terminal according to claim 3, wherein the content of the destination information field included in the first request information includes an Internal Protocol address of the management system.

5. The information processing terminal according to claim 1, wherein, when the received state information indicates that the particular candidate counterpart information processing terminal identified with the accepted identifier is currently communicating, the circuitry is further configured to transmit, to the management system, the first request information for requesting participation in the communication currently performed.

6. The information processing terminal according to claim 1, wherein, when the received state information indicates that the particular candidate counterpart information processing terminal identified with the accepted identifier is available for communication, the circuitry is further configured to transmit, to the management system, the first request information for requesting start of communication with the particular candidate information processing terminal identified with the accepted identifier.

7. The information processing terminal of claim 1, wherein the content of the destination information field of the first request information is an Internet Protocol address of the management system, and the content of the destination information field of the second request information is the accepted identifier.

8. A management system, comprising:

a memory to store, for each one of one or more information processing terminals being managed by the management system, an identifier of the information processing terminal capable of requesting communication in association with one or more candidate identifiers of one or more candidate counterpart information processing terminals that are each previously registered as a communication counterpart candidate for the information processing terminal; and circuitry configured to:

receive, from a particular information processing terminal of the information processing terminals being managed, one of first request information and second request information, each requesting start of communication, wherein the first request information requests start of communication with a particular candidate counterpart information processing terminal of the candidate counterpart, information processing terminals identified with the one or more candidate identifiers stored in association with the identifier of the particular information processing terminal that sends the first request information, wherein the second request information requests start, of communication with the particular counterpart information processing terminal identified with an identifier that is not stored in association with the identifier of the particular information processing terminal that sends the second, request information, and wherein a content of a destination information field of the first request information is different than a content of a destination information field of the second request information; and receive, state information indicating an operating state of the particular candidate counterpart information processing terminal indicated by the received one of the first request information and the second request information, wherein when the received state information indicates that the particular candidate counterpart information processing terminal indicated by the received one of the first request information and the second request information is currently communicating, the circuitry is further configured to transmit the one of the first request information and the second request information to the particular candidate counterpart information processing terminal indicated by the received one of the first request information and the second request information.

9. The management system according to claim 8,
wherein, when the first request information is received, the particular candidate counterpart information processing terminal is identified with the one or more candidate identifiers, and
wherein, when the second request information is received, the particular counterpart information processing terminal is identified with the identifier that is not stored in association with the identifier of the particular information processing terminal, and
wherein, when the second request information is received, the circuitry is further configured to request the particular counterpart information processing terminal for conference start request information.

10. The management system according to claim 9, wherein the conference start request information includes information indicating whether to accept to start communication in response to the request for starting communication from the particular information processing terminal that sends the second request information.

11. The management system according to claim 8, wherein the memory further stores information regarding communication that is currently being participated in by a plurality of information processing terminals,
wherein the circuitry is further configured to determine whether the particular candidate counterpart communication terminal that is requested to start communication is participating in the communication, and
wherein, when the particular candidate counterpart communication terminal is participating in the communication, the circuitry is further configured to transmit the first request information to the plurality of information processing terminals that are participating in the communication, using the stored information regarding the communication.

12. The management system according to claim 11,
wherein, when information for permitting the particular information processing terminal that sends the first request information to participate in the communication is received from at least one of the plurality of information processing terminals participating in the communication, the circuitry is further configured to cause the particular information processing terminal that sends the first request information to participate in the communication.

13. The management system according to claim 8,
wherein, when the first request information is received, the circuitry is further configured to execute a process in accordance with information content included in the first request information, and
wherein, when the second request information is received, the circuitry is further configured to transfer the second request information to the particular candidate counterpart information processing terminal identified with the identifier.

14. The management system according to claim 8, wherein the circuitry is further configured to determine, in response to reception of an identifier that has been input from the particular information processing terminal, whether the received identifier matches any one of the one or more candidate identifiers registered for the particular information processing terminal that sends the identifier.

15. A communication system, comprising:
the management system according to claim 8; and
an information processing terminal to communicate with the management system via a network, including circuitry to:
receive, from the management system via the network, candidate identifiers, one for each one of one or more candidate counterpart information processing terminals that are previously registered for the information processing terminal and stored in the memory;
determine, in response to acceptance of an identifier that has been input, whether the accepted identifier matches any one of the candidate identifiers;
when determining that the accepted identifier matches any one of the candidate identifiers:
transmit, to the management system, the first request information requesting to start communication with the particular candidate counterpart information processing terminal identified with the accepted identifier; and
receive, state information indicating an operating state of the particular candidate counterpart information processing terminal identified with the accepted identifier, wherein, when the received state information indicates that the particular candidate counterpart information processing terminal identified with the accepted identifier is not available for communication, the circuitry is further configured to suspend transmission of the first request information; and
when determining that the accepted identifier does not match any one of the candidate identifiers;
transmit, to the management system, the second request information requesting to start communication with the particular counterpart information processing terminal identified with the accepted identifier, the second request information also including the destination information field, wherein the content of the destination information field included in the second request information differs from the content of the destination information field included in the first request information; and
receive, state information indicating an operating state of the particular candidate counterpart information processing terminal identified with the accepted identifier, wherein, when the received state information indicates that the particular candidate counterpart information processing terminal identified with the accepted identifier is not available for communication, the circuitry is further configured to suspend transmission of the second request information.

16. An information processing method comprising:
storing in a memory, for each one of one or more information processing terminals being managed by a management system, an identifier of the information processing terminal capable of requesting communication in association with one or more candidate identifiers of one or more candidate counterpart information processing terminals that are each previously registered as a communication counterpart candidate for the information processing terminal;
receiving, from a particular information processing terminal of the information processing terminals being managed, one of first request information, and second request information each requesting start of communication;
receiving, state information indicating an operating state of the particular candidate counterpart information processing terminal indicated by the received one of the first request information and the second request information; and upon the received state information indicating that the particular candidate counterpart information processing terminal indicated by the received one of the first request information and the second request information is currently communicating transmitting the one of the first request information and the second request information to the particular candidate counterpart information processing terminal indicated by the received one of the first request information and the second request information;

wherein, when the first request information is received, the transmitting step comprises transmitting the first request information to the particular candidate counterpart information processing terminal identified with the candidate identifier stored in association with the identifier of the particular information processing terminal that sends the first request information, wherein, when the second request information is received, the transmitting step comprises transmitting the second request information to the particular counterpart information processing terminal identified with an identifier that is not stored in association with the identifier of the particular information processing terminal that sends the second request information, and wherein a content of a destination information field of the first request information is different than a content of a destination information field of the second request information.

* * * * *